United States Patent
Tohgi et al.

[11] Patent Number: 6,072,113
[45] Date of Patent: Jun. 6, 2000

[54] MUSICAL PERFORMANCE TEACHING SYSTEM AND METHOD, AND MACHINE READABLE MEDIUM CONTAINING PROGRAM THEREFOR

[75] Inventors: Yutaka Tohgi, Hamamatsu; Masaki Hara; Tomoyuki Hirose, both of Tokyo, all of Japan

[73] Assignee: Yamaha Corporation, Japan

[21] Appl. No.: 08/953,458

[22] Filed: Oct. 17, 1997

[30] Foreign Application Priority Data

| Oct. 18, 1996 | [JP] | Japan | 8-276496 |
| Oct. 30, 1996 | [JP] | Japan | 8-288725 |
| Oct. 31, 1996 | [JP] | Japan | 8-304156 |

[51] Int. Cl.[7] ................................................. G09B 15/00
[52] U.S. Cl. .......................... 84/470 R; 84/609; 84/477 R
[58] Field of Search ............................ 84/470 R, 477 R, 84/609, 634; 434/307 A

[56] References Cited

U.S. PATENT DOCUMENTS

| 4,694,723 | 9/1987 | Shinohara et al. | 84/609 |
| 5,069,104 | 12/1991 | Shibukawa | 84/477 R X |
| 5,557,056 | 9/1996 | Hong et al. | 434/307 A X |
| 5,585,583 | 12/1996 | Owen | 84/470 |
| 5,739,457 | 4/1998 | Devecka | 434/307 A X |
| 5,746,605 | 5/1998 | Kennedy | 434/307 R |
| 5,889,224 | 3/1999 | Tanaka | 84/645 |

FOREIGN PATENT DOCUMENTS

| 0495203A2 | 1/1992 | European Pat. Off. . |
| 4424199A1 | 7/1994 | Germany . |
| 50-73732 | 6/1975 | Japan . |
| 02015293A | 1/1990 | Japan . |
| 2-15293 | 1/1990 | Japan . |
| 05119692A | 5/1993 | Japan . |
| 5-11962 | 5/1993 | Japan . |
| 06110479A | 4/1994 | Japan . |
| 6-110479 | 4/1994 | Japan . |
| 08211867A | 8/1996 | Japan . |
| 8-211867 | 8/1996 | Japan . |
| 93/03029 | 6/1994 | WIPO . |

*Primary Examiner*—Jeffrey Donels
*Attorney, Agent, or Firm*—Rossi & Associates

[57] ABSTRACT

A fully computerized musical performance teaching system comprises a computer apparatus having a keyboard and a display and is connectable to an electronic musical instrument. An application program provides the computer with various functions such as of judging student's skills, selecting music pieces for practice, training the student in performance and evaluating the student's progress through the teaching course. The judging function is to judge the student's performance skill from the student's responses to the subjects which the computer presents. The selecting function is to select a piece of music for practice according to the judgment results and the student's wishes and also to select a tutoring manner from among several prepared manners. The training function is to plan a practice schedule to meet the student's performance skill and wishes and to let the student practice with proper music pieces. The evaluation function is to evaluate and mark the student's performance, and reflect the evaluation results and marked points in the progressing rate and the presented subjects and also in adjusting the judgment results.

76 Claims, 33 Drawing Sheets

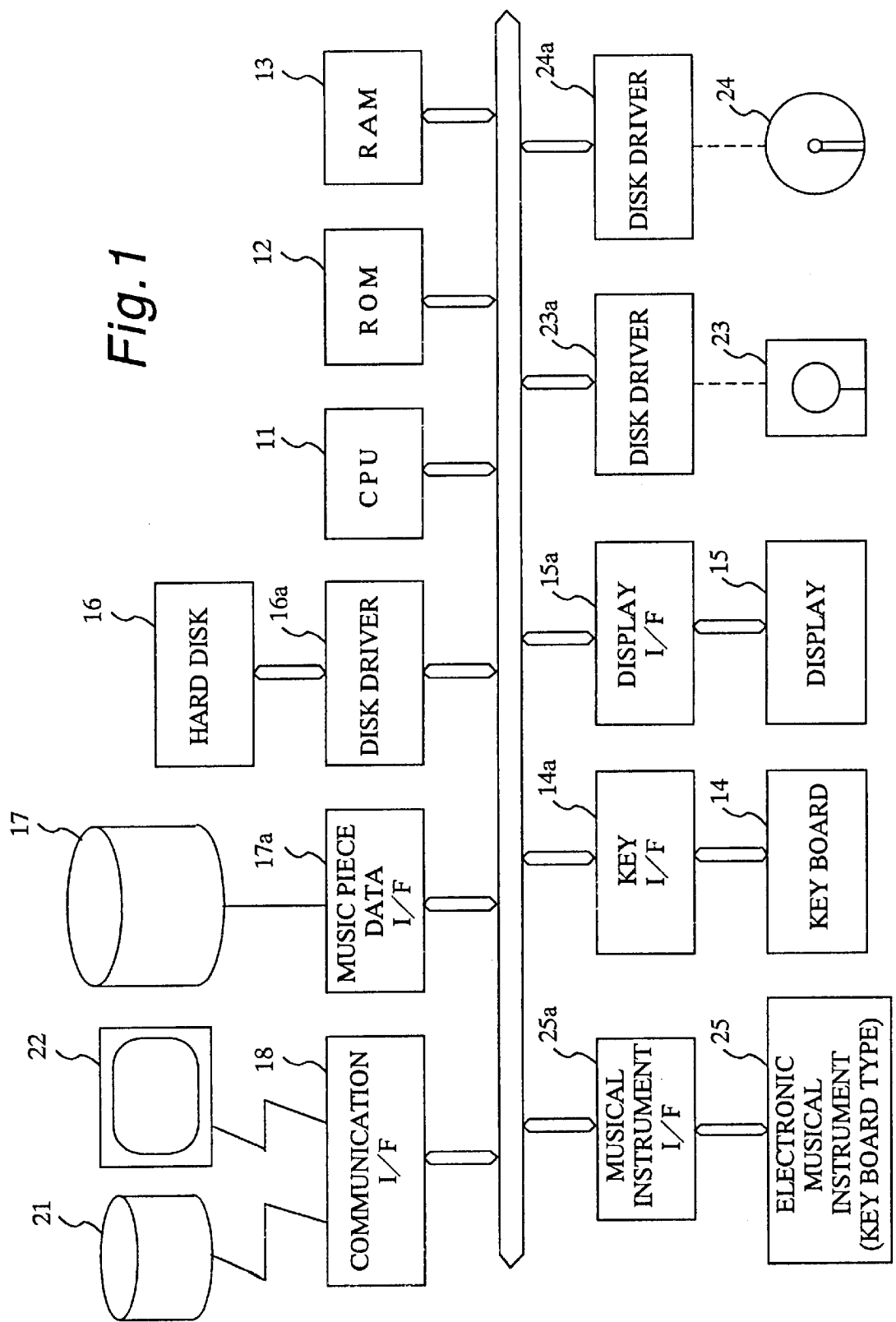

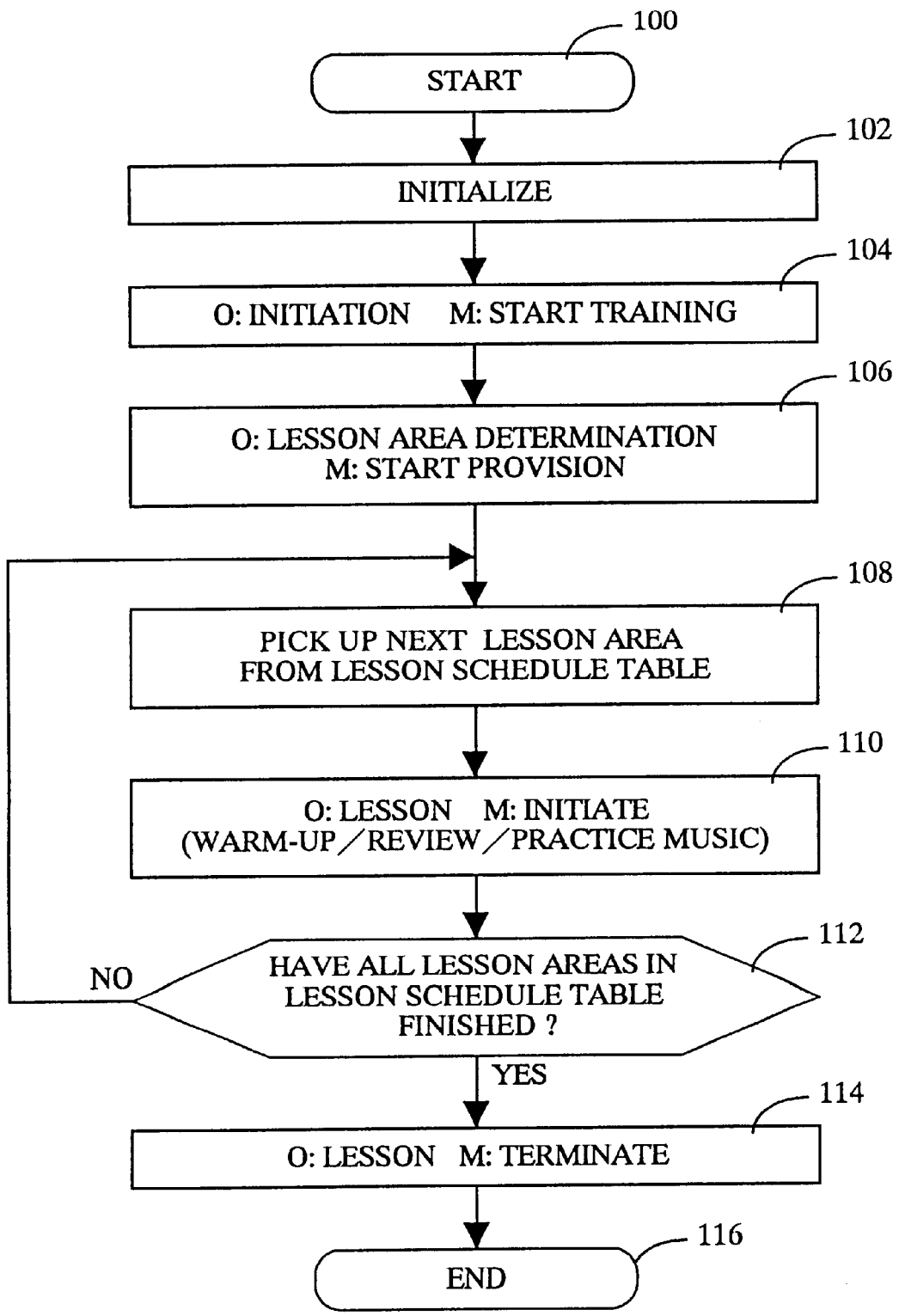

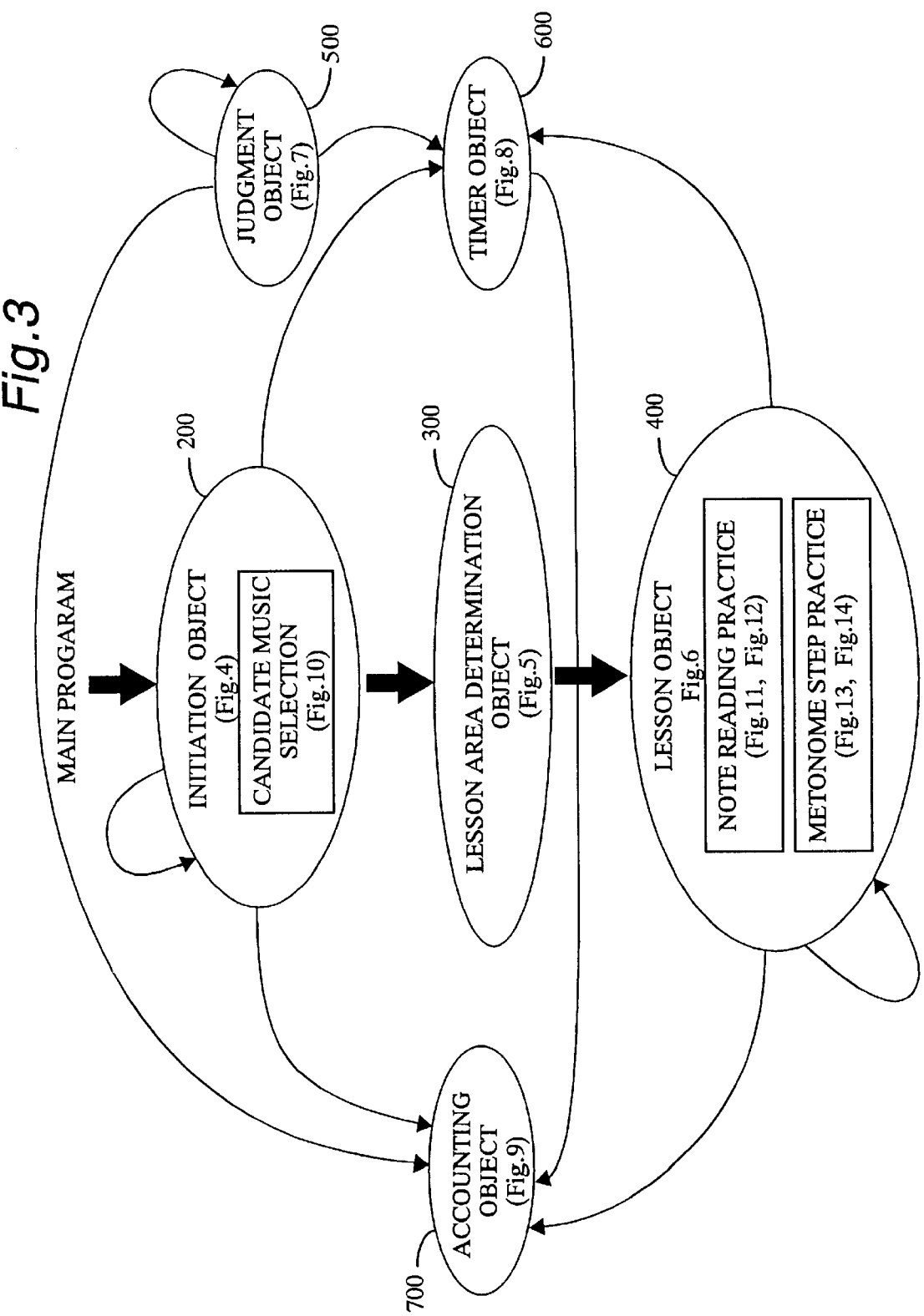

Fig. 4

INITITATION OBJECT 200

| MESSAGE | CONDITION | ACTION | |
|---|---|---|---|
| STRAT PRACTICE | | O:TIMER M:INITIALIZATION | 202 |
| | | O:ACCOUNTING M:INITIALIZATION | 204 |
| | | O:ACCOUNTING M:NOTIFY EXECUTED PROGRAM | 206 |
| | | M:QUERY USER | 208 |
| | | M:SELECT PRACTICE MUSIC | 210 |
| | | INPUTTING LESSON INFORMATION | 212 |
| QUERY USER | | DESIDNATING REGISTERED/NEW USER | 214 |
| | REGISTERED USER | DESIGNATING REGISTERED USER INFORMATION | 216 |
| | NEW USER | INPUTTING USER NAME | 218 |
| | | DECLAIRING USER LEVEL | 220 |
| | | M:JUDGE USER LEVEL | 222 |
| | | AQUIRING ASSOCIATED INFORMATION | 224 |
| JUDGE USER LEVEL | | O:JUDGMENT | 226 |
| | | M:INITIATE(JUDGEMENT, USER LEVEL, JUDGMENT TIME) | 228 |
| | | COMPUTING USER LEVEL | 230 |
| | | M:DETERMINE USER LEVEL | 232 |
| DETERMINE USER LEVEL | | COMPARING COMPUTED USER LEVEL WITH DECLARED LEVEL | 234 |
| | COMPUTED LEVEL MUCH DIFFERENT FROM DECLARED | ADJUSTING USER LEVEL | 236 |
| | COMPUTED LEVEL NEARLY EQUAL TO DECLARED | M:JUDGE USER LEVEL | 238 |
| | | PROVIDING USER MODEL | 240 |
| SELECT PRACTICE MUSIC | | QUERYING PRACTICE MUSIC REQUEST | 242 |
| | NEW PRACTICE MUSIC | *SELECTING CANDIDATE MUSIC (Fig.10) | 244 |
| | | LOADING SELECTED MUSIC DATA | 246 |
| | | DRAFTING PRACTICE SCHEDULE BASED ON USER MODEL | 248 |
| | | DISPLAYING PRACTICE SCHEDULE | 250 |
| | | QUERYING USER'S REQUEST ON PRACTICE SCHEDULE | 252 |
| | | MODIFYING PRACTICE SCHEDULE BASED ON USER'S REQUEST | 254 |
| | | SETTING PRACTICE SCHEDULE AS PRACTICE SCHEDLE DATA | 256 |
| | MUSIC PIECE UNDER PRACTICE | LOADING USER INFORMATION | |

Fig. 5

| MESSAGE | CONDITION | ACTION | |
|---|---|---|---|
| INITIATE PROVISION | | QUERYING NECESSITY OF WARM-UP | 302 |
| | | QUERYING NECESSITY OF REVIEW | 304 |
| | | PROVIDING PRACTICE SCHEDULE TABLE BASED ON NECESSITY OF WARM-UP AND REVIEW AND ON SCHEDULED PRACTICE | 306 |
| | | DISPLAYING SCHEDULED PRACTICE TABLE CONTENT | 308 |
| | | QUERYING USER'S REQUEST ON SCHEDULED PRACTICE CONTENT | 310 |
| | | MODIFYING PRACTICE TABLE CONTENT TO MEET USER'S REQUEST | 312 |

LESSON AREA DETERMINATION OBJECT 300

Fig.6

LESSON OBJECT 400

| MESSAGE | CONDITION | ACTION | |
|---|---|---|---|
| INITIATE | | O:ACCOUNTING M:EXECUTE PROGRAM | 402 |
| | | O:TIMER M:SET (TIME) | 404 |
| | WARM-UP | CONDUCTING WARM-UP PRACTICE | 406 |
| | REVIEW | CONDUCTING REVIEW PRACTICE | 408 |
| | PRACTICE MUSIC | ALLOCATING PRACTICE TIME | 410 |
| | | M:INITIATE (NOTE READING PRACTICE) | 412 |
| | | M:INITIATE (METRONOME STEP PRACTICE) | 414 |
| | NOTE READING PRACTICE | *CONDUCTING NOTE READING PRACTICE(Figs.11, 12) | 416 |
| | METRONOME STEP PRACTICE | *CONDUCTING METRONOME STEP PRACTICE (Figs.13, 14) | 418 |
| | | RELEASING TIMER | 420 |
| | | ADJUSTING TIMER SCHEDULE | 422 |
| DEMAND PROCESS TERMINATION | INTERMEDIATE EVALUATION ISSUED | KEEPING INTERMEDIATE EVALUATION | 424 |
| | | FORCEDLY TERMINATING EACH PRACTICE | 426 |
| | | SETTING TIME EXTENTION | 428 |
| | INTERMEDIATE EVALUATION NOT ISSUED | O:TIMER M:SET (TIME) | 430 |
| | | SETTING TERMINATION DEMAND FLAG | 432 |
| TERMINATE | | WRITING PRACTICE RESULTS IN PRACTICE SCHEDULE | 434 |
| | | UPDATING USER MODEL DATA | 436 |
| | | DISPLAYING PRACTICE RESULTS | 438 |
| | | GIVING HOME WORK | 440 |
| | | DISPLAYING AND STORING ACCOUNTING INFORMATION | 442 |

Fig.7(a)

JUDGMENT OBJECT 500

| MESSAGE | CONDITION | ACTION | |
|---|---|---|---|
| INITIATE | | ALLOCATING TIME | 502 |
| | JUDGEMENT | O:ACCOUNTING M:SET (TIME) | 504 |
| | | O:TIMER M:SET (TIME) | 506 |
| | | M:INITIATE (NOTE READING SKILL, USER LEVEL, TIME) | 508 |
| | | M:INITIATE (PERFORMANCE SKILL, USER LEVEL, TIME) | 510 |
| | | JUDGING EXPRESSION MARKS COMPREHENSION | 512 |
| | NOTE READING SKILL | M:INITIATE (SINGLE NOTE READING SKILL, USER LEVEL, TIME) | 514 |
| | | M:INITIATE (MULTI NOTE READING SKILL, USER LEVEL, TIME) | 526 |
| | | M:INITIATE (CLEF READING SKILL, USER LEVEL, TIME) | 518 |
| | SINGLE NOTE READING SKILL | JUDGING NATURAL NOTE READING SKILL | 520 |
| | | JUDGING ACCIDENTAL NOTE READING SKILL | 522 |
| | | JUDGING RHYTHM READING SKILL | 524 |
| | MULTIPLE NOTE READING SKILL | SAME AS SINGLE NOTE SKILL M.M. | 526 |
| | CLEF | JUDGING G CLEF READING SKILL | 528 |
| | | JUDGING F CLEF READING SKILL | 530 |
| | | JUDGING C CLEF READING SKILL | 532 |
| | PERFORMANCE SKILL | INITIATE (KEY DEPRESSION, USER LEVEL, TIME) | 534 |
| | | INITIATE (RHYTHM, USER LEVEL, TIME) | 536 |
| | | INITIATE (BOTH HANDS PLAY, USER LEVEL, TIME) | 538 |
| | KEY DEPRESSION | INITIATE (RIGHT HAND PLAY, USER LEVEL, TIME) | 540 |
| | | INITIATE (LEFT HAND PLAY, USER LEVEL, TIME) | 542 |
| | RIGHT HAND | INITIATE (SINGLE KEY DEPRESSION, USER LEVEL, TIME) | 544 |
| | | INITIATE (MULTIPLE KEY DEPRESSION, USER LEVEL, TIME) | 546 |
| | SINGLE KEY DEPRESSION | JUDGING UNIFORMITY OF FINGERING STRENGTH | 548 |
| | | JUDGING AGILITY | 550 |
| | | JUDGING DIRECTIONAL ADAPTABILITY | 552 |

Fig.7(b)

JUDGMENT OBJECT 500

| MESSAGE | CONDITION | ACTION | |
|---|---|---|---|
| INITIATE | MULTIPLE KEY DEPRESSION | JUDGING UNIFORMITY OF FINGERING STRENGTH FOR MULTIPLE DEPRESSION | 554 |
| | | JUDGING FINGER EXTENSITY | 556 |
| | LEFT HAND | SAME AS RIGHT HAND M.M. | 558 |
| | RHYTHM EXPRESSION | JUDGING QUADRUPLET RHYTHM EXPRESSSION | 560 |
| | | JUDGING TRIPLET RHYTHM EXPRESSION | 562 |
| | | JUDGING ANOMALOUS RHYTHM EXPRESSION | 564 |
| | BOTH HANDS PLAY | JUDGING RIGHT-LEFT COLLABORATION | 566 |
| | | JUDGING RIGHT-LEFT DIFFERENT RHYTHM SKILL | 568 |
| | | O:TIMER M:RELEASE | 570 |
| | | ADJUSTING TIMER SCHEDULE | 572 |
| DEMAND PROCESS TERMINATION | INTERMEDIATE EVALUATION ISSUED | KEEPING INTERMEDIATE JUDGMENT | 574 |
| | | FORCEDLY TERMINATING JUDGMENT PROCESSING | 576 |
| | INTERMEDIATE EVALUATION NOT ISSUED | SETTING TIME EXTENTION | 578 |
| | | O:TIMER M:SET (TIME) | 580 |
| | | SETTING TERMINATION DEMAND FLAG | 582 |
| | TERMINATION DEMAND FLAG | TEMPORARILY STORING MINIMUM POINTS FOR JUDGMENT RESULTS | 584 |
| | | CLEARING TERMINATION DEMAND FLAG | 586 |

Fig.8

TIMER OBJECT 600

| MESSAGE | CONDITION | ACTION |
|---------|-----------|--------|
| INITIALIZE | | INITIALIZING TIMER 602 |
| SET | | THEN, AT EVERY PREDETERMINED TIME INTERVAL, O:ACOUNTING M:INTERRUPT 604<br>AFTER DESIGNATED TIME, ISSUING PROCESS TERMINATION REQUEST MESSAGE TO OBJECT OF MESSAGE SOURCE 606 |
| RELEASE | | CLEARING SETTING FOR ISSUING PROCESS TERMINATION REQUEST MESSAGE 608 |

Fig.9

ACCOUNTING OBJECT 700

| MESSAGE | CONDITION | ACTION |
|---------|-----------|--------|
| INITIALIZE | | INITIALIZING ACCOUNTING INFORMATION 702 |
| NOTIFY EXECUTED PROGRAM | | ALTERING UNIT FEE ACCORDING TO EXECUTION SOURCE 704 |
| INTERRUPT | | ACCUMULATING UNIT FEE TO TOTAL SUM 706 |

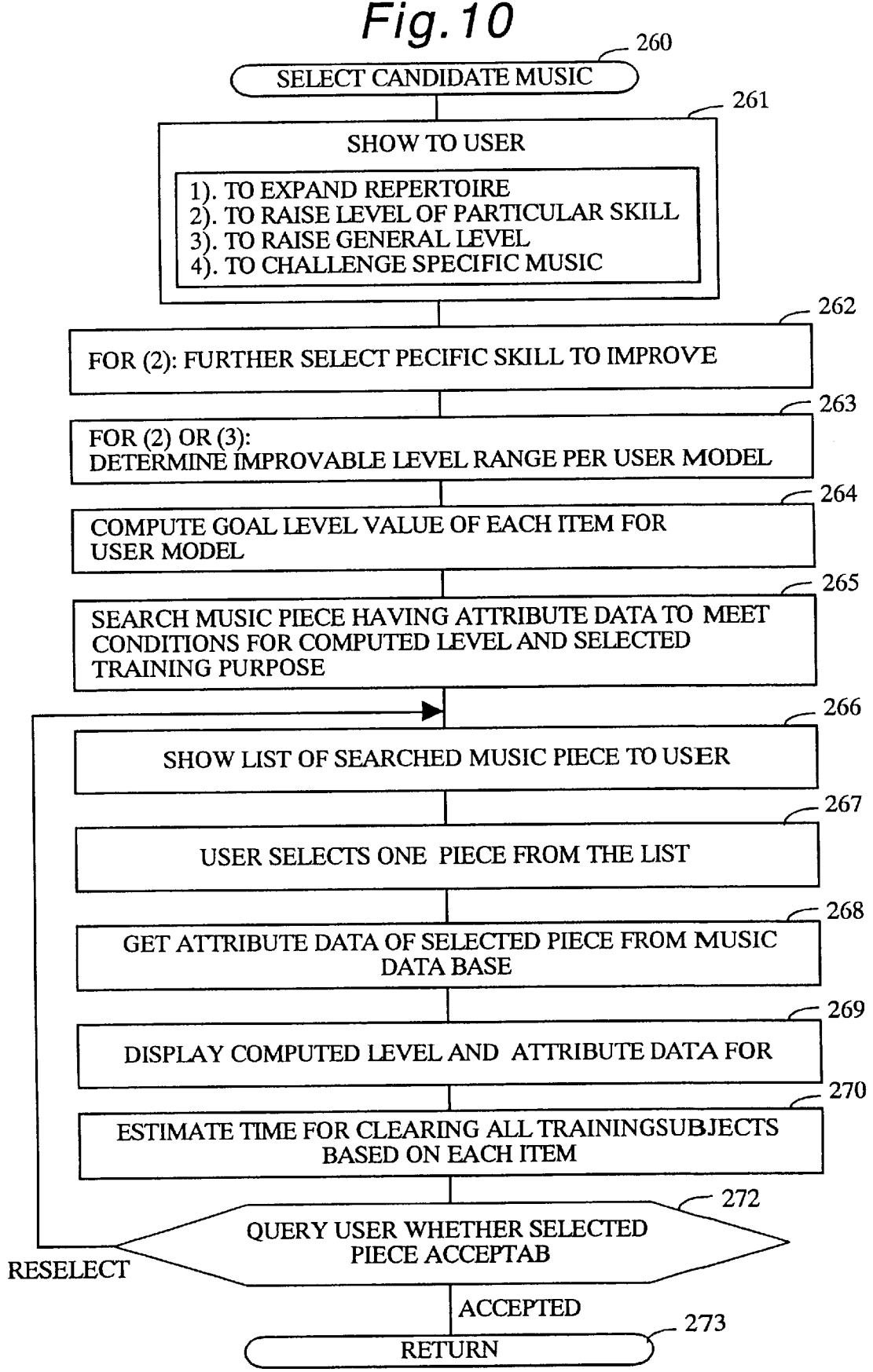

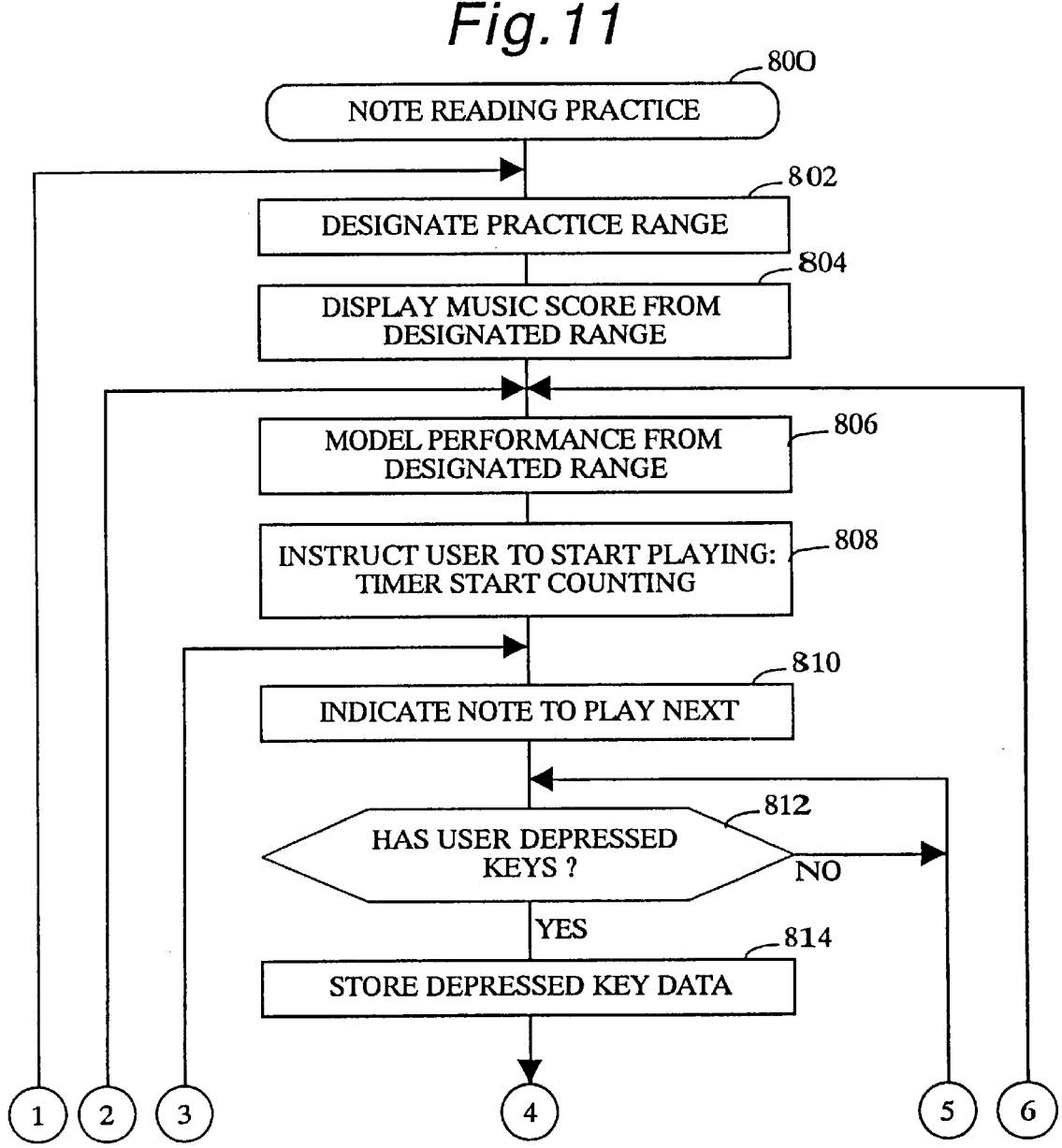

Fig. 16

USER MODEL

| | | | | | | PERFORMANCE TALENT (POINTS) |
|---|---|---|---|---|---|---|
| NOTE READING SKILL | MONOPHONIC MELODY | NATURAL NOTES | CORRECTNESS | | | 52 |
| | | | SPEED | | | 64 |
| | | SHARP NOTES | CORRECTNESS | | | 48 |
| | | | SPEED | | | 61 |
| | POLYPHONIC MELODY | *SAME ITEMS AS ABOVE | | | | (OMITTED) |
| | CLEFS | G CLEF | | | | 58 |
| | | F CLEF | | | | 54 |
| | | C CLEF | | | | 40 |
| | KEY SIGNATURE | SHARP FAMILY | | | | 60 |
| | | FLAT FAMILY | | | | 52 |
| PLAYING SKILL | KEY DEPRESSION | RIGHT HAND | SINGLE NOTE | UNIFORMITI OF FINGERING STRENGTH | | 73 |
| | | | | AGILITY | | 65 |
| | | | | FINGER EXTENSITY | | 74 |
| | | | | DIRECTIONAL ADAPTABILITY | | 82 |
| | | | | CORRECTNESS OF SHARP-KEY DEPRESSION | | 72 |
| | | | CHORDS | *SAME ITEMS AS ABOVE | | (OMITTED) |
| | | LEFT HAND | *SAME ITEMS AS ABOVE | | | (OMITTED) |
| | RHYTHM EXPRESSION (TEMPO KEEPING) | | | | | 75 |
| | COMBINATION OF RIGHT AND LEFT HANDS | | | | | 63 |
| PERSONAL TENDENCY | PREFERENCE OF MUSIC | | | | | FREE FORMAT |
| | WISHES IN REGARD TO LESSON | | | | | FREE FORMAT |
| | CHARACTER | | | | | FREE FORMAT |

Fig. 17

PRACTICE SCHEDULE

|  | PRACTICE AREAS | FIRST TIME | | SECOND TIME | | FINISH APPLOVAL | TIME ESTIMATED | TIME CONSUMED |
|---|---|---|---|---|---|---|---|---|
|  |  | DATE | SUCCESS RATE | DATE | SUCCESS RATE |  |  |  |
| STEP1 | SCALE PRACTICE | 1996/8/5 | 65 | 1996/8/5 | 80 | FINISHED | 5 | 10 |
| STEP2 | RIGHT HAND PLAY (IN HALF TEMPO) | 1996/8/6 | 80 |  |  | FINISHED | 15 | 12 |
| STEP3 | LEFT HAND PLAY (IN HALF TEMPO) | 1996/8/6 | 65 | 1996/8/7 | 80 | FINISHED | 15 | 25 |
| STEP4 | BOTH HANDS PLAY (INHALF TEMPO) | 1996/8/10 | 55 |  |  |  | 15 | 18 |
| STEP5 | PRACTICE OF SPECIAL RHYTHM PORTION |  |  |  |  |  | 5 |  |
| STEP6 | BOTH HANDS PLAY (IN 3/4 TEMPO) |  |  |  |  |  | 10 |  |
| STEP7 | RIGHT HAND PLAY (IN NORMAL TEMPO) |  |  |  |  |  | 5 |  |
| STEP8 | LEFT HAND PLAY (IN NORMAL TEMPO) |  |  |  |  |  | 5 |  |
| STEP9 | BOTH HANDS PLAY (WEIGHTED ON NOTE READING; IN NORMALTEMPO) |  |  |  |  |  | 10 |  |
| STEP10 | BOTH HANDS PLAY (WEIGHTED ON TIMINGS; IN NORMALTEMPO) |  |  |  |  |  | 5 |  |
| STEP11 | BOTH HANDS PLAY (IN NORMAL TEMPO) |  |  |  |  |  | 10 |  |
| STEP12 | BOTHHANDS PLAY FINAL (IN NORMAL TEMPO) |  |  |  |  |  | 10 |  |

Fig. 18

ATTRIBUTE DATA

| | | | REQUISITE LEVEL (POINTS) STANDARD TIME |
|---|---|---|---|
| NOTE READING SKILL | CLEFS | G CLEF | 0 |
| | | F CLEF | 50 |
| | | C CLEF | 0 |
| | KEY SIGNATURE | SHARP FAMILY | 0 |
| | | FLAT FAMILY | 0 |
| PLAYING SKILL | KEY DEPRESSION RIGHT HAND | SINGLE NOTE — UNIFORMITY OF FINGERING STRENGTH | 40 |
| | | AGILITY | 30 |
| | | FINGER EXTENSITY | 60 |
| | | DIRECTIONAL ADAPTABILITY | 50 |
| | | CORRECTNESS OF SHARP-KEY DEPRESSION | 50 |
| | | CHORD * SAME ITEMS AS ABOVE | (OMITTED) |
| | LEFT HAND * SAME ITEMS AS ABOVE | | (OMITTED) |
| STANDARD TIME | SCALE PRACTICE | | |
| | RIGHT HAND (IN HALF TEMPO) | | 10Min. |
| | | | 11Min. |
| | BOTH HANDS (IN NORMAL TEMPO) | | 12Min. |

Fig. 19

PRACTICE SCHEDULE TABLE

| | |
|---|---|
| WARM-UP | 1Min. |
| REVIEW | 2Min. |
| PRACTICE MUSIC PIECE | 12Min. |

Fig.21

ACHIEVEMENT DATA

| | | | | | | MARKED POINTS |
|---|---|---|---|---|---|---|
| NOTE READING SKILL | MONOPHONIC MELODY | NATURAL NOTES | CORRECTNESS | | | 70 |
| | | | SPEED | | | 76 |
| | | SHARP NOTES | CORRECTNESS | | | 58 |
| | | | SPEED | | | 42 |
| | POLYPHONIC MELODY | * SAME ITEMS AS ABOVE | | | | (OMITTED) |
| | CLEFS | G CLEF | | | | 82 |
| | | F CLEF | | | | 63 |
| | | C CLEF | | | | - |
| | KEY SIGNATURE | SHARP FAMILY | | | | 65 |
| | | FLAT FAMILY | | | | - |
| PLAYING SKILL | KEY DEPRESSION | RIGHT HAND | SINGLE NOTE | UNIFORMITY OF FINGERING STRENGTH | | 85 |
| | | | | AGILITY | | 94 |
| | | | | FINGER EXTENSITY | | 92 |
| | | | | DIRECTIONAL ADAPTABILITY | | 87 |
| | | | | CORRECTNESS OF SHARP-KEY DEPRESSION | | 69 |
| | | | CHORDS | * SAME ITEMS AS ABOVE | | (OMITTED) |
| | | LEFT HAND | * SAME ITEMS AS ABOVE | | | (OMITTED) |
| | RHYTHM EXPRESSION (TEMPO KEEPING) | | | | | 80 |
| | COMBINATION OF RIGHT AND LEFT HANDS | | | | | 90 |
| TIME FOR ACHIEVEMENT | | | | | | 15Min. |

PRACTICE SCHEDULE

|  | PRACTICE AREA | FINISHED OR NOT |
|---|---|---|
| STEP 1 | RIGHT HAND PLAY AND LEFT HAND PLAY (IN HALF TEMPO) | 1 |
| STEP 2 | BOTH HANDS PLAY (IN HALF TEMPO) | 1 |
| STEP 3 | PRACTICE OF SPECIAL RHYTHM PORTION | 0 |
| STEP 4 | RIGHT HAND PLAY AND LEFT HAND PLAY (IN NORMAL TEMPO) | 0 |
| STEP 5 | BOTH HANDS PLAY (IN NORMAL TEMPO) | 0 |
| STEP 6 | BOTH HANDS PLAY FINAL (IN NORMAL TEMPO) | 0 |

Fig.35

|      | METER | KEY | DIFFICULTNESS | TEMPO | STYLE  | KEY WORD ON PRACTICE |
|------|-------|-----|---------------|-------|--------|----------------------|
| 0001 | 4/4   | C   | 1             | 60    | COMMON | CHORDS, THIRDS       |
| 0002 | 4/4   | C   | 1             | 72    | COMMON | SCALE, FINGERING     |
| 0003 | 4/4   | C   | 1             | 60    | COMMON | FINGERING, NOTE JUMP |
|      |       |     |               |       |        |                      |
| 0123 | 3/4   | E   | 4             | 72    | WALZ   | CHORDS, NOTE LUMP, ACCIDENTALS |

MUSICAL PERFORMANCE TEACHING SYSTEM AND METHOD, AND MACHINE READABLE MEDIUM CONTAINING PROGRAM THEREFOR

BACKGROUND OF THE INVENTION

1. Field of the Invention

The present invention relates to a musical performance teaching system utilizing a computer apparatus capable of training a student personally in playing a musical instrument, a method therefor and a machine readable medium for use therein containing program instructions executable by the computer apparatus for teaching musical performance.

2. Description of the Prior Art

In learning how to play a musical instrument and training performance on a musical instrument, it has conventionally been a general way that a teacher teaches a group of students in a class at a school or other organization or a teacher tutors a student personally at a private lesson room. Also known in the art is an electronic musical instrument incorporating depressing key indicators, key depression judging device and the like to help learning musical instrument performance by the student himself or herself.

In such a group training or an individual tutoring, however, a teacher in person is indispensable and the time for a lesson cannot be freely or arbitrarily taken, and consequently it will be hard for a student to learn musical instrument playing so easily. In the case of an electronic musical instrument equipped with such a training aid, the instrument simply guide and judge the student's playing, and consequently only simple matters can be practiced by the student. Such a self-training does not include presenting a particular practice subject for the trainee, giving evaluation or comments to the trainee, instructing the trainee to practice a particular practice subject repeatedly, presenting some sub-practice subjects to master a particular practice subject, or other detailed tutoring for the student. Thus favorable practice results acceptable to the trainee will not be obtained.

SUMMARY OF THE INVENTION

The present invention is intended to solve the above-mentioned problems encountered in the conventional training method and system. It is, therefore an object of the present invention to provide a computerized musical performance teaching system and method with which a student can practice playing a musical instrument according to his or her own convenience and can expect an effective training and satisfactory progress. It is also an object of this invention to provide a computerized musical performance teaching system and method with which a student can chose a manner or type of teaching according to his or her intention or preference from among various tutoring manners previously prepared therein. A further object of the present invention is to provide a machine readable medium containing program instructions executable in a computerized musical performance teaching system for causing the system to realize such a musical performance training as mentioned above.

One aspect of the present invention resides in the provision of a musical performance teaching system comprising a computer apparatus having a display device and being connectable to an electronic musical instrument adapted for playing by a student, and a musical performance teaching method using such a system. With such a teaching system and method, a teacher in person is not necessary and a student can conduct a musical instrument playing practice by himself or herself utilizing a computerized system at any convenient time for the student.

Another aspect of the present invention lies in the inclusion of making judgment about performance skill of the student based on performance data from an electronic musical instrument utilizing a display device, providing a number of practice music pieces in data form, selecting music data of a practice music piece for training of the student from among the practice music pieces in accordance with the judgment made about the performance skill of the student, and training the student by presenting a musical score on the display device based on the selected music data to be practiced by the student. Thus, practice music pieces will be presented to the student meeting the performance skill of the student so that the student should engage in music performance practice of maximally adequate level of performance skill to achieve a maximally effective progress.

A further aspect of the present invention lies in the inclusion of inputting requests from the student upon querying the student about requests in regard to the training utilizing the display device, and selecting music data of a practice music piece reflecting the inputted requests. Thus, the presented practice music will meet the preference of the student so that the student should enjoy the practice of musical performance with pleasure.

A still further aspect of the present invention lies in the inclusion of inputting performance data of the student from an electronic musical instrument and then making an evaluation of practice results based on the performance data after a certain amount of practice by the student. Thus, the student can grasp his or her state of practice and progress of skill through training without a teacher in person.

A still further aspect of the present invention lies in the inclusion of adjusting the judgment reflecting the evaluation of practice results. Thus, the selection of the practice music piece will be made in accordance with the progress of the student's performance skill so that a maximally adequate training should be realized.

A still further aspect of the present invention lies in the inclusion of accepting declaration of performance skill of the student by querying the student through the display device, presenting on the display device a subject for practice of musical performance of a level which meets the declaration by the student, and making judgment about performance skill of the student with respect to said subject for practice upon receipt of said performance data from the electronic musical instrument. Thus, a subject which will adequately meet the performance skill of the student is given to the student, and then the user's skill is to be judged based on such a subject, realizing an adequate judgment of the skill.

A still further aspect of the present invention lies in the inclusion of presenting on the display device in sequence a plurality of subjects for practice of musical performance with respect to various areas of performance skill of the student, and making judgment respectively about those various areas of performance skill of the student on the respective subjects for practice upon receipt of the performance data from the electronic musical instrument. Thus, the student's performance skill is judged with respect to each area or item of the musical performance skill, thus realizing a proper judgment of the student's skill. Consequently a proper training can be provided for the student based on the judgment results with respect to the respective areas of performance skill.

A still further aspect of the present invention lies in the inclusion of storing user model data representing performance skill of the student in a memory, preparing a schedule of training musical instrument performance skill based on the user model data, and training the student according to the schedule of training. Thus, a training schedule is made in accordance with the student's performance skill and the performance practice on the musical instrument is conducted following the training schedule. Consequently the student will have a proper training, and one can expect an efficient musical performance teaching.

A still further aspect of the present invention lies in the inclusion of inputting requests from the student upon querying the student about requests in regard to the training utilizing said display device, and providing a schedule of training musical instrument performance skill reflecting the inputted requests. Thus, the student's preference will be reflected in the training, and the student will enjoy the practice of musical instrument performance.

A still further aspect of the present invention lies in the inclusion of storing practice schedule data representing a schedule of training musical instrument performance skill of the student in a memory, training the student in accordance with the schedule based on the practice schedule data, and writing practice results of the student's performance training into the memory in addition to the practice schedule data. Thus, the performance training is conducted according to the training schedule, while the history of the practice results is also memorized therein, thereby enabling a proper judgment of the student's practice progress.

A still further aspect of the present invention lies in the inclusion of storing practice schedule data representing a schedule of training musical instrument performance skill of the student in a memory, training the student by presenting matters to practice on said display device in accordance with the schedule based on the practice schedule data, making an evaluation of practice results based on the performance data of the student from the electronic musical instrument, and controlling the progression of the training based on the schedule of training reflecting (in consideration of) the evaluation of practice results. Thus, the performance training is conducted according to the training schedule, while the rate of practice progress is determined based on the degree of student's mastering the performance skill. Consequently the student will master the intended skill surely and efficiently.

A still further aspect of the present invention lies in the inclusion of storing a number of practice music pieces in data form in a memory, training the student by presenting on said display device in sequence a plurality of portions of a music piece to be practiced by the student based on the stored practice music data, making an evaluation of performance skill of the student based on the performance data of the student from the electronic musical instrument, and controlling the rate of display progression of the plurality of portions of the music piece to be practiced by the student reflecting the evaluation of the practice results. Thus, the practice portions are altered one after another based on the degree of the student's mastering the practice music piece, which enables the student to securely master the respective portions of the practice subject to proceed the training. Consequently the student will master the intended skill surely and efficiently.

A still further aspect of the present invention lies in the inclusion of storing practice schedule data representing a schedule of training musical instrument performance skill of the student in a memory, also storing a number of practice music pieces in data form, and training the student by presenting on the display device matters to practice of a practice music piece in accordance with the schedule based on the practice schedule data and the practice music data. Thus, the matters to be practiced by the student are determined based on the practice schedule, which enables the student to master the performance of a musical instrument efficiently.

A still further aspect of the present invention lies in the inclusion of presenting on the display device in sequence different subjects for judgment or practice, starting time count from the presentation of each subject, making an evaluation of responses of the student to the subjects based on the performance data of the student from the electronic musical instrument, accordingly proceeding to the next subject to practice, and forcedly suspending the current presentation of each subject after the lapse of a predetermined time from the count start irrespective of the evaluation on the student's response to proceed to the next subject presentation. Thus, even if the student cannot answer or master a given subject after a long time, the next subject will be presented without staying at a particular subject. Consequently efficient judgment and training will be secured.

A still further aspect of the present invention lies in the inclusion of an accounting function for billing money charges corresponding to the time length of the computer use by the student. Thus, a computerized teaching system can serve self-training with an automatic accounting of the fees to be charged on the practice and the judgment, which will facilitate computerized money collection.

A still further aspect of the present invention lies in the inclusion of permitting the student to select a manner of tutoring musical performance, and training the student in performance of a musical instrument according to the manner of tutoring as selected by the student. In this aspect, the selection of tutoring manner is made by selecting sub-manners respectively from a plurality of manner elements, with one sub-manner from one manner element, and combining those selected sub-manners respectively from the plural manner elements, or by selecting one pattern from among prepared combination patterns of the sub-manners respectively from the respective manner elements. This provides different types of tutors having different characteristic ways of tutoring the students as usually found in the actual classes of teaching musical instrument performance. Thus, a student can chose a training manner of a computerized teacher at his or her intention or preference, which will realize a very efficient training.

A still further aspect of the present invention lies in storing plural sets of first music data each set representing a practice music piece of a first kind among a plurality thereof and plural sets of second music data each set representing a practice music piece of a second kind from among a plurality thereof, the practice music pieces of the second kind being so composed as to serve for mastering performance of a practice music piece of the first kind; selecting any of the plurality of practice music pieces of the first kind; training the student by presenting a practice music piece of the first kind; making an evaluation of practice progress; selecting any of the plurality of practice music piece of the second kind based on the evaluation of practice progress; and training the student by presenting the selected practice music piece of the second kind. Thus, an adequate practice music piece of the second kind will automatically be given to the student who may not be able to master or perform a practice music piece of the first kind well, and adequate instructions will also be given to a student who may not be able to plan a training schedule by himself or herself. This invention, therefore, helps the student in training performance of music progressively, enhancing the student's enthusiasm in training, thereby realizing an efficient training of musical instrument performance.

A still further aspect of the present invention lies in modifying the second music data representing a practice music piece of the second kind based on the practice music piece of the first kind and the evaluation of the student's progress in practice, the practice music piece of the second kind being so composed as to serve for mastering performance of the practice music piece of the first kind. Thus, an adequate practice music piece will be given to the student for mastering a practice music piece of a first kind by simply modifying a single practice music piece, even though there are prepared not so many second music data representing so many practice music piece of the second kind, i.e. sub-practice music piece. This will greatly save the memory capacity and the inputting cost for storing the second music data.

A still further aspect of the present invention lies in the provision of a machine readable medium for use in a musical performance teaching system of a data processing type comprising a computer apparatus having a display device and an electronic musical instrument connected to the computer apparatus for data communication therebetween, the electronic musical instrument being adapted for playing by a student and transmitting performance data representing the playing by the student to the computer apparatus, the medium containing program instructions executable by the computer apparatus for causing the musical performance teaching system to perform various types of teaching as mentioned in the respective aspects above. With such a medium, a student will have a self-training of musical instrument performance using a usual computer apparatus generally available in the market.

BRIEF DESCRIPTION OF THE DRAWINGS

Other objects, features and advantages of the present invention will be more readily appreciated from the following detailed description of preferred embodiments thereof when taken together with the accompanying drawings, in which:

FIG. 1 is a general block diagram of a musical performance teaching system according to the present invention to constitute a first, a second and a third embodiment;

FIG. 2 is a flow chart of a main program used in the musical performance teaching system to implement a method of the first embodiment;

FIG. 3 is relational chart showing interrelations among respective objects to be designated by the main program or by other objects;

FIG. 4 is a process chart in a table form describing the content of an initiation object;

FIG. 5 is a process chart in a table form describing the content of a lesson area determination object;

FIG. 6 is a process chart in a table form describing the content of a lesson object;

FIGS. 7(a) and (7b) in combination are a process chart in a table form describing the content of a judgment object;

FIG. 8 is a process chart in a table form describing the content of a timer object;

FIG. 9 is a process chart in a table form describing the content of an accounting object;

FIG. 10 is a flow chart of a candidate music selection routine to be executed in the initiation object shown in FIG. 4;

FIG. 11 is a fractional flow chart depicting the front portion of a note reading practice routine to be executed in the lesson object shown in FIG. 6;

FIG. 16 is a format chart of a user model data;

FIG. 17 is a format chart of a practice schedule data;

FIG. 18 is a format chart of an attribute data of a music piece;

FIG. 19 is a format chart of a practice schedule table;

FIG. 21 is a format chart of at achievement rate table;

FIG. 35 is a memory map of a attribute table in the hard disk for the third embodiment.

DESCRIPTION OF THE PREFERRED EMBODIMENTS

A. EMBODIMENT 1 a. General Construction

Figure 12:
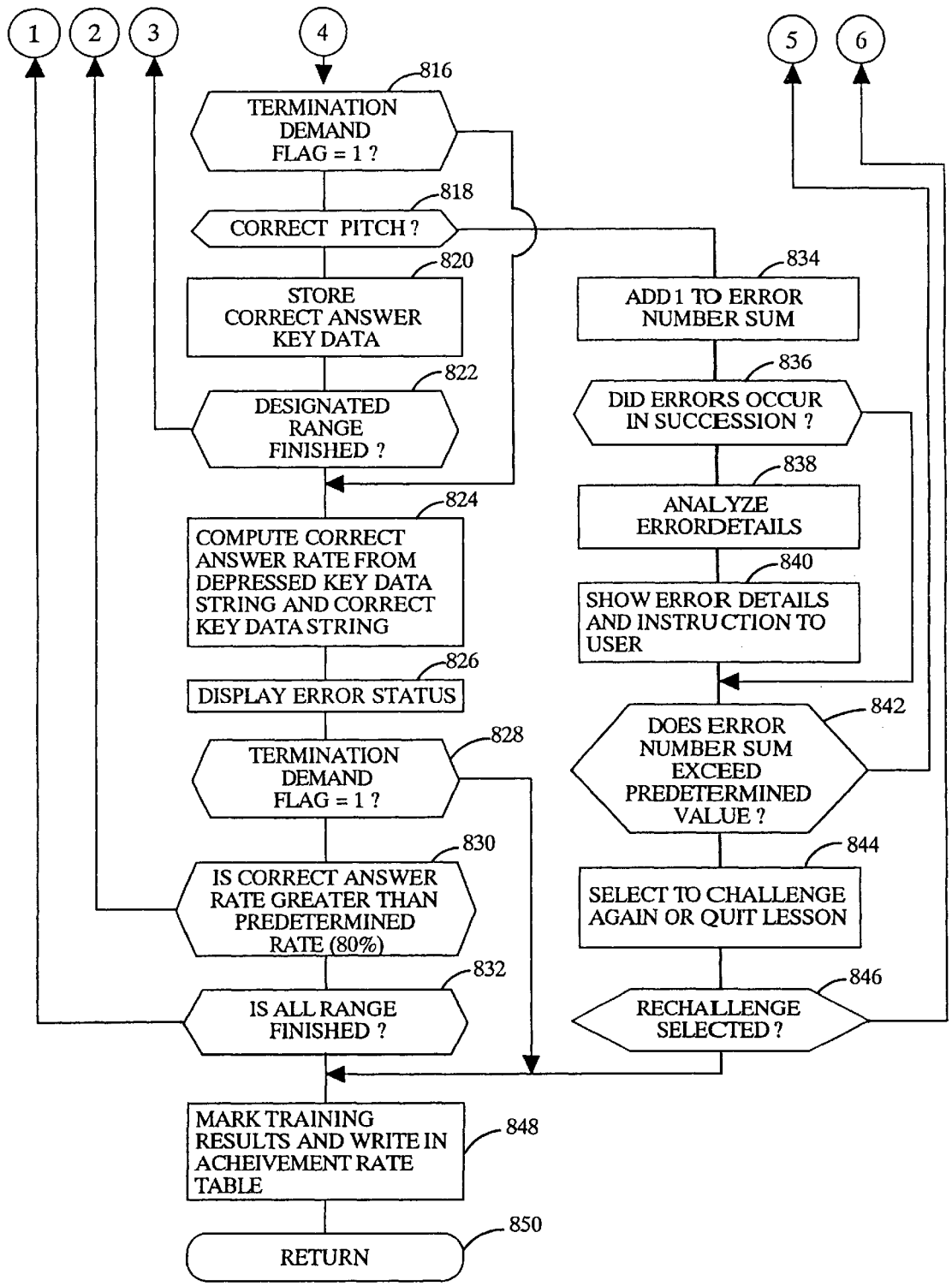
FIG. 12 is a fractional flow chart depicting the rear portion of the same note reading practice routine.

Illustrated in FIG. 1 of the drawings is a general block diagram of an example of a musical performance teaching system including a computer apparatus with a display device as a first embodiment according to the present invention. A computer apparatus includes a CPU 11, a ROM 12, a RAM 13, a keyboard 14 and a display device 15 all connected to a bus line 10 to constitute a computer main body section. The keyboard 14 is comprised of a plurality of manipulating keys (or buttons or knobs) like ten-keys and character keys for inputting data and commands and of key switches each connected to those keys to detect the actuation (or manipulation) of each key. The key switches are connected to the bus 10 via a key interface 14a. The display 15 is for the presentation or indication of musical scores, characters and the like, and is connected to the bus 10 via a display interface 15a.

The computer apparatus further includes a hard disk 16 as an internal mass storage device, which includes various memory areas such as a program memory area and a user information area. The program memory area stores programs such as shown by the flow charts and the tables in FIGS. 2, 4 through 14 to operate the computer to implement the musical performance teaching according to the present invention. In the user information memory area are stored, as shown in FIG. 15, user number data representing the number n of the users, i.e. the students (trainees) who are to use this computer device and the user information i (i=1, 2, ... n) about the respective users or students. Each user information includes user name data representing the name of the user, accounting data representing a fee charged on the user based on the time of use, user model data as will be explained later, music piece number data representing the number of the music pieces on which the user is practicing, and practice music data 1 or 2 as will be explained later.

The user model data consists, as shown in FIG. 16, performance talent data including note reading skill data and playing skill data and representing the overall performance talent (ability) of the user (the student), and personal tendency data representing the tendency. The performance talent data about the note reading skill include those data representing the respective skill in the correctness (accuracy) and speed of reading natural notes and sharp notes respectively in a monophonic melody and in a polyphonic melody, and those data representing the respective skill in the correctness and speed of recognizing the clefs such as a G clef, an F clef and a C clef and the key signatures with sharps and those with flats. The performance talent data about the playing skill include those data representing the respective skill in the uniformity of fingering strength of key depression, agility of key depression, finger extensity at key depression, directional adaptability at key depression, correctness of sharp-key depression respectively for single note depression and for chord depression, respectively by the right hand and by the left hand, and also include those data representing collaboration of both hands, i.e. how well the fingers of both hands work in combination to perform music. The data representing these performance skill are expressed by points with 100 as a full mark. The data on personal tendency consists of such data as represent as user's preference of music, user's wishes in regard to the lesson to take, and user's character, and are expressed in an arbitrary (free) format.

The practice music data 1 and 2 are data pertaining to the music pieces being presented for practice, each containing music title data, practice schedule data, score data, performance data, fingering data and attribute data as shown at the right column in FIG. 15. If the student is practicing only one music piece, there is only one practice music data prepared, and if the student is practicing plural music pieces concurrently, there are as many practice music data as the number of the music pieces. FIG. 15, the middle column, is the case where two music pieces are under practice by the student as an example.

The music title data is to identify the title of the music for practice. The practice schedule data includes, as shown in FIG. 17, the areas of practice matters to have a training on (such as scale practice, and playing practice with the right hand, the left hand and the both hands in various tempos), and the plans and records with respect to the respective practice areas such as the dates of practice, the rates of success in practice, the approvals of practice finish, the time estimated (scheduled) for practice, the time actually consumed for practice by the student. The score data includes image data for visually displaying the notes and the rests on staves (five parallel lines) of the music piece on the display device 15. The performance data includes tempo data indicating the performance tempo of the music piece and data representing the musical progression as determined by the pitch and the duration of the respective notes and by the duration of the rests. The fingering data includes the data indicating the hand and the finger to use for depressing the key with respect to the respective notes of the music piece. The attribute data includes, as shown in FIG. 18, data representing the requisite levels (in points per 100 for the full mark) with respect to the respective skills to perform the music piece such as note reading skill and playing skill, and data representing the standard times for mastering the respective practice areas (shown in FIG. 17) on the music piece.

Now back to FIG. 1, to the bus 10 is connected an inner database 17 constituted by a mass storage hard disk of a very large capacity via a music piece data interface 17a. The inner database 17 is for recording music piece data of a number of music pieces necessary for the practice of musical instrument performance. Each of the music piece data includes music title data, music score data, music performance data, fingering data and attribute data as mentioned before with reference to FIG. 15. Also to the bus 10 is connected a communication interface 18 to connect to the public telephone line or to the leased line. The communication interface 18 is for inputting necessary music piece data from an external database 21 storing music piece data of lots and lots of music pieces provided externally from the teaching system of this invention. The communication interface 18 is also available for the communication with host computers provided outside this system.

Also connected to the computer apparatus are disk drivers 23a and 24a connected to the bus 10, which drivers serve to write and read data and programs into and out of a flexible disk 23 and a compact disk 24, respectively. The flexible disk and the compact disk are also for the external storage device, and the programs of FIGS. 2 and 4 through 14 are recorded in those disks beforehand and will be installed into the hard disk on the occasion of operating the teaching system of this invention. These disks 23 and 24 can also be used to record music data of the practice music pieces beforehand and then to transfer the data into the internal database 17, or can be used to record various data relating to the music performance training and then to transfer the data to the hard disk 16, or to store various data from the hard disk 16.

Further, an electronic musical instrument 25 for the student's performance practice thereon is to be connected to the bus 10 via a musical instrument interface 25a. In this instance, the electronic musical instrument 25 is, for example, of a keyboard type, and comprises a keyboard including a plurality of playing keys to designate the pitches of the notes in the music, a plurality of key switches each for detecting the depression and the release of each key, a plurality of key touch detection circuits each for detecting the key touch (key depressing strength or speed) of each key, musical tone controls (knobs or other manipulators) for designating the tone color (timbre) and the tone volume (intensity) of the musical tones to be produced, a plurality of tone control switches each for detecting the manipulation of each tone control, and a musical tone signal forming circuit for forming (generating, producing) musical tone signals, thereby outputs musical tone signals according to depressions and releases of the keys and manipulations of the musical tone controls.

A musical performance teaching system constructed as mentioned above will be brought into operation by the CPU 11 executing the programs stored in the ROM 12 and/or in the hard disk 16 as mentioned above. Before operating the teaching system, the whole or a part of the above-mentioned programs stored or memorized in the flexible disk 23 or the compact disk 24 will be installed in the hard disk 16, and also the music piece data stored in the external database 21, the flexible disk 23 or the compact disk 24 will be transferred to the internal database 17 using some installing program or transferring program, although not shown in the drawings.

b. General Operation

With the musical performance teaching system as constructed as above, the user or student renders the initiation of a main program of FIG. 2, then the CPU 11 starts to execute the main program at step 100 and firstly an initializing process at step 102.

In step 104, an initiation object program (of an object-oriented programming type) is executed as its detail described in FIG. 4 to prepare for the performance practice by the student. In the preparation for the performance practice, in case of a registered student, user names (the names of the students) are listed on the display device 15 based on the user name data contained in registered user information to be selected by the student. In case of a new student, the student will be asked to input his or her name using the keyboard 14 and also asked to declare his or her own performance skill by selecting from among the user levels (beginner/middle/advanced) displayed on the display device 15. The student will enter the user level using the keyboard 14. The initiation object program 200 (FIG. 4) as executed will call a judgment object, which in turn judges the user level of the student as its details described in FIGS. 7(*a*) and 7(*b*) in combination.

In the step of the user level judgment, plural kinds of practice subjects will be given on the display device 15 in sequence for judging various items on the performance skill as described in FIG. 16, the subjects being so determined as to meet the level of the student's declaration. The student will respond to (answer) the given subjects one after another using the keyboard 14 or the electronic musical instrument 25, while the computer will judge the student's skill with respect to the various subjects based on the student's responses (answers). The results of the judgment are temporarily stored in the RAM 13, and are also compared with the declared user level. If the computer judgment and the self-declaration are not different greatly, the results of the computer judgment will be written in the hard disk 16 as user model data together with the user name constituting a part of the user information. If the judgment and the declaration are different greatly, the computer will adjust the declared level and continue the skill judgment further. As the judgment is made about the various areas (items) of the performance skill based on the actual skill of the student as explained above, the judgment results finally obtained will be very accurate. During this judgment process, a timer object program (shown in FIG. 8) is also executed to administer the time for judgment, so that the time for judgment may be prolonged depending on the intermediate results, or may be truncated (cut off) after the lapse of a predetermined time from the start of judgment irrespective of the judgment results to proceed to the next item of judgment. In this way, the judgment will neither stay at a certain item (matter) nor be suspended unwillingly in the middle of the judgment process due to the time administration, thereby securing an efficient and useful judgment of the student's skill with respect to various areas of performance skill.

When the student continues to practice the same practice music piece as before, the program should proceed to the next step 106 to determine the lesson area to practice as will be described later. When the student selects a new practice music piece, the initiation object program (FIG. 4) should be continued to query (ask) the student about a request piece of music for practice using the display device 15. The student then inputs his or her requests or wishes from the keyboard 14. Then the execution of a candidate music selecting routine (FIG. 10) queries the student about the area of skill to practice via the display 15, and the student answers the question using the keyboard 14. The computer then selects several practice music pieces from among the internal database 17 in accordance with the user model data representing the above-mentioned judgment results and with the above-mentioned user's requests, and displays them on the display screen 15. The user selects one of the listed practice music pieces through keyboard 14. The computer next compares the attribute data among the music data concerning the selected practice music piece with the content of the user model and indicates on the display 15 hard performance portions for the student of the practice music piece and the times of practice on those portions, and queries the student whether he or she would take this one to practice. In case the student rejects to take this one, the selection from among several suggestions will be repeated from the step of displaying another several practice music pieces. Usually only one piece of practice music will be determined and taken, but more than one can be taken for practice by the student. As mentioned heretofore, the music piece to practice is to be determined depending on the user's level of performance skill in consideration of the user's requests or wishes, and therefore the determined practice piece of music is very adequate for the student and also the student will enjoy practicing such a music piece with pleasure.

After the practice piece of music has been thus determined, a schedule of practice is made with respect to the determined music based on and in accordance with the performance skill represented by the user model data. The schedule is displayed on the display device 15 together with queries about the user's requests or wishes on the practice schedule. The student will input his or her wishes from the keyboard 14, and then the schedule will be modified or adjusted partly according to those wishes and be finally stored in the hard disk 16 as a part of the user information for the practice schedule data. In this way, the practice schedule is determined on the selected piece of practice music depending on the user's performance skill and the user's requests or wishes, which enables the student to have a performance practice (training of musical instrument performance) with pleasure and without difficulty as described further herein below.

Again coming back to the main program of FIG. 2, the computer apparatus executes, in step 106, a lesson area determination object (detain in FIG. 5) to determine the necessity of warm-up, the necessity of review and the necessity of performance practice on practice subject music, and to provide a lesson schedule for the student covering such items as the warm-up, the review, the practice music and the allotted times therefor. Thus the student can have a performance practice with his or her wishes included.

At step 108, the computer successively takes out the practice stages of warm-up, review and main practice with the respective time allotments, and execute a lesson object program (FIG. 6) at step 110 of FIG. 2 to give a warm-up training, a review training and a practice music training in succession. In the performance practice of the practice music piece, time allotment for note reading practice and metronome step practice will be made, thereafter the practice music is divided into measures or phrases or else, the divided units to be practiced are displayed on the display 15 one after another, so that the student will take the note reading practice and the metronome step practice in accordance with the lesson schedule as previously made. The note reading practice is to expect and train correct depressions of the keys in a keyboard attaching weight to the skill of reading note positions (notes in the score versus the keys to depress), while the metronome step practice is to expect and train correct timings of each depression of the correct key in the keyboard giving weight to the skill of depressing the keys at correct timings (rhythm in the score versus the depression timings).

The results of the practice thus conducted as mentioned above will be evaluated and marked (in points) according to the predetermined criteria. The evaluation and the marking are made both for each practice portion and for the whole practice music piece, and if the respective marking results are not good enough, the sequential presentation of the plural practice portions or the progression of the practice following the above-mentioned practice schedule will be suspended, or the like control will be introduced in the advance rate (progressing speed) based on the marking results. As the advance rate of the practice is determined depending on to what extent the student has master the performance skill, the student can have a practice of musical instrument performance securely and efficiently. During the performance practice, the timer object program (FIG. 8) is executed to administer the practice time, so that the practice time may be prolonged according to the intermediate results, the concurrent practice subject may be suspended to proceed to the next practice subject when a predetermined time has past since the practice start, whether or not the practice with the concurrent subject has finished. In this way, the practice will neither be suspended unwillingly in the middle of the practice due to the time administration nor be retained at a certain practice subject, thereby securing an efficient training.

When the warm-up, the review and the performance practice in the scheduled areas are all finished, the computer judges such finish at step 112, and terminate the training by executing the lesson object program (FIG. 6) at step 114 of FIG. 2. In this termination process, the data regarding the evaluation and marking results and the time consumed for practice are also written in the practice schedule data, and the user model representing the user's level of performance skill is amended (adjusted, modified) based on the results of the practice. This enables an adequate judgment on the student's advancement in performance skill, and the final user level data will be useful for the further practice by the same student. The execution of this main routine is now finished at step 116 in FIG. 2.

On the other hand, during judgment and practice as explained above, a timer object program (FIG. 8) and an accounting object program (FIG. 9) are executed in parallel to charge the user or student for the time of the computer use. The charges may be different in accordance with the matters judged and the matters practiced. This facilitates charging the student an adequate amount of money for the use of the musical performance teaching system.

The first embodiment of the present invention will be described in more detail hereinbelow, with a preparatory explanation about the general concept of the object oriented program depiction and the inter-relation and association among the respective objects to start with.

The first embodiment employs object oriented programs. An object in this context means a unit of structure constituting an object oriented computer model, and more specifically each pack of processing by a program per structure unit. FIG. 3 is a relational chart showing interrelations among the respective objects executed in the first embodiment of the present invention. Execution of the main program appoints (calls, designates) the initiation object 200, the lesson area determination object 300 and the lesson object 400 in succession in the order mentioned as shown by fat hollow arrows. The initiation object 200 appoints the judgment object 500, the timer object 600 and the accounting object 700 and issues messages to the respective objects 500–700 as shown by curved arrows. The lesson object 400 appoints the timer object 600 and the accounting object 700, and issues messages thereto as shown by curved arrows. The judgment object 500 appoints the timer object 600 and the accounting object 700, and issues messages thereto as shown by curved arrows in FIG. 3. The timer object 600 appoints the accounting object 700, and issues messages thereto as shown by a curved arrow. The initiation object 200, the lesson object 400 and the judgment object 500 each issues messages to itself as shown by looped arrows. The initiation object 200 includes therein a routine for candidate music selection, while the lesson object 400 includes routines for note reading practice and for metronome step practice. The respective routines are depicted in the respective flow charts of FIGS. 10, 11, 12, 13 and 14 and will be described in detail hereinafter.

Next explained will be the manner of describing the processes executed in the respective objects. In this first embodiment, the specific processes executed by the program in each object are described by a process chart in a table form to avoid complexity which may be derived from the usual flow chart type description. In these process charts, the left column indicates the messages issued to the object, the right column describes the specific processes to execute under each message (actions for the messages), and the middle column describes the conditions for the execution of those actions, as shown in FIGS. 4–9. The processes will be successively executed basically in the order described from up to down for the nominated message with the corresponding conditions. The actions having no condition therefor will be taken non-conditionally. In the charts, in the action columns, "O:" designates the name of the object to appoint, "M:" indicates the message to issue and an asterisk "*" indicates that a separate flow chart is provided therefor in another Figure to further describe the details of the process, for example, the candidate music selection of FIG. 4 is found in FIG. 10, the note reading practice of FIG. 6 is found in FIGS. 11 and 12, and the metronome step practice of FIG. 6 is found in FIGS. 13 and 14. The action with message statement and without object designation means to appoint the same object itself.

Herein below will be described the initiation object 200, the judgment object 500, the lesson area determination object 300 and the lesson object 400 in detail in the enumerated order. The timer object 600 and the accounting object 700 will be described in the explanation of the related objects.

c. Initiation Object

The initiation object is appointed (assigned) by the main program of FIG. 2 at step 104, and starts processing upon receipt of a message to "start practice". Beginning at step 202, the program of the initiation object 200 appoints the timer object 600 with a message to "initialize"; at step 204 appoints the accounting object 700 with a message to "initialize"; at step 206 appoints again the accounting object 700 and issues a message to "notify of the executed program" (the program under execution). This last-mentioned message of notifying of the program under execution includes a notice that this appointment (call) is from the execution of the initiation object under the message to "start practice".

As shown in FIG. 8, the timer object 600 sets at step 602 a time count value of the internal timer in the CPU 11 at an initial value "0" so that the timer starts counting elapsed time, and at step 604 the timer object 600 issues a message to "interrupt" appointing to the accounting object 700 repeatedly every predetermined time interval, e.g. one minute, based on the time count by the timer.

The accounting object 700 sets at step 702, as shown in FIG. 9, the accounting data in the RAM 13 at an initial value "0" in response to the message to "initialize" from the initiation object 200. The accounting object 700 further sets at step 704 the unit fee data in the RAM 13 at the money amount (unit price) which is predetermined corresponding to the process of the initiation object 200 under the message to "start practice" in response to the message to "notify the executed program" from the initiation object 200. And then, the accounting object 700 accumulates at step 706 the unit fee data to the accounting data in the RAM 13 in response to the message to "interrupt" from the timer object 600. The accumulation of the unit fee occurs periodically in response to the message to "interrupt" as long as the timer object issues this "interrupt" message by step 604.

Now the description comes back to the operation of the initiation object 200. After the process of step 206, the initiation object 200 issues a message to "query the user" to itself and moves to step 214 in response to the above message. The initiation object 200 then queries (asks) at step 214 the student whether the student is a registered user or a new user by displaying such a question on the display 15, and waits for an answer input from the keyboard 14. In case the student answers that he or she is a registered user via the keyboard 14, the initiation object 200 executes the step 216 and let the student simply identify the true user information in a user information storage area within the hard disk 16 using the display 15.

In case the student answers that he or she is a new user, the initiation object 200 operates the step 218 process, and secures a memory area to store a user information in the hard disk 16, instruct the student via the display 15 to input the user name and stores the user name into the above secured memory area upon the student's input of the name by the keyboard 14. Next at step 220, the display 15 asks the student about his or her level of performance skill (such as beginner/middle/advanced) by self-declaration, and the level inputted by the student using the keyboard 14 is temporarily stored in the RAM 13. The initiation object 200 next issues at step 222 a message to "judge the user level" to itself.

In response to this message, the initiation object 200 moves to step 226 to appoint the judgment object 500 issuing a message to "initiate". Together with this message, the initiation object 200 gives the judgment object 500 such condition data as represent the judgment, the self-declared user level and the predetermined judgment time (e.g. 10 minutes). The judgment object 500 presents various subjects for practice according to the declared user level, and judges the performance skill of the student on the respective items listed in the table of the user model (FIG. 16) from the aspects of note reading skill and playing skill in compliance with the user level, and temporarily stores the respective points on the respective items in the RAM 13, while the details will be described later. The initiation object 200 moves next step 228, and computes the user level (beginner/middle/advanced) based on the points obtained on the various items, the times consumed for the judgment on the respective items, and the declared user level, and thereafter issues to it self a message to "determine the user level" at step 230. The reason for employing the declared user level for computing the user level is that the subjects given to the student for judgment are to be different according to the declared user level, and the reason for letting the student declare his or her own user level is that the judgment shall be more accurate by giving the student such subjects which will meet the student's level.

In response to the message to "determine the user level", the initiation object 200 moves to step 232 to compare the computed user level with the declared user level, and in case there is a big difference between the two, it adjusts (amends) the declared user level at step 234. For example, in case the declared user level is "beginner" and the judged user level is "advanced", the declared user level will be adjusted to be "middle". Also in case the declared user level is "advanced" and the judged user level is "beginner', the declared user level will be replaced by "middle". After the process of this step 234, the initiation object 200 issues a message to "judge the user level" to itself again, and judges the level of the student again. This realizes a judgment which will be adequate for the actual skill of the student, thereby securing the accuracy of the judgment. When the computed user level and the declared user level are almost equal after one or more times of the judgment process, the step 238 computes the respective judgment results (points) corresponding to the respective items of FIG. 16 based on the points on the respective items, the time consumed for judgment on the respective items, and the declared user level in the RAM 13, and writes the data representing the judgment results into the user information storing area in the hard disk 16 to make a user model table for the student and concurrently increase the number of the users.

Next, the initiation object 200 executes step 224 to acquire associated information. In obtaining the associated information, the initiation object 200 presents on the display 15 questions about the user's preference of music, user's wishes in regard to lesson, user's character, etc., to which the student shall input answers through the keyboard 14, and this object writes those inputted information into the hard disk 16 as associated information annexed to the user model data.

The finish of this step 224 means the finish of all necessary processes under the message of "query user" in the initiation object 200 as appointed at step 208, the execution next proceeds to step 210 to issue a message to "select a practice music" to itself. Then in response to this message, the initiation object 200 go forward to step 240 and query the student whether he or she would like to practice the same piece of practice music as the preceding time or a new piece of practice music. In case the student engages the practice for the first time on this teaching system, the answer to the above question shall automatically be "a new practice music".

When the student selects a new practice music to this query, or when the student starts the practice for the first time, the initiation object 200 executes a subroutine for selecting a candidate piece of practice music at step 242. The candidate music selecting subroutine is described in FIG. 10 in detail. The initiation object 200 starts executing the subroutine at step 260 (FIG. 10) and let the student select a training purpose in the list. In this example, the initiation object 200 exhibit on the display 15 such choices as 1) to expand the repertoire, 2) to raise the level of a particular skill, 3) to raise the general level, and 4) to challenge a specific piece of music. The student will enter the choice from the keyboard 14. When the answer is 2), the initiation object 200 executes step 262 to further ask the student about the specific skill to improve by presenting specific items in the user model table such as rhythm practice and left hand practice on the display 15 and have the student select a specific purpose from the list. When the answer is 2) or 3), step 263 will computes the improvable level range by the practice of one piece of music based on various data in the user modal table, especially on data of the user's character stored in the hard disk 16. Next, the step 264 computes a goal level value of each item in the user model data table based on the above computed improvable range, and stores it in the RAM temporarily.

At step 265, the subroutine searches from among the database 17 music data of a candidate piece of practice music which requires higher performance skill (note reading skill and playing skill) than the computed goal level and meets the student's training purpose based on the respective goal levels for the respective items and on the purpose of practice selected at steps 261 and 262 with reference to attribute data (FIG. 18) in the music data in the internal database 17. The step 266 displays the titles of the searched candidate music pieces on the display, and the step 267 have the student select one from them using the keyboard 14. Then the step 268 reads out the attribute data in the music data for the selected title from the inner database 17, and the step 269 compares the respective goal levels for the respective items in the user model computed above with the requisite levels for the respective items in the attribute data, and displays items having a big difference between the former and latter levels for each item. And in step 270, the subroutine computes the time necessary to clear the goal level for each item based on the level difference on each item in accordance with the predetermined standards, displays in step 271 the computed time as the estimated training time on the display 15.

Step 272 is to query the student whether he or she accepts the thus selected piece of practice music using the display 15. If the student answers that the selected music is acceptable using the keyboard 14, step 273 terminates the execution of this candidate music selecting subroutine. If the student answers "not acceptable" to this query, the subroutine goes back to step 266 to show plural candidate pieces of music on the display 15, and resumes the determination of the selected music through steps 267–272.

After the execution of the candidate music selecting subroutine, the initiation object 200 reads out at step 244 all contents of the music data relating to the selected practice music from the internal database 17, and writes into the RAM 13 and the hard disk 16, and then at step 246 drafts a practice schedule on the RAM 13. In drafting the practice schedule, step 246 determines the items which the student should practice on from among a number of prepared practice items (matters) as shown in FIG. 17 based on the respective level differences computed above, and computes the times estimated for the respective items. The table of FIG. 17, however, is left blank with respect to the date of practice, the success rate, the approval of finish and the time consumed for afterward fill-in.

Step 248 is to display the above drafted practice schedule on the display 15, and step 250 is to query the student about wishes or requests on the practice schedule drafted above. Then, if the student has some wishes or requests, the draft practice schedule is modified based on such wishes or requests before the program proceeds to step 254, and if the student has no wish or request, the program proceeds directly to step 254. In step 254, the draft practice schedule is stored in the memory location corresponding to the user name within the user information memory area in the hard disk 16 as practice schedule data.

If the music piece under practice has been selected as an answer to the query of step 240, the program skips to step 256 to read out from the hard disk 16 the practice music data within the user information corresponding to the user name inputted at step 218 before, which data in turn is written in the RAM 13. But in case there are plural practice music pieces, the display 15 indicates such a fact for the student to select one of them, and the selected practice music data is written in the RAM 13.

d. Judgment Object

Now description will be made about the judgment object 500 (FIGS. 7(*a*) and 7(*b*)) which is executed according to the appointment by step 226 in the initiation object 200. By the process of step 226, a message to "initiate" is issued together with condition data indicating "judgment", and sent to the judgment object 500. The user level data representing the self-declared user level and the time data representing the judgment time are also sent to the judgment object 500.

The judgment object 500 executes processes of steps 508–512 based on the above condition data after the processes of steps 502–506. The process of step 508 is to make respective judgments on the single note reading skill, the multiple note reading skill and the clef reading skill by self-appointing the judgment object and issuing a message to "initiate" with data indicating note reading skill judgment as the condition data to execute the processes of steps 514–532. The process of step 510 is to make judgments on respective key depression skills including single key depression and multiple key depression by the right hand and the left hand, alone or both by self-appointing the judgment object and issuing a message to "initiate" with data indicating performance skill judgment as the condition data to execute the processes of steps 534–568. The process of step 512 is to make judgments on the skill of understanding various expression signs (marks) for designating performance manners (these are parts of the note reading skill). After the end of each judgment by such a set of processes (steps) falling under each condition, the judgment object goes to step 570 to execute steps 570 and 572 in succession. In the object oriented programming, when a certain condition is provided, only those steps that fall under the said certain condition are executed, and no steps which are covered by other conditions will be executed, whereas steps not covered by a condition are executed from top to bottom non-exclusively as long as they are within the group of the designated message or event. The above-mentioned steps 502–506 will be executed every time the judgment object 500 is self-appointed for the respective judgments.

In step 502, the time given to an upper level grouping item of judgments represented by the time data concurrently sent with the message to "initiate" will be further allotted among respective lower level items of judgments. For example, when the judgment object 500 is appointed by the initiation object 200, the total time (e.g. 10 minutes) given to judge the student may be allotted among the respective judgments on the note reading skill (e.g. 4 min), the performance skill (e.g. 4 min) and the expression sign understanding skill (e.g. 2 min). When the step 508 issues a message to "initiate" with note reading judgment data as the condition data, the time (e.g. 4 min) allotted for the note reading judgment may be further shared among the single note reading skill judgment, the multiple note reading skill judgment and the clef reading skill judgment by, for example, 2 min, 1 min and 1 min respectively.

Step 504 issues a message to "notify the execution program" to the accounting object 700. With this message, data representing the judgment item is also sent to the accounting object 700. Upon receipt of these data, the accounting object 700 sets the unit fee data in the RAM at a predetermined amount of money corresponding to the designated judgment. Therefore, the unit fee which corresponds to the ongoing judgment is accumulated on to the accounting data every time a predetermined time lapses under the timer.

Step 506 issues a message to "set" to the timer object 600. Concurrently sent to the timer object 600 is the data representing the time allotted to the next judgment. In response, the timer object 600 (FIG. 8) stores the data representing the above-allotted time at its step 606, and issues a process termination request message to the object of the preceding message source (in this instance, the judgment object) after the lapse of the above-allotted time. For example, in case the step 514 has issued a message to "initiate" with the single note reading skill judgment data as a condition data, the timer object 600 issues a process termination request message to the judgment object 500, if the judgment on the single note reading skill has not finished yet even after the lapse of the time allotted to the judgment on the single note reading skill.

If the respective judgments on the single note reading skill, the multiple note reading skill, the clef reading skill; the single key depression skill and the multiple key depression skill by each of right hand and left hand; the rhythmic expression skill; the both hand play skill; and the music expression sing understanding skill finish all within the respectively allotted times, the judgment object 500 executes the process of step 570 after each judgment. The step 570 issues a message to "release" to the timer object 600. In response to this release message, the timer object 600 (FIG. 8) clears the above-mentioned setting for issuing the process termination request message at step 608. In this instance, therefore, the process termination request message will not be issued. If some amount of time is left unconsumed out of the amount issued for the present judgment, then at step 572, the judgment object 500 gives or saves the remaining amount of time for the later judgments. In such a situation, the remaining time may be added only to one succeeding judgment, or may be shared appropriately among the plural judgments made afterward.

If the respective judgments have not been finished within the respectively allotted times, the timer object 600 issues at step 606 a process termination request message to the judgment object 500. Responsive to the issuance of this message, the judgment object 500 will execute the process of step 574 or step 578 depending on whether the data representing the intermediate judgment results on the presently judging items are in the RAM 13. If there are some intermediate judgment results, step 574 saves such intermediate judgment results as they are and step 576 forcedly terminates the ongoing judgment process to proceed to the next processing. If there is no intermediate judgment, step 578 sets a time extension, step 580 issues a set message to the timer object 600 together with the time data representing the extended (elongated) time, and step 582 sets a termination demand flag in the RAM 13. With this flag, the timer object 600 sets the extended time period for the time designated for the process of step 606 before. And if the result of the ongoing judgment process is obtained within the elongated time period, the processing go forward to the next judgment as mentioned before.

If any judgment result is not obtained within the elongated time period, the timer object 600 issues a process termination demand message again. But in this situation, the termination demand flag has been set by step 582, and therefore the judgment object 500 stores temporarily the minimum point as prepared (e.g. zero mark) in the RAM 13 as the result of the judgment at steep 584. Then step 586 clears the termination demand flag.

d-1. Note Reading Skill Judgment

Hereinbelow is an explanation about the judgment of the note reading skill of the student. Being supplied with the message to "initiate" together with the condition data meaning the judgment from the initiation object 200 (at step 226), the judgment object 500 starts at event "initiate" from its beginning and executes steps 502–506. After these steps, the judgment object 500 moves to step 508 and issues to itself a message to "initiate". With this message, data representing the note reading skill judgment is also sent as the condition data, and further sent are data representing the user level (beginner/middle/advanced) and time data representing the time allotted for the note reading skill judgment as described in step 508. According to the initiation message (i.e. message to "initiate") by step 508, the processing passes through steps 502–506 and executes step 514 as designated by the condition data "note reading skill" issued at step 508. At step 514, the judgment object 500 issues an initiation message to itself again with condition data meaning "single note reading skill" as well as data about the user level (beginner/middle/advanced) and data showing the time allotted for the judgment on the single note reading skill. According to the initiation message by step 514, the processing passes through steps 502–506 and executes step 520 as designated by the condition data "single note reading skill" issued at step 514.

In step 520, a succession of single musical notes (arranged to constitute a monophonic music progression) consisting of only natural notes (notes not sharped or flatted) as prepared previously is shown on the display 15. The student reads the displayed notes and successively depresses the keys on the connected electronic musical instrument 25 corresponding to the notes shown on the display. The judgment object 500 compares the depressed keys with the displayed notes (the notes succession) and stores the accuracy (correctness) of the key depression temporarily in the RAM 13 as the judgment results on the natural note reading skill. Next in step 522, the judgment object 500 shows on the display 15 another monophonic succession of notes including accidental notes (notes sharped or flatted) as prepared previously. Responsive to the student's practice similar to the above-mentioned practice, the accuracy of the key depression with respect to accidental notes is temporarily stored in the RAM 13 as the judgment results on the accidental note reading skill. The judgment object 500 next goes to step 524 to show on the display 15 a monophonic succession of notes and rests of various lengths (duration) such as quarter notes, eighth notes, quarter rests and eighth rests in mixture as previously prepared, and upon practice by the student, judges the rhythm reading skill by comparing the student's key depressing timings with the lengths of the shown notes and rests, and stores the judgment results in the RAM 13. In order to make the judgment more accurate, the successions of notes and rests shown on the display would vary from easy one to difficult one according to the user level data varying from beginner to advanced.

After step 524, which means all of the steps under the condition of "single note reading skill" have been followed, the judgment object 500 goes through non-conditioned steps 570 and 572, and goes to the next (to 514) step 516 and executes the process of step 516. At step 516, the judgment object 500 issues an initiation message to itself again with condition data meaning "multiple note reading skill" as well as data about the user level (beginner/middle/advanced) and data showing the time allotted for the judgment on the multiple note reading skill. As explained above, when the judgment object 500 execute a process step which appoint itself to go into the judgment of an item in a lower logical level, it issues condition data to designate a particular group of steps for judging the skill of the designated item. In addition to the condition data, it always issues user level data and time data also. Therefore, for the simplicity's sake, description of such data transmission will be omitted in the following to avoid redundancy in explanation. Also in the various judgments herein below, subjects to be presented to the student for practice will vary in accordance with the user level data, but such mention will also be omitted. But in the drawings, such descriptions are included in the steps shown in the object program list.

According to the initiation message issued by step 516, the processing passes through steps 502–506 and executes step 526 as designated by the condition data "multiple note reading skill" issued at step 516. This step is to judge the skill of the student in reading multiple notes is same as the above-mentioned judgment on single note reading skill except that the number of the keys to be depressed at a time is plural as contrast to single, and therefore detailed description will also be omitted.

After step 526, the judgment object 500 goes through steps 570 and 572 to end the processing under command by step 516, and moves to step 518 and executes step 518. At step 518, the judgment object 500 issues an initiation object to itself with a condition data meaning "clef reading skill". In response to this initiation message, the judgment object 500 goes through steps 502–506 and starts processing of steps 528–532 falling under the condition "clef reading skill" as nominated by the condition data "clef reading skill" given at step 518.

Step 528 is to judge the skill of reading G clef (to read G clef means to read notes on the staff with a G clef) and displays on the display 15 a succession of notes and rests written in the G clef staff as previously prepared including jumps between notes. The student reads the notes on the display 15 and depresses the keys on the electronic musical instrument successively corresponding to the notes displayed. The judgment object 500 compares the depressed keys with the displayed notes and temporarily stores accuracy in the RAM 13 as a judgment result of G clef reading skill. Next in step 530 and step 532, similar processes of clef reading skill judgment take place respectively with respect to the F clef staff and the C clef staff. After steps 530 and 532, the processes of steps 570 and 572 take place, and the judgment of clef reading skill as designated by step 518 comes to an end, which means the end of the judgment of note reading skill as designated by step 508.

d-2. Performance Skill Judgment

Now the description is on the judgment of performance skill. After the above-mentioned judgment of note reading skill ends, the judgment object 500 goes forward to step 510, where it issues a message to "initiate" with condition data meaning performance skill judgment. In response to this initiation message, the judgment object 500 starts at the top of the event group "initiation", i.e. step 502 and proceeds steps 504 and 506, and then goes to step 534 which is the top step within the condition group "performance skill". At step 534, the judgment object 500 issues a message to "initiate" with condition data meaning key depression judgment. In response to this initiation message, the judgment object 500 proceeds through steps 502–506 to the condition group "key depression" and executes step 540 which is for commanding judgment on right hand skill. At step 540, the judgment object 500 issues a message to "initiate" with condition data representing right hand skill judgment. In response to this message, the judgment object 500 goes through steps 502–506 to step 544 which is the top step in the condition group of "right hand" and executes this step 544. At step 544, the judgment object 500 issues a message to "initiate" with condition data meaning single key depression judgment. In response to this, the judgment object 500 goes through steps 502–506 to step 548 which is the top step in the condition group of "single key depression" and executes this step 548, and then steps 550 and 552.

The process of step 548 is to judge the uniformity of fingering strengths by presenting on the display 15 a succession of notes with dynamics such as p, mf and f. The student depresses the keys on the electronic musical instrument 25 in accordance with the displayed notes and dynamics. The step 548 compares the key touches by the student with the dynamics of the succession of notes on the display 15 and judges the uniformity, and stores the judgment result temporarily in the RAM 13. The process of step 550 is to judge the agility, i.e. how fast tempo the student can perform. The display 15 shows on the screen an easy succession of notes in various tempo. The student depresses the corresponding keys, and the computer compares the depressed keys with the displayed notes to judge the agility from the accuracy of key depressions and stores the judgment result temporarily in the RAM 13. The process of step 552 is to judge the directional adaptability with respect to the ascending succession of notes and to the descending one. The note succession presented on the display 15 includes ascending progressions and descending progressions requiring some cross-passing of a finger under other fingers. The student depresses the keys on the electronic musical instrument 25 reading the displayed notes on the screen. The accuracy between the depressed keys and the displayed notes, especially at turning points of the ascending and descending progressions is judged as the directional adaptability, and the judgment result is stored temporarily in the RAM 13. In these judgments mentioned in this paragraph, the displayed succession of notes is a monophonic succession, i.e. a succession of single notes.

When the judgment on the single key depression by steps 548–552 is finished, this is the finish for the single key depression by the right hand as called from step 544, and the judgment object 500 goes through steps 570 and 572 to step 546 for the multiple key depression by the right hand. At step 546, the judgment object 500 issues an initiation message to itself with condition data meaning multiple key depression (by the right hand). In response to this initiation message, the judgment object 500 executes steps 502–506 at the top of the event group of "initiate", and then processes steps 554 and 556 according to the condition data of multiple key depression. The process of step 554 is to judge the uniformity of fingering strengths in multiple depression of the keys, and therefore displays on the screen multiple notes to constitute a chord and the finger numbers for the respective notes, one chord after another in succession. The student depresses the keys of the electronic musical instrument 25 following the exhibition of the notes on the display 15. The computer detects the key touches of the respective keys (i.e. fingers) and examines the uniformity of the fingering strength for multiple depression, and stores the result of the judgment temporarily in the RAM 13. The process of step 556 is to judge the finger extensity meaning how wide (to what span) the fingers of one hand can reach simultaneously, and therefore shows on the display 15 plural notes whose pitches are apart from each other and the finger numbers to use for such depression, and judges whether the student can depress such keys on the electronic musical instrument 25 and stores the result temporarily in the RAM 13.

After these steps 554 and 556 finish, the judgment object 500 moves through steps 570 and 572 to step 542 for the left hand designation. At step 542, the judgment object 500 issues a message to "initiate" to itself with condition data meaning "left hand" within "key depression". In response to this initiation message, the judgment object 500 proceeds through steps 502–506 and executes step 558 for the judgment on the right hand. The process of step 558 is expressed in an omitted form, but should be understood to include and execute similar steps like the above-mentioned steps 544–556 for similar judgment but on the left hand. Thus, judgment on key depression skill with respect to the left hand is judged and the result is stored temporarily in the RAM 13 just as in case of the right hand.

When this step 558 is finished, it means that the various intended judgments about key depression is over, and therefore the judgment object 500 goes through steps 570 and 572, and executes step 536 for the judgment about rhythm. At step 536, the judgment object 500 issues to itself a message to "initiate" together with condition data meaning the rhythm judgment. In response to the initiation message, the judgment object goes to steps 502 and processes through steps 502–506, and executes the judging process of steps 560–564. The process at step 560 is to judge the skill of rhythmic expression of quadruplet family, and displays on the display 15 a succession of notes in quadruplet family rhythm. The student depresses the keys on the electronic musical instrument 25 in accordance with the displayed notes. The computer judges the accuracy of the key depression timings as compared with the displayed notes and stores the result temporarily in the RAM 13. The process at step 562 is same as step 560 except the quadruplet rhythm is substituted by triplet rhythm. The process of step 564 is to judge the skill on the rhythmic expression of anomalous rhythms such as syncopation and displays on the display 15 a succession of notes including anomalous rhythms. The student depresses the keys on the electronic musical instrument 25 in accordance with the displayed notes. The computer judges the accuracy of the key depression timings as compared with the displayed anomalous rhythms and stores the judgment result temporarily in the RAM 13.

After the process of this step 564, the judgment object goes through steps 570 and 572 and finishes the performance skill judgment on rhythmic expression as commanded by step 536, and moves to step 538. In step 538, the judgment object 500 issues a message to "initiate" with condition data representing "both hand play". In response to this initiation message, the judgment object 500 processes through steps 502–506 and then executes steps 566 and 568 for judgment on the skill of playing with both hands. The process by step 566 is to judge how the player can perform the musical instrument using both hands in association or combination, and shows two successions of notes for the right and left hands on the display 15. As the student plays those successions using both hands on the electronic musical instrument 25, the computer judges the accuracy of key depressions and stores the judgment result temporarily in the RAM 13. Thereafter, the judgment object 500 executes steps 570 and 572 and finishes the performance skill judgment on both hand play as commanded by step 538, and finishes the judgment with respect to performance skill under the condition group of "performance skill" (steps 534–538) as appointed by steep 510.

d-3. Expression Marks Comprehension Judgment

The following is the description about the judgment on the skill of comprehending (understanding) expression marks such as crescendo and diminuendo. After finishing the above-explained performance skill judgment, the judgment object 500 go forward to step 512 to operate the judgment on the skill of comprehending expression marks. In this judgment, the display 15 shows to the student such expression marks as crescendo and diminuendo with answer choices explaining the meanings of the marks, and let the student chose the correct answers via the keyboard 14. The computer computes the rate of correct answers and stores the judgment result temporarily in the RAM 13. Then the judgment object 500 passes through steps 570 and 572, and finishes the judgment on expression marks understanding.

e. Lesson Area Determination Object

The detailed description will be hereinbelow made about the lesson area determination object 300 with reference to FIG. 5. The lesson area determination object 300 is appointed by step 106 of the main program of FIG. 2, and starts its processing upon receipt of a message to "initiate provision" by presenting a query about the necessity of a warm-up and a query about the necessity of a review respectively according to steps 302 and 304. The student will input the answers from the keyboard 14. Next in step 306, the process is to provide a practice schedule table for this time on the RAM 13 based on the answered necessity of warm-up and review and on the practice time in the lesson schedule data which is stored in the hard disk 16 according to the predetermined criteria. The practice schedule table is a time allotment for the now-intended practice areas of warm-up, review and performance practice on a practice music piece in the lesson schedule to determine the style of lesson as shown in FIG. 19. In case answers to the queries about the necessity of warm-up and review are both "unnecessary", the times allotted to them are both "zero", and the lesson style includes only the lesson area of performance practice on the practice music piece.

The lesson area determination object 300 then goes forward to step 308 to display on the display 15 the contents (time allotment for each area) of the practice schedule table thus provided and to step 310 to query the student about his or her wishes or requests with respect to the contents of the practice schedule table through the display 15. The student is to answer those queries, and the computer will modify (amend) the contents of the practice schedule table in accordance with such wishes, thereby finishing the processing of the lesson area determination object. If the student accepts the practice schedule shown on the display 15, the table will not be modified.

f. Lesson Object (Initiation and Demanding Process Termination)

Next, the description is on the lesson object 400 (FIG. 6) which is appointed by step 110 of the main program of FIG. 2. When step 110 issues a message to "initiate" with any one of the condition data of warm-up, review and practice on a music piece, the lesson object 400 start with its step 402 and issues a message to "notify the execution program" to the accounting object 700. In this instance, the lesson object 400 sends the data meaning that a lesson is going to take place now to the accounting object 700. Responsive thereto, the accounting object 700 sets the unit fee data in the RAM 13 at a money amount predetermined for the lesson at step 704 in the same way as described before. This means that the accounting object 700 is to accumulate the unit fee amount corresponding to the lesson on to the accounting data (charging data) every time the timer object 600 counts the lapse of a predetermined time.

The lesson object 400 goes to step 404 and issues a message to "set" to the timer object 600. Concurrently, time data representing the allotted time as shown in the table of FIG. 19 is also sent to the timer object 600 depending on the condition taken from among warm-up, review and practice on music piece. In response to the set message, the timer object 600 executes step 606, and memorizes the time data thus sent, and after the lapse of the time represented by this time data, issues a message to "demand process termination" to the source object, i.e. the lesson object 400.

After the process of step 404, step 406 will take place if the given condition data is of a warm-up. In case the condition data of a review is given, the step 408 is to take place. In case the condition data of a practice on a music piece is given, steps 410–418 executes the practice process on a practice music piece.

Step 406 presents on the display 15 a simple succession of notes (e.g. a succession of notes consisting of a notes row of simply ascending pitches or of simply descending pitches) with an instruction for the student to perform in accordance with the displayed succession of notes. The student will engage in the performance of the displayed notes on the electronic musical instrument 25 for the period of time allotted for the warm-up. Step 408 extracts a part of the contents of the practice schedule data (FIG. 17) of the previous occasion and displays them on the display 15. The student will engage in the performance of the displayed notes on the electronic musical instrument 25 for the period of time allotted for the review.

Step 410 is to further share the time which is allotted for the practice with the practice music piece and re-allot for the respective practice items of the lower logical level i.e. the note reading practice and the metronome step practice. The lesson object 400 issues a message to "initiate" with the condition data of "note reading practice" to itself. In response to this message, the process goes through steps 402 and 404, and goes to step 416 as designated by the condition data. Step 416 gives the student a note reading practice following the flow charts of FIGS. 11 and 12. After the process of the note reading practice, the program goes through steps 420 and 422 and goes to step 414, which is next to step 412. In step 414, the lesson object 400 issues a message to "initiate" with condition data representing "metronome step practice" to itself. In response to this initiation message, the lesson object 400 goes through 402 and 404 and goes to step 418 as designated by the condition data. Step 418 gives the student a metronome step practice following the flow charts of FIGS. 13 and 14. The note reading practice and the metronome practice will be described in more detail later.

After the above-mentioned processes of the warm-up, the review and the music piece practice (including the note reading practice and the metronome step practice), the lesson object 400 issues a message to "release" to the timer object 600 at step 420 and adjusts the timer schedule at step 422. In case of the warm-up practice or the review practice, these practices will take place only for the time periods allotted thereto, and consequently the above-mentioned "set" process and "timer schedule adjusting" process are simply meaningless. But in case of the practice on the practice music piece, those "set" and "timer schedule adjusting" processes are meaningful as they are in case of the previously described judgment object 500. Namely, if the respective practices on the practice music piece finishes within the respectively allotted time periods, the "set" status of the timer object 600 will be released at step 420, and the remaining time amount will be added to the succeeding practices at step 422.

But in case the respective practices with the practice music piece does not finish even after the lapse of the allotted time, the timer object 600 appoints the lesson object 400 and issues thereto a message of process termination demand. In response to this message, the lesson object 400 executes either step 424 or step 428 depending on whether the intermediate evaluation results (marked points) on the presently practicing matters exist in the RAM 13 or not. If such intermediate evaluation has been issued and is existing in the RAM 13, step 424 keeps the intermediate results as they are, and step 426 forcedly terminate the ongoing practice to go forward. If such intermediate evaluation has not been issued and is not existing in the RAM 13, step 428 sets the time of extention and step 430 appoints the timer object 600 and issues thereto a message to "set" with data representing the extended time, and finally step 423 sets a termination demand flag.

f-1. Note Reading Practice

Figure 20:
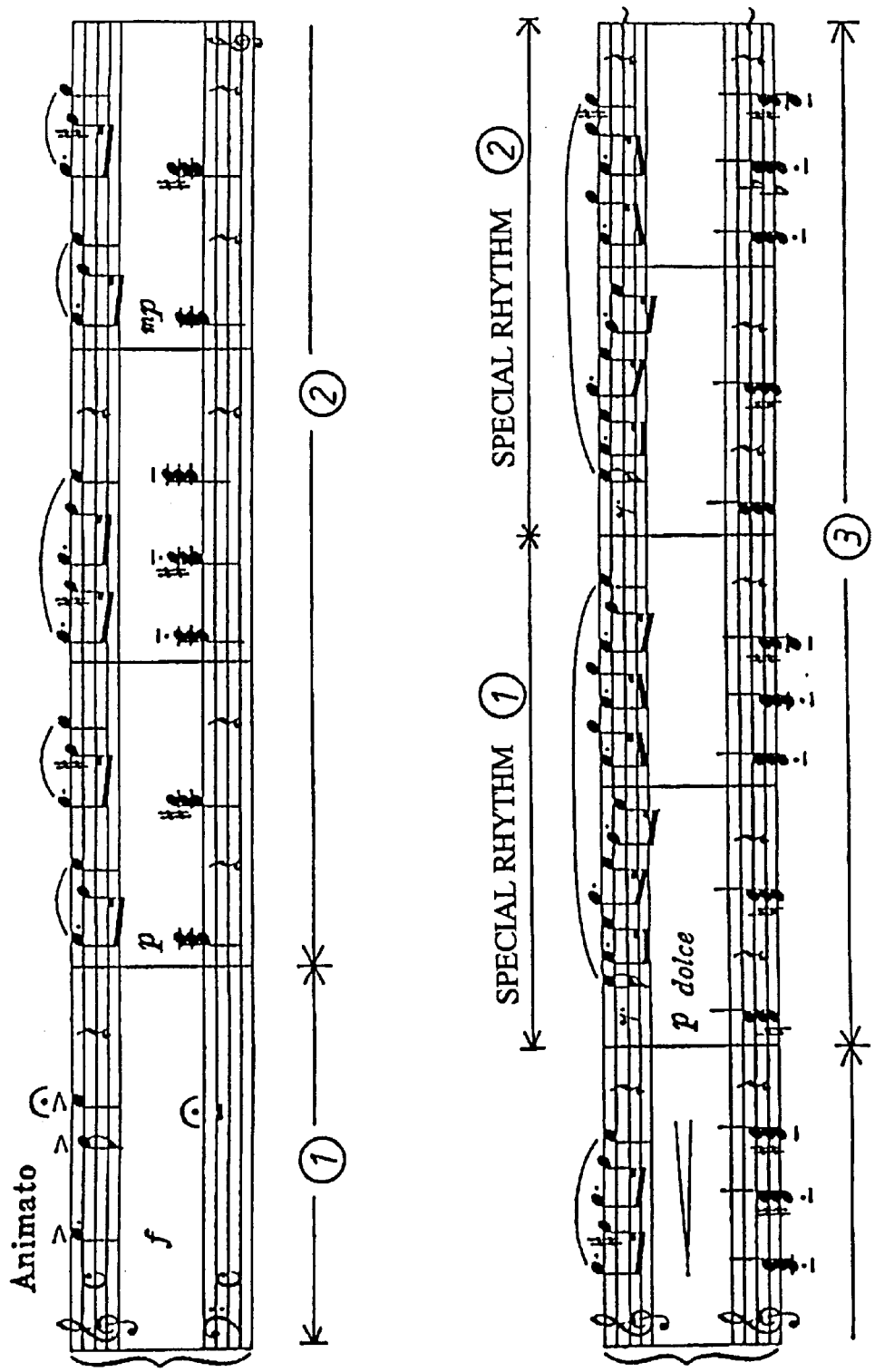
FIG. 20 is a partial score of an example piece of music for practice.

Referring to FIGS. 11 and 12, the description will be made about the note reading practice routine. This routine is operated in step 416 of the lesson object 400 (FIG. 6), and starts at step 800 of FIG. 11. Step 802 is to designate the range of practice. In designating the practice range, the practice area for this time is read out from the practice schedule data (FIG. 17) within the hard disk 16, and then the first phrase of the practice music data stored in the RAM 13 is designated based on the practice area thus read out, for example the first phrase portion indicated by an encircled numeral one in the score of FIG. 20. And every time the process of this step 802 is executed, succeeding phrases of the practice music data will be nominated successively, as shown by encircled numerals 2, 3, and so forth in the score of the practice music shown in FIG. 20. If the practice is to be taken in the area of the special rhythms, those portions having special rhythm in the score will be picked out successively, for example those phrases indicated by "special rhythm 1 (encircled)" and "special rhythm 2 (encircled)" in FIG. 20.

The lesson object 400 next goes to step 804, and exhibits the music score of the above-designated portion on the display 15 based on the data representing the practice area in the practice schedule (FIG. 17) and on the music score data and the performance date in the practice music data. If the practice area is the musical scale (step 1 in FIG. 17), a new practice data will be composed (arranged) by extracting a succession of pitches (notes) which appear in the designated range based on the performance data in the practice music data, and a succession of notes corresponding to the performance data is presented on the display 15. In case the practice area is right hand or left hand or both hands, a right hand performance portion (a melody portion) or a left hand performance portion (an accompaniment portion) or the entire performance portion will accordingly be extracted from the above designated range of the music score data of the practice music, and displayed on the display. If the practice area is special rhythm, a portion having a special rhythm (e.g. special rhythm 1 or 2 in FIG. 20) will be extracted from the music score data of the practice music and displayed on the screen of the display 15. In these instances, fingering guides may preferably be indicated based on the fingering data previously included.

The lesson object 400 goes forward to step 806, and supplies to the electronic musical instrument 25 the performance data newly composed corresponding to the succession of notes which is being displayed on the display 15 or the performance data included in the practice music data corresponding to the music score which is being displayed on the display 15. The electronic musical instrument 25 generates musical tones based on the supplied performance data, and the student can listen to the model performance. If the computer apparatus includes musical tone generating circuits in itself, tones for the model performance may be generated using such tone generating circuits. Next at step 808, the lesson object 400 gives the student an instruction to start performance practice via the display 15, and starts the time counting by the timer included in the CPU 11.

The lesson object 400 indicates in step 810 the note to play next on the score displayed on the display 15, and in step 812 waits for a key depression on the electronic musical instrument 25. When the student depress a key on the electronic musical instrument, step 812 passes to the "yes" side and goes to step 814, where the pitch data corresponding to the depressed key in the depressed key data string within the RAM 13. Step 816 judges whether the termination demand flag equals 1 or not, and step 818 judges whether the depressed key is correct for the note indicated at step 810. The termination demand flag is usually set at "0", so the program usually goes to step 818. If the depressed key is of the correct pitch with respect to the indicated note, step 820 writes the pitch data of the depressed key into the correct depressed key data string in the RAM 13. Then step 822 judges whether the practice of the designated range has finished or not.

If the practice of the designated range is not over, step 822 judges "no" to push back to the process of steps 810–822, and this loop will be repeated until the practice of the designated range finishes. During the repetition of this looped processing, the depressed key data string and the correct depressed key data string of the designated range will be formed (lengthened) successively. On the other hand, if the student depresses a wrong key and step 818 judges "no" during the repeated processing of steps 810–822, the lesson object 400 executes the process of step 834 forward.

Step 834 adds "1" to the error number sum to count the total number of wrong depressions. Step 836 is to judge whether wrong depressions occurred in succession or not. If not the program proceeds to step 842. But if yes, step 838 analyzes the errors comparing the actually depressed keys with the notes to be performed, and step 840 gives the details of the errors and an adequate instruction (advice) on the display 15. For example, if the student has depressed the key of a note without a sharp or a flat against the presentation of a note with a sharp sign or a flat sign, the analysis says that the note displayed was a sharped or a flatted note and the advice explains the meaning of the sharp sign and the flat sign. Thus the student improve himself or herself to avoid (or decrease) such an error in the succeeding practice performance.

Step 824 judges whether the total number of the errors exceeds the predetermined limit value or not based on the error number sum data. If the error number sum exceeds the limit value, the program goes to step 844 which will be explained later. If the error number sum does not exceed the limit value, the program goes back to step 812 to wait for a new key depression. As explained up to here, the processing by steps 810–822 and 834–842 forms the depressed key data string including wrong key depressions and the correct depressed key data string in succession, and when all of the key depressions in the designated range have finished, the lesson object 400 judges "yes" at step 822 and computes the ratio of the number of the data in the correct depressed key data string to the number of the data in the depressed key data string and obtain a correct answer rate (i.e. correct depression rate) at step 824. Step 826 shows the wrong key depressions by displaying on the display 15 the succession of the subject notes or the subject score together with the all depressed key data string and the correct depressed key data string for easy comparison.

When step 828 judges whether the termination demand flag is equal to "1" or not the program usually goes to step 830, as the termination demand flag is usually set at "0". Step 830 judges whether the computed correct answer rate is above the predetermined passing rate (e.g. 80%) or not. If the correct answer rate does not exceed the passing rate, the program goes back to step 806 to repeat the key depression practice of the same designated range as the preceding time. If the correct answer rate exceeds the passing rate, the program goes forward to step 832 to judge whether the practice of all designated ranges of the practice music piece has finished or not. If not, the program goes back to step 802 to designate the next range for practice and let the student take practice as the case mentioned above.

If all of the ranges to be practiced have finished, step 848 compares the correct answer rates of the respective designated ranges, the number of trials, the times used for respective practices, etc. with respect to the performance data in the music piece data to mark the practice results, and writes the marked points into the achievement rate table (FIG. 21) provided on the RAM 13. In the note reading practice, points are given (marked) by attaching weight to the note reading skill, and the computed points are written in the point boxes for the accuracy of natural notes and of accidental notes, clefs, key signatures, key depressions, combination of right and left hands, etc.

Next, in case the error number sum exceeds the limit value, the lesson object 400 instructs the student to select whether he or she will challenge the same practice again or to quit the lesson using the display 15 in step 844. If the student selects to challenge again, step 846 directs the processing back to step 806 to restart the model performance of the designated range. If the student selects to quit lesson, step 846 directs the processing to step 848.

The following description is about the case where the lesson object 400 sets the termination demand flag at "1" at step 432 (FIG. 6) in response to the message to "demand the process termination" during the note reading practice under the lesson object 400. In this case, steps 816 and 828 both judge "yes" and the performance practice will be suspended, with the program moving forward to step 848. Where the error number sum is increased or a message demands process termination, step 848 will give bad points (low value). And step 850 ends the execution of the note reading practice routine, returning to step 412.

f-2. Metronome Step Practice

Figure 13:
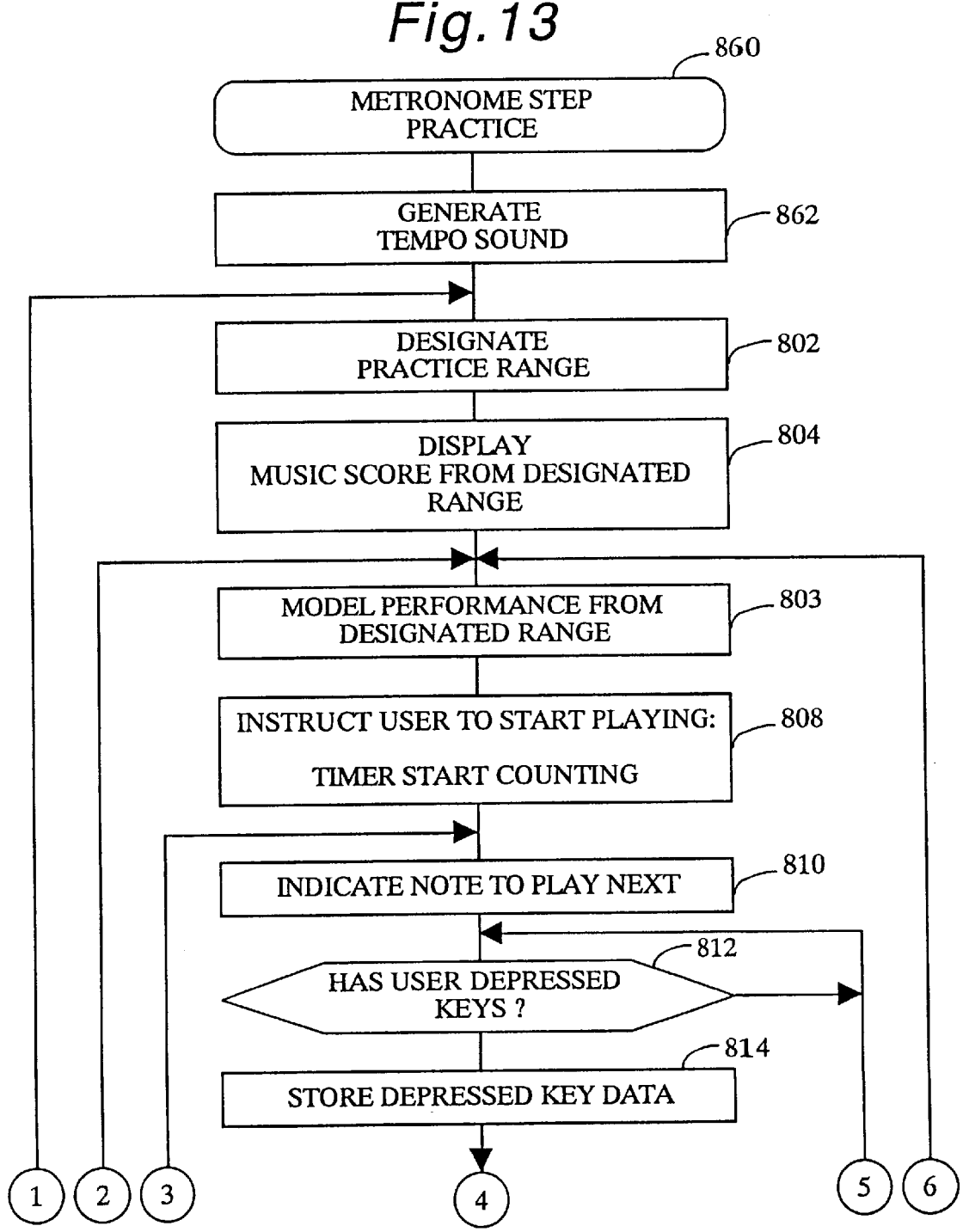
FIG. 13 is a fractional flow chart depicting the front portion of a metronome step practice routine to be executed in the lesson object shown in FIG. 6.
Figure 14:
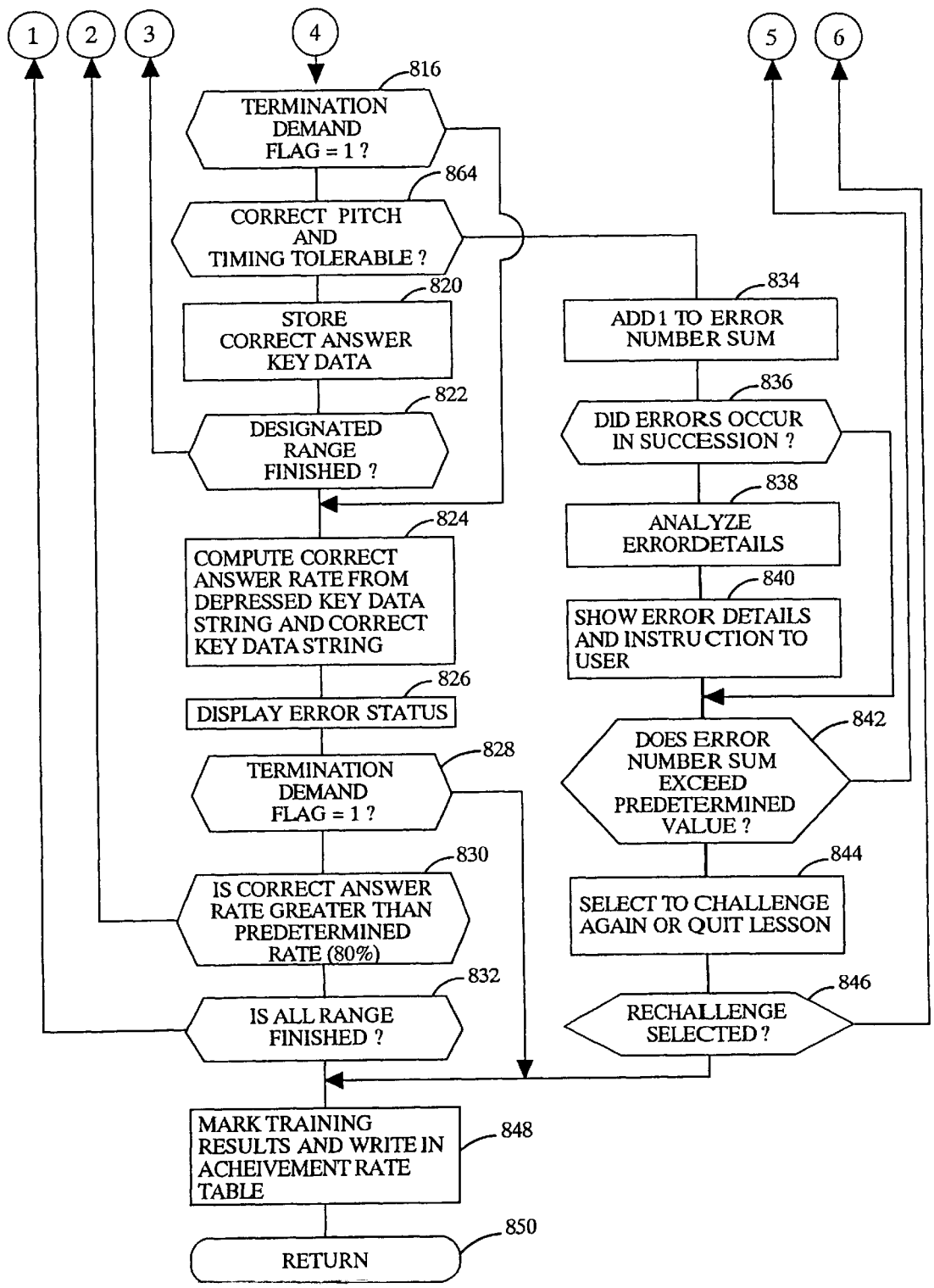
FIG. 14 is a fractional flow chart depicting the rear portion of the same metronome step practice routine.
Figure 15:
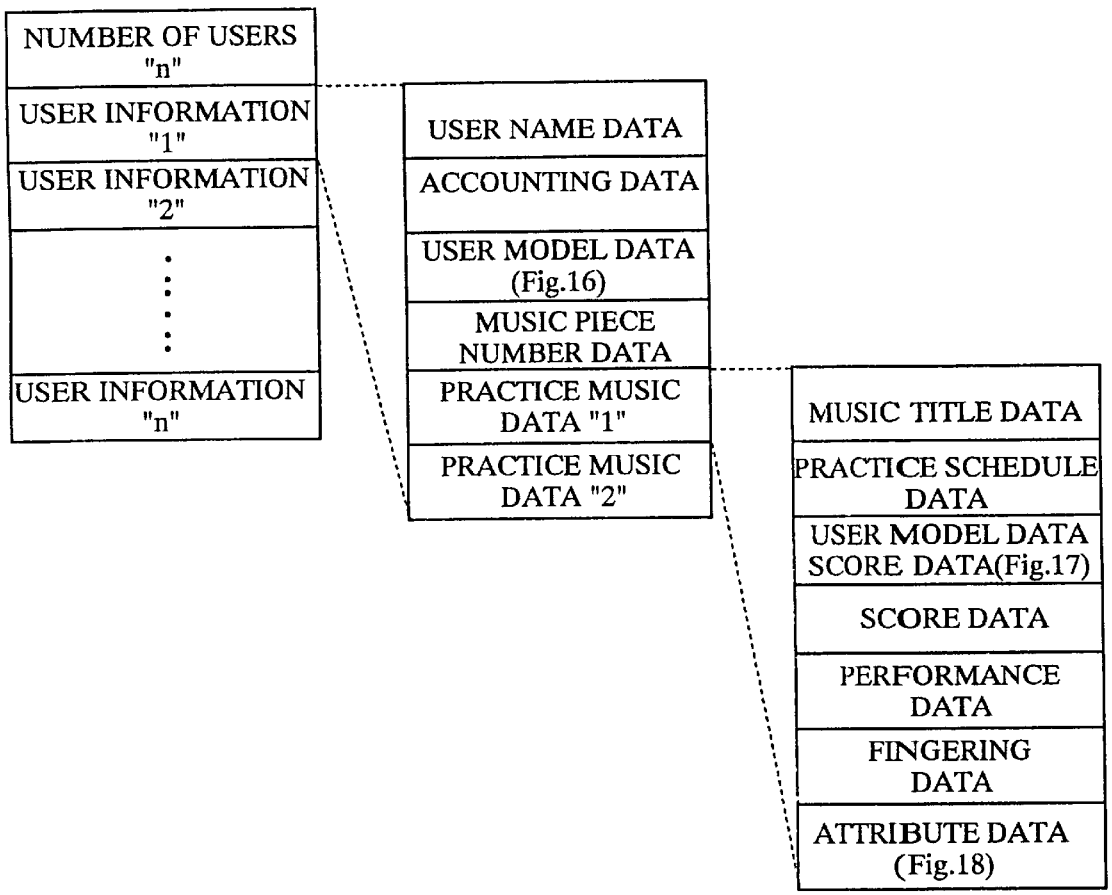
FIG. 15 is a memory map of a user information memory area in a hard disk for the first embodiment.

Referring to FIGS. 13 and 14, the description will be made about the metronome step practice routine. This routine is operated in step 418 of the lesson object 400 (FIG. 6), and starts at step 860 of FIG. 13. The metronome step practice routine is composed by adding tempo related matters to the aforementioned note reading practice routine of FIGS. 11 and 12, and therefore most of the included steps are same as the note reading practice routine. In this connection, the like elements are named by like references omitting a redundant description thereof, and the description will be concentrated on unlike elements.

At step 860, the lesson object 400 adjust the tempo of the practice music piece (the tempo data is included in the performance data) in accordance with the practice area for this time among the practice schedule table (FIG. 17) and starts to generate reference tempo sounds at a time interval of a quarter note length in the thus adjusted tempo. The student is to practice performance hearing those tempo sounds. The processing through steps 802–816 is the same as in the case of the note reading practice routine. Step 864, however, judges whether the depressed keys are correctly depressed with respect to the displayed notes for practice in terms of not only the correctness of the note pitches but also the correctness (in allowable difference) of the key depression timings with respect to the displayed score. The judgment on the timings is made by comparing the actual time counts, at the respective depressions, of the timer which was initiated at step 808 with the performance data, as to the timings of the notes, in the music piece data as adjusted by the practice area (tempo) of this time in the practice schedule data.

The processing from step 820 forward is same as the case of the note reading practice routine, but steps 836–840 are omitted here. This is to keep the program running and not to suspend the performance, even though wrong keys should be depressed in succession. In giving points in the achievement table at step 848, emphasis is put on the rhythm related aspects, and the computed points are written in the point boxes for the speed (tempo), the rhythm expression (tempo keep), combination of both hands, etc. The total time for achievement written in the table is the sum of the time for achievement in the note reading practice and that in the metronome step practice.

g. Lesson Object (Termination)

The following is the description about the termination of the lesson object 400 (FIG. 6) as appointed by step 114 in the main program of FIG. 2. When step 114 appoints the lesson object 400 and issues a message to "terminate", the lesson object 400 executes step 434 (FIG. 6) forward.

Step 434 is to write the practice date, success rate, the approval of finish if the success rate is above predetermined passing points, and the time consumed into the practice schedule table data in the hard disk 16 based on the practice results. The success rate is computed attaching weight on the performance practice results related to the practice area in the practice schedule data. For example, as to the practice in a slow-downed tempo, weight is attached on the accuracy of natural notes and of accidental notes, clefs, key signatures, and combination of right and left hands. As to the practice in a normal tempo, weight is attached on the speed of key depressions, the rhythm expression, and combination of right and left hands. The time consumed is the sum of the time used for the note reading practice and the time used for the metronome step practice as written in the achievement rate table (FIG. 21).

Next in step 436, the user model data in the hard disk 16 is renewed. In this instance, reference is made to the achievement rate table and to the attribute data of the music data, adjusted data for each item in the user model is computed from the standard time in the attribute table and time for achievement in the achievement rate table with respect to each of the items on which the achievement rate exceeds the requisite level in the attribute data. For example, computation of the adjusted data (for each item) is conducted by the formula: (constant×(standard time−time for achievement)/standard time) and this new computed value is added to the data in the user model (for each item) to make a substituted value (of each corresponding item).

The lesson object 400 exhibits the practice results on the display 15 at step 438. In this instance, the display 15 presents the portion(s) which includes many errors during practice and evaluation thereof together with comments on the student's performance of such portion(s) and some advice for overcoming the portions having low evaluation, etc. A number of evaluations and comments are previously prepared in the computer, and adequate ones will be selected in accordance with the practice results and shown on the display 15. Step 440 is to give a homework practice subject on the display 15. The homework subject is so determined to be helpful for the practice on the erroneous portions taking the attached advice into account.

At step 442, the lesson object 400 displays on the display 15 the money amount represented by the accounting data stored in the RAM 13, and saves the same accounting data in the hard disk 16 as the accounting data in the user information. These accounting data, practice schedule data, user model data, etc. in the hard disk 16 may be downloaded into a host computer via a communication channel so that the host computer may bill the user (student) for the practice taken and may dispatch comments as well.

B. EMBODIMENT 2

A second embodiment of a musical performance teaching system including a computer apparatus with a display device also has a general construction as previously shown in FIG. 1. In this second embodiment, however, the program memory area of the hard disk 16 stores programs corresponding to the flow charts of FIGS. 22–26. The user information memory area of the hard disk 16 stores, as shown in FIG. 27, user information i (where i=1, 2, . . . n) relating to the respective users (students) who practice performance on this teaching system.

Each of the user information i includes user name data, tutoring manner data, practice schedule data, user model data and practice music data. The user name data denotes the name of a user, a student. The tutoring manner data is unique to this embodiment and represents a manner of teaching (tutoring) which has been selected by the student from among plural manners prepared beforehand, which will be described in detail hereinafter. The practice schedule data is of a table type as shown in FIG. 28 and includes a plurality of practice areas (such as right hand or left hand or both hands play in various tempos in a stepwise fashion and respectively corresponding check marks indicating whether the practice of each area has finished or not. The user model data is the same as or substantially same as that of the aforementioned first embodiment and represents the user's levels of performance skill with respect to various aspects reflecting the results of judgment and practice, but is not unique in this embodiment. Therefore, the detailed explanation is herein omitted.

Figures 27, 28:
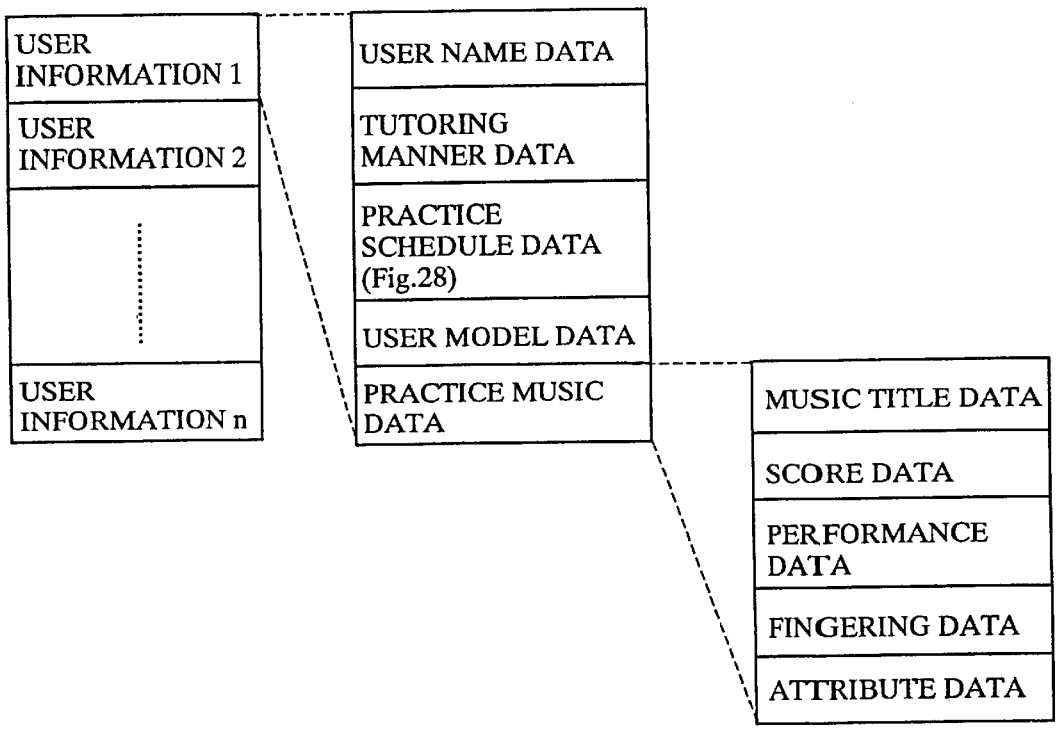
FIG. 27 is a memory map of a user information memory area in the hard disk for the second embodiment.
FIG. 28 is a format chart of a practice schedule data.

The practice music data is the data relating to a piece of music for practice by the named user and includes music title data, music score data, performance data, fingering data and attribute data as shown at right column in FIG. 27. The music title data represents the title of the music piece to be practiced. The music score data is a kind of image data for visually displaying the notes and rests on five-line staves constituting a music score of the music piece for practice. The performance data is the data representing the tempo of the music piece, pitches and lengths of notes, lengths of rests, etc. to define the progression of the music piece. The fingering data indicates hands and fingers to depress the keys on a keyboard for the respective notes of the music piece. The attribute data includes such data as represent the required level for performing the music piece, the category and characteristics of the music piece, etc.

The internal database 17 stores a number of sets of music piece data (hereinafter, general music data) respectively representing a number of music pieces to be selected as a usual practice piece of music (hereinafter, a general practice piece of music or a general practice music in short) and a number of sets of music piece data (hereinafter, specific music data) respectively representing a number of music pieces or fractions of music pieces to be selected in connection with a specific subject (hereinafter, a specific practice piece of music or a specific practice music in short) separately. The specific practice piece of music is a short piece of music consisting of about four or eight measures (bars) prepared for overcoming a specific subject in the course of performance practice on a general practice music, while the attached data to specific music data includes data which represents the specific subject. The simple mention of "practice music" and "music data" hereinafter is intended to mean both "general practice music and specific practice music" and "general music data and specific music data", respectively. Each music data comprises music title data, music score data, performance data, fingering data and attribute data as mentioned with reference to FIG. 27.

In this embodiment also, the flexible disk 23 and the compact disk 24 are used as external storage devices for the computer apparatus and stores the programs of FIGS. 22–26 beforehand, and will be used for installing such programs into the hard disk 16.

The musical performance teaching system of the second embodiment is operated by the CPU 11 executing programs (not shown) stored in the ROM 12 and above-mentioned programs stored in the hard disk 16, etc. In advance to the main operation of this teaching system, it is to be understood that all or a part of those programs stored or memorized in the flexible disk 23 or the compact disk 24 are to be installed in the hard disk 16 and the music data stored in the external database 21, the flexible disk 23 and the compact disk 24 are to be transferred to the internal database 17, using an installing or transferring program not shown.

Figure 22:
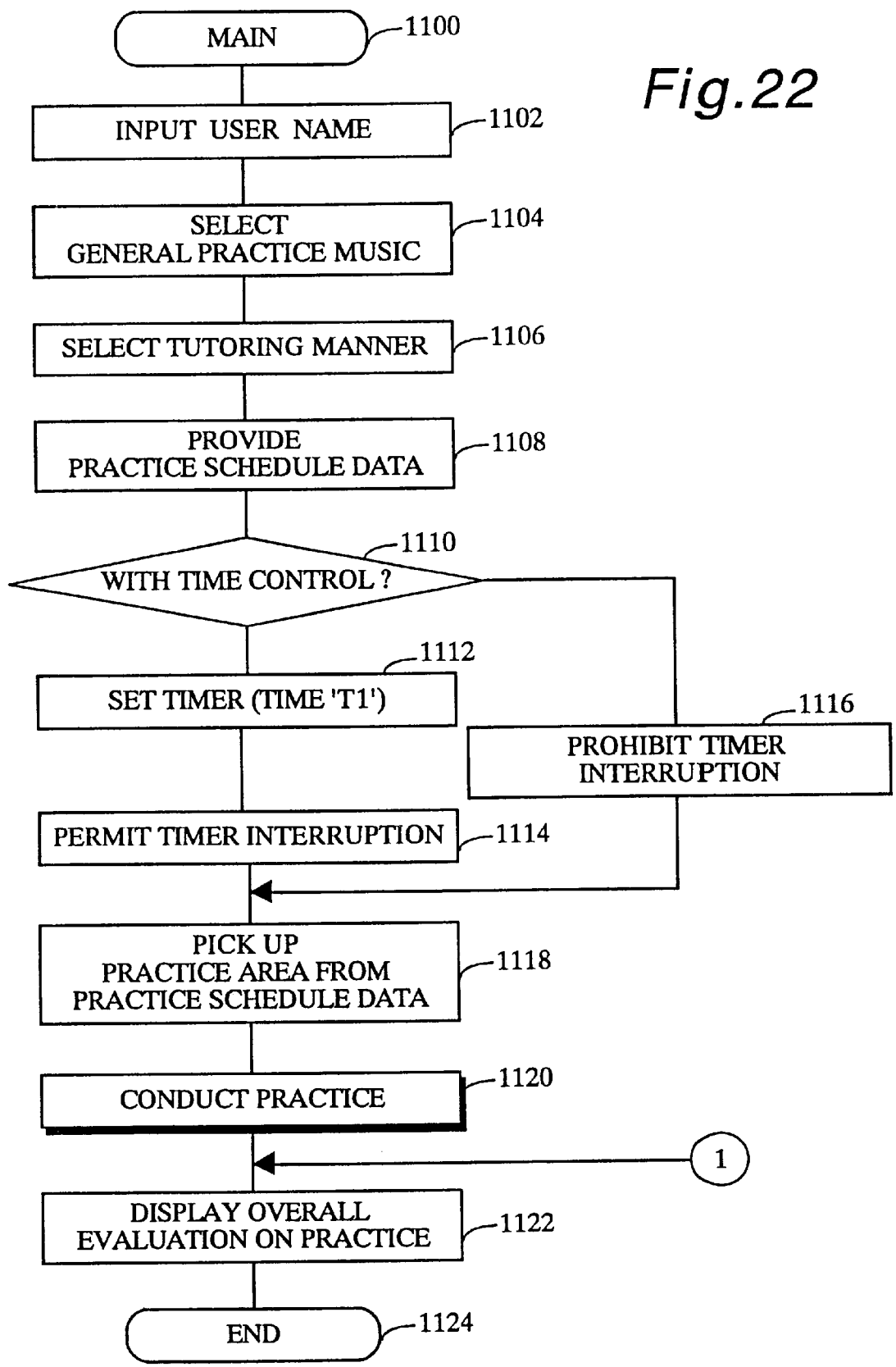
FIG. 22 is a flow chart of a main program used in the musical performance teaching system to implement a method of the second embodiment.

As the user initiates the main program of FIG. 22, the CPU 11 starts the execution of the main program at step 1100.

After start of the execution of the main program, the CPU 11 queries the student of his or her name on the display 15 and waits for an input of the user name by the student at step 1102. When the student inputs a user name using the keyboard 14, the CPU 11 searches through the user information storing area in the hard disk 16 to find whether the student is a new user or an already-registered user. If it is a new user, the CPU 11 secures a memory area for the user information of one person in the above-mentioned user information storing area and write the user name in the memory area. If it is a registered user, only the practice music data within the user information will be transferred from the hard disk 16 to the RAM.

The CPU 11 selects a general practice music at step 1104 and a tutoring manner at step 1106, and provides practice schedule data. In case the inputted user name is new, or the practice schedule data shows that all practice areas have been finished, or the student specifically inputs the change in general practice musics via the keyboard 14, the CPU 11 conducts processing of the selection of a general practice music, the selection of a tutoring manner and the provision of practice schedule data, respectively at steps 1104,1106 and 1108. In case the user name is a registered one, or the practice schedule data does not show the finish of all practice areas, or the student does not request the change in general practice musics, the CPU 11 will proceeds those steps respectively to the next step.

In the process of selecting a general practice music, the CPU 11 takes out a set of general music data from a number of sets of general music data in the database 17 taking the student's will into consideration and stores them in the allotted memory areas in the hard disk 16 and the RAM 13. In taking out the general music data from the database 17, the display 15 displays titles of the respective music pieces represented by the respective music title data among a number of sets of music data stored in the internal database 17 successively, and the student selects an intended music title by using the key board 14. In case the internal database 17 stores a large number of sets of general music data, the program is so designed to query the students preference, read out the user model data (representing user's performance level), compare the student's preference or performance level with the music category or the requisite performance level represented by the attribute data in the general music data, select a small number of sets of general music data as candidates and let the student to select from among such a small number of general music pieces. The student may nominate the title of music and thereby select a set of general music data from the internal database 17. Or the CPU 11 may select proper music data from among all of the general music data in the internal database 17 at random or may select from among a small number of general music data which have been preselected as candidates.

In selecting the tutoring manner (i.e. style of teaching) at step 1106, the CPU 11 displays on the display a plurality of tutoring manner of different types of teachers, among which the student will nominate one of the tutoring manners using the keyboard 14. In this second embodiment, there are six patters of teaching style as six types of teachers #1 –#6 prepared beforehand in a tutoring manner table as shown in TABLE 1 below. This table constitutes a part of the program as attached data to the program of FIGS. 22–26. In order to prepare these six patterns of teaching style, the features of the actual human teachers are categorized, for example, into four manner elements (aspects) of demanding level, practice subject, instructing manner and time control, where each manner element includes two or three kinds of different ways (to be herein called sub-manners), and different combinations (in this example, six combinations) of such sub-manners, one sub-manner from each manner element, make different tutoring manners. The sub-manners under each manner element will be described below TABLE 1 which shows six types of computer teachers.

TABLE 1

| Teacher Type | Demanding Level | Practice Subject | Instructing Manner | Time Control |
|---|---|---|---|---|
| #1 | 1> | 2> | 2> + 3> | 2> |
| #2 | 2> | 2> | 1> + 2> | 1> |
| #3 | 2> | 1> | 1> + 3> | 2> |
| #4 | 1> | 2> | 1> | 1> |

TABLE 1-continued

| Teacher Type | Demanding Level | Practice Subject | Instructing Manner | Time Control |
|---|---|---|---|---|
| #5 | 2> | 2> | 2> | 2> |
| #6 | 2> | 1> | 1> + 3> | 1> |

The manner element of demanding level consists of two kinds of ways, i.e. two sub-manners: 1> to let the student repeat the same practice until the student reaches a fairly high level in performing the practice music, and 2> to let the student proceed to the next practice after a certain amount of the present practice even though the student has not reached a fairly high level in performing the present practice music. The manner element of practice subject consists of two kinds of ways, i.e. two sub-manners: 1> to let the student practice mainly on the specific practice music pieces, if the student does not master a certain subject, where those specific pieces are prepared for that certain subject, and 2> to let the student practice mainly on the general music pieces selected by the student even though the student does not master any of the subjects. The manner element of instructing manner consists of three kinds of ways, i.e. three sub-manners: 1> to point out the portions where the student performed erroneously, 2> to give a model performance of the portion where the student performed erroneously, and 3> to explain the student's errors in words. The manner element of time control consists of two kinds of ways, i.e. two sub-manners: 1> to conduct a time control to let the student finish performance practice in a predetermined time T1 or to permit a time extension of a predetermined additional time T2, and 2> not to conduct a time control and allow the student to keep on practicing until the student finishes the intended performance practice.

In TABLE 1 above, "1>+2 >", "1>+3 >" and "2>+3>" means, respectively, that two sub manners 1> and 2>, two sub manners 1> and 3> and two sub manners 2> and 3> are employed simultaneously. The tutoring manner data representing the tutoring manner (teacher #1, . . . or #6) nominated by the student will be written into the user information corresponding to the student under in the hard disk 16.

In providing the practice schedule data at step 1108, the program makes a out a practice schedule for mastering the performance of the selected general music piece based on the performance data and the attribute data in the general music data of the selected one, and writes the data representing the made-out practice schedule into the user information of the present student in the hard disk 16 as the practice schedule data. For example, for a music piece in a fast tempo, a practice with a slowed-down tempo is planned for the beginning stage, while for a student who is not good at combined performance of the right and left hands, separate practices for the right and the left hand will be planned for an increased number of times. The practice schedule data may be provided by taking the user model data representing the student's level and the performance level represented by the attribute data in the selected general music data into account, and also by reflecting the student's wishes. At the time of providing the practice schedule data, all of the data to represent the finish of the respective items will be set at "0".

After steps 1104–1108, the CPU 11 judges whether the time control element in the data of the selected tutoring manner shows the necessity of time control, that is, whether the time control element is 1> or 2>. If the time control element is 1>, step 1110 judges "yes" to understand the time control is necessary. Then the next step 1112 sets the internal timer of the CPU 11 at a predetermined time of T1 (e.g. 30 minutes), and step 1114 set the flag for the timer interruption into the running main program at "permit" state. With this flag set, the timer starts counting and issues an interruption instruction to the CPU 11 after the lapse of the set time T1. If the time control element is 2>, step 1110 judges "no" to understand the time control is unnecessary. Then at step 1116, the flag for the timer interruption into the running main program is set at "prohibit" state. In this state, the timer will not issue an interruption instruction.

Step 1118 is to read out the data representing the practice area corresponding to the first data representing "not finished" among plural practice areas in the practice schedule. At step 1120, the CPU executes the "conduct practice" routine. The "conduct practice" routine will be described later in detail with reference to FIG. 24, but a brief description is made at present. If the read out practice area requires some modifications of the general practice music data and the music score data, such data undergo modifications, and the modified practice music data and score data are cut out per unit such as a phrase to display the cut-out portion of the music score on the display 15 based on the music data for the cut-out portion. The student will perform the displayed score on the electronic musical instrument 25, whereas the depressed key data string representing the performance will be stored in the RAM 13. By comparing the depressed key data string with the above cut-out performance data, the performance errors of the student can be found, the accuracy of the performance can be evaluated, and the errors can be analyzed in detail.

The wrong depressed keys, the evaluation, the analysis result, comments, etc. are shown on the display 15. When the evaluation is not good, the student is to practice the cut-out portions repeatedly, or have performance practice on the specific practice music piece for mastering the specific subject based on the analyzed results. For example, the student does not perform a specific rhythm well, a specific practice music piece including lots of such specific rhythms will be given to the student. Such evaluation, analysis result and comments displayed on the display 15, the repeated practice, and practice on the specific practice music are not common to all the students, but vary depending on the tutoring manner (teacher type) selected by the respective students.

After the process of the "conduct practice" routine at step 1120 finishes, the CPU 11 sets the data to represent the finish of the present practice area in the practice schedule data stored within the hard disk 16 at "1" to mean "finished" and displays the overall evaluation on the practice of the student on the display 15 at step 1122, and next goes to step 1124 to end the execution of the main program.

Figure 23:
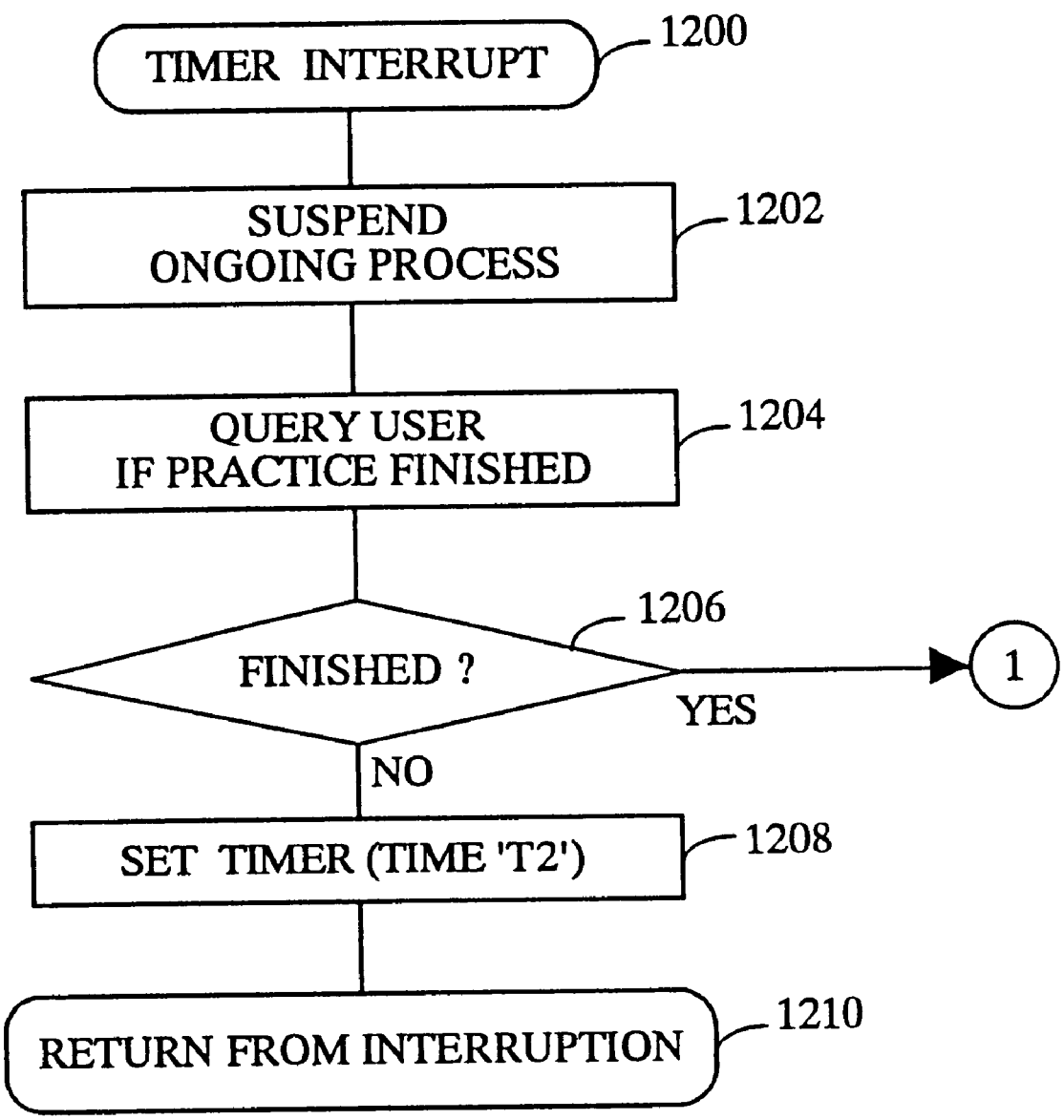
FIG. 23 is a flow chart of a timer interrupt program used in the musical performance teaching system of the present invention.

When the timer interruption is enabled with the "permit" flag and the timer has count the predetermined time of T1, the timer issues an interrupt instruction to the CPU 11, which in turn starts the timer interrupt program of FIG. 23 at step 1200. And at step 1202 the CPU 11 suspends the ongoing process, and at step 1204 queries the student whether the practice is finished or to be continued by displaying such a query on the display 15. If the student selects the finish of the practice using the keyboard 14, step 1206 judges "yes" and the program proceeds to step 1122 of the main program of FIG. 22. In this instance also, after step 1122, the execution of the main program comes to an end and finished the performance practice just as mentioned before.

If the student selects to continue the performance practice upon query at step 1204, the CPU 11 judges "no" at step

1206 and moves the program forward to step 1208 and then to 1210. At step 1208, the CPU 11 sets a predetermined extension time T2 (e.g. 5 minutes), and at step 1210 ends the execution of the interrupt program to resume the execution of the temporarily suspended main program. As a result, the performance practice time has been extended by the extension time of T2.

With this setting of the extension time at step 1208, the timer starts counting time anew, and issues an interrupt instruction again after the lapse of T2 from the setting. When the interrupt instruction comes again, steps 1200–1210 proceeds and queries whether to finish or continue to determine to further extend time on not. In case steps 1112 and 1208 sets the times of T1 and T2 for the timer, but the execution of the main program should finish before the timer counts the set times T1 and T2, then the timer does not issue an interrupt instruction so that the timer interrupt program of FIG. 23.

As may be understood by those skilled in the art, the time for the practice is controlled by the timer through steps 1112, 1114 and 1200–1210, when the selected tutoring manner represented by the tutor data includes the sub-manner 1> (i.e. with time control) of the time control element. On the contrary, when the selected tutoring manner includes the sub-manner 2> (i.e. without time control) of the time control element, step 1116 prohibits timer interruption not to control the time of performance practice.

Figure 29:
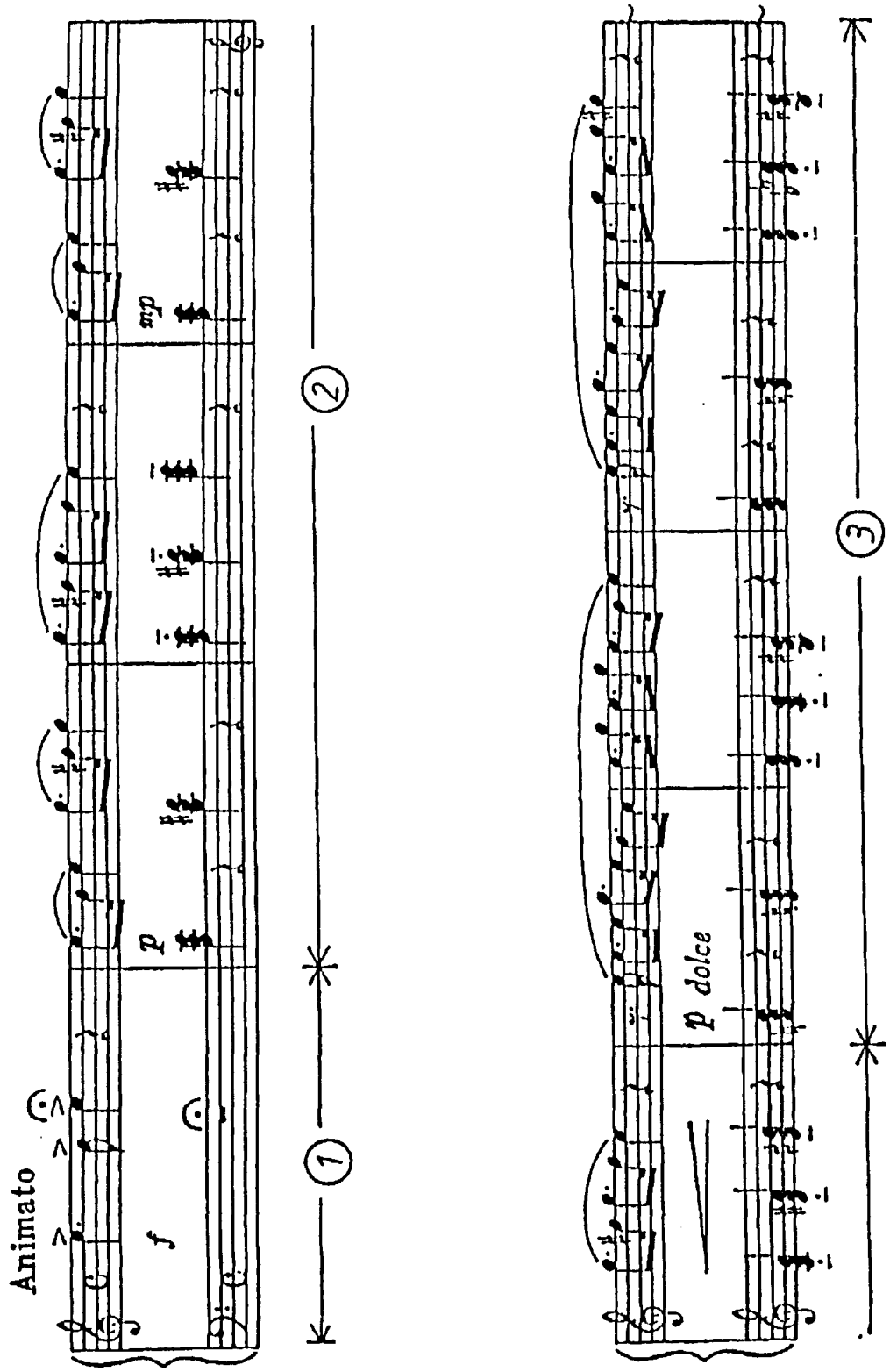
FIG. 29 is a partial score of an example piece of music for practice.

The processing of the "conduct practice" routine of step 1120 in the main program of FIG. 22 will be described in detail with reference to FIG. 24. The processing starts at step 1300, and the CPU 11 designate practice range at step 1302. In this practice range designating process, for the first thing, the CPU 11 designates the first phrase (FIG. 29, portion "1" encircled) of the practice music data which has been stored in the RAM 13 based on the present practice area read out from the practice schedule data by the process of step 1118. And as this step 1302 is executed repeatedly, it designates the next phrases (FIG. 29, portions "2", "3 ", . . . encircled) successively.

Figure 30:
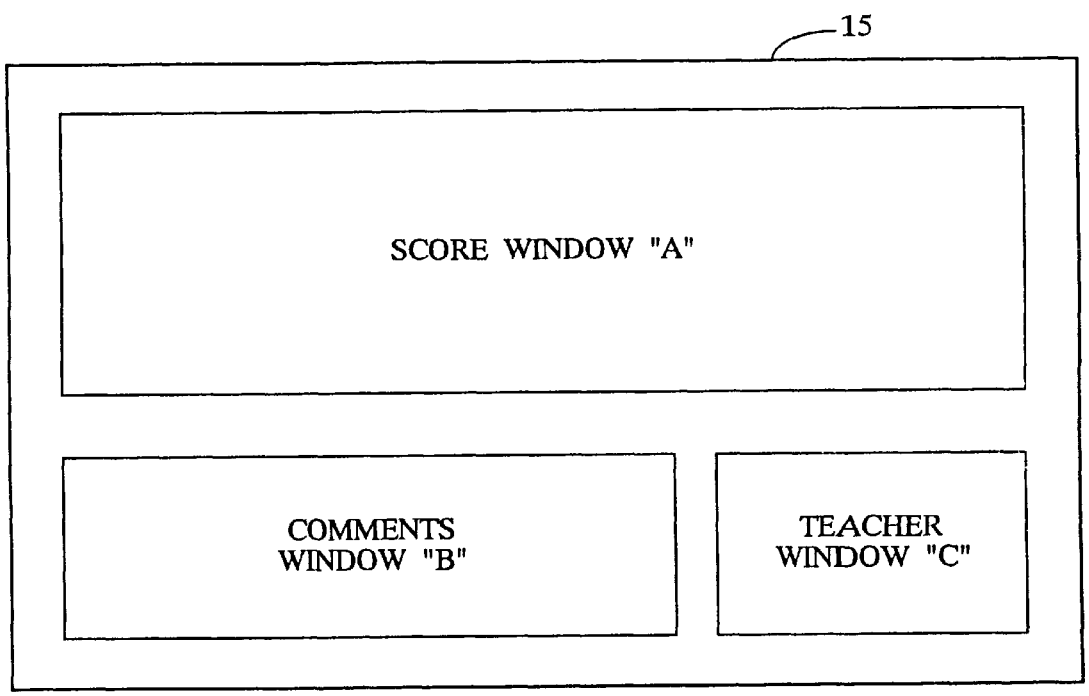
FIG. 30 is an example of indications on the display apparatus.
Figure 31A:
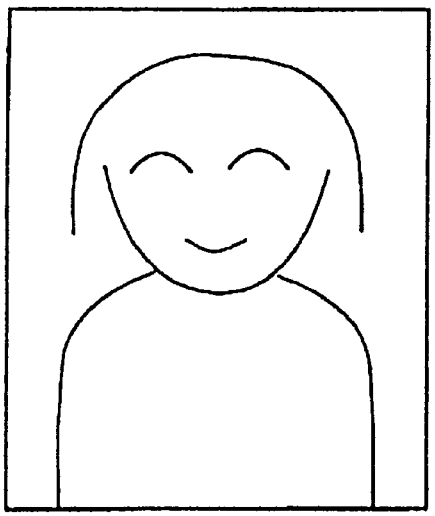
FIG. 31 shows examples of the teacher's face to appear in the window C on the display of FIG. 30.
Figure 31B:
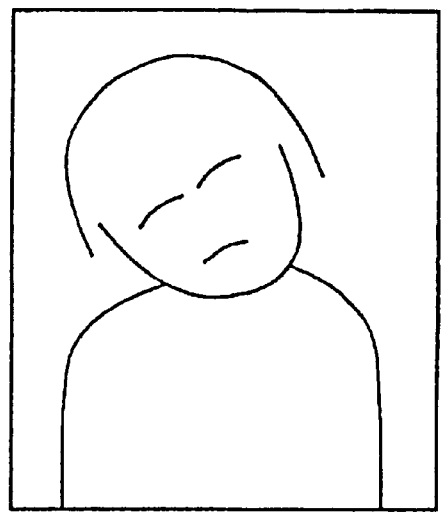
Figure 31C:
Figure 31D:

Next at step 1304, the CPU 11 displays the music score of the designated range in the score window A (FIG. 30) of the display 15 based on the score data in the practice music data attaching fingering guides to the displayed notes based on the fingering data, and at step 1306 modifies the performance data in the practice music data belonging to the designated range, and stores the modified data in the RAM 13. In this modification process, for example, where the practice area is indicating performance in a slower tempo, note duration data and so forth are to be modified within the performance data. And in step 1308, the CPU 11 supplies the above modified performance data to the electronic musical instrument 25 to produce a model performance of the music on the score. After listening to the model performance by the computer, the student starts to perform the practice music on the electronic musical instrument 25 upon instruction to start performance at step 1310. The key depression data representing the student's performance on the electronic musical instrument are transmitted to the computer via the musical instrument interface 25*a*, and stored in the RAM 13 as the key depression data, successively lengthening the data string as the performance progresses. The depressed key data string includes key data representing the depressed keys, key touch data representing the key touch (depressing speed or strength) at the key depression and time data corresponding to the note duration which is a time interval between the key depressions as measured by the internal timer of the CPU 11. When the student finishes the performance, the CPU 11 proceeds the program to step 1312 to conduct a routine to "analyze and evaluate" the student's performance.

Figure 25:
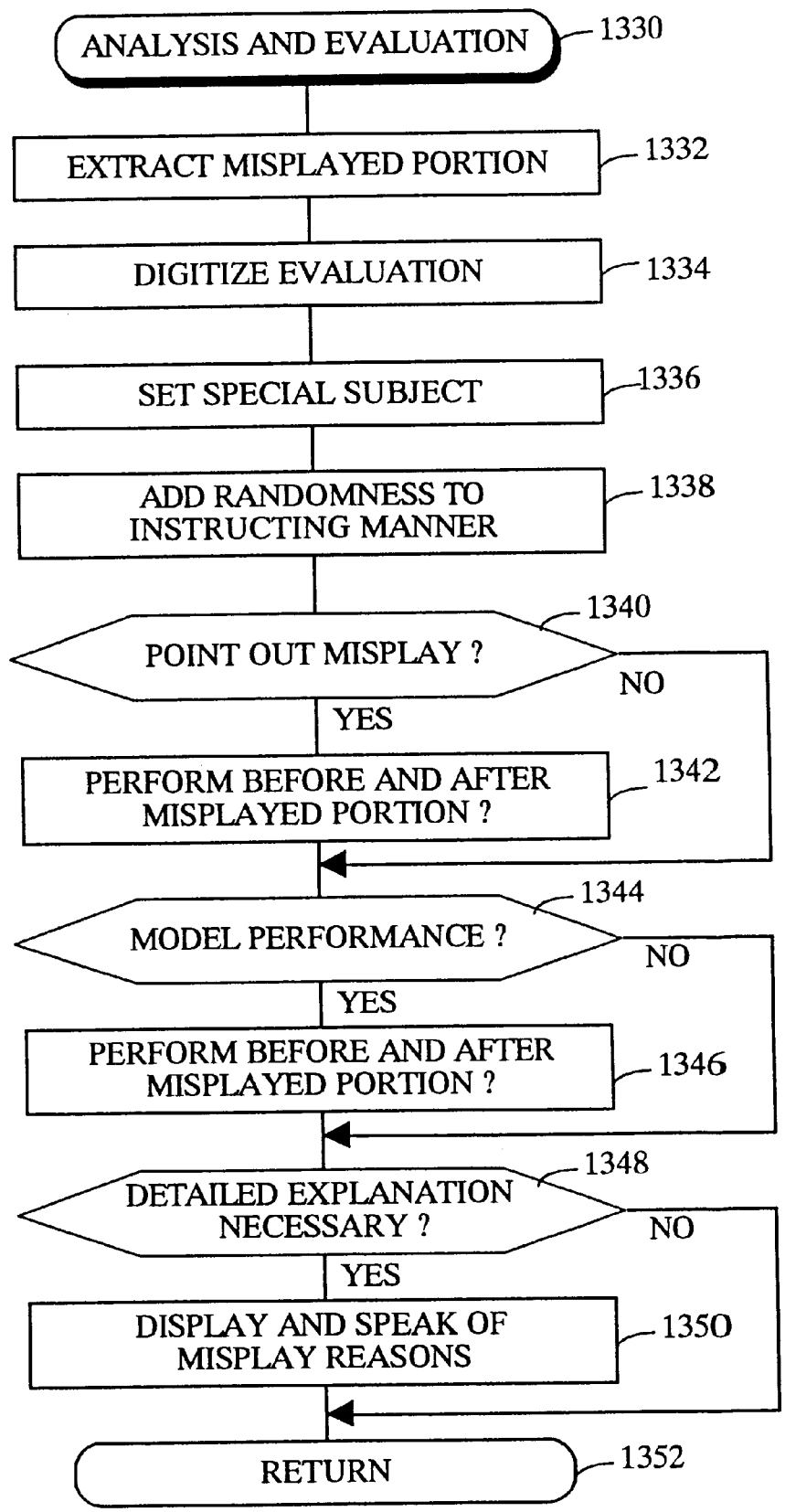
FIG. 25 is a flow chart of an analysis and evaluation routine in the conduct-practice routine.

The "analyze and evaluate" routine is described in FIG. 25 in detail. The routine starts at step 1330 named "analysis and evaluation". The CPU 11 next conducts step 1332 to extract such portions as are erroneously performed by the student by comparing the depressed key data string with the modified performance data, and then step 1334 to evaluate the performance by the student based on the number and the manners of the errors and digitize the evaluation results, for example, by computing evaluation points per full mark of 100 points. In step 1336, the CPU 11 extracts, based on the errors made, an adequate subject for overcoming the particular student's errors from among plural subjects previously prepared together with the programs, and stores such extracted subject in to the RAM 13 as special subject data.

After step 1336, the CPU 11 conducts the process of step 1338 to avoid overlaps of instructions and add randomness in tutoring for the succeeding instruction processing of steps 1340–1350 against the erred portions based on the tutoring manner. In case this analysis and evaluation routine are conducted repeatedly by a number of times, such an instruction process of sub-manners as indication of the erred portions (misplays) (steps 1340 and 1342), model performance of the erred portions (steps 1344 and 1346) and detailed explanation about the erroneous performance may be thinned out to some extent to avoid too repetitious presentation of the same instructions to the student. Specifically, how many times the analysis and evaluation routine are used may counted and be stored in the RAM 13 together with the data showing which sub-manners are used. And at step 1338, the use flag which is provided in the data for indicating that an instructing manner program be executed is set at "use" state or "non-use" state based on how many times the analysis and evaluation routine has been called and which sub-manners have been used, thereby introducing some randomness in operating the respective sub-manner processes. The respective sub-manner steps become available only when the flag shows the "use" state and not available when the flag shows the "non-use" state.

The processing by steps 1340–1352 which come after step 1338 is hereafter described with respective to the state where the above-mentioned use flag is set at "use" state. When the selected instructing manner includes the sub-manner 1> (i.e. to point out the erroneously performed portions), step 1340 judges "yes" and step 1342 will indicate the erroneously depressed notes distinctively (e.g. by color change or by blinking) in the music score shown in the score window A on the display 15. When the selected instructing manner does not include the sub-manner 1>, step 1340 judges "no" and skips to step 1344 for a model performance without pointing out the erred portion.

When the selected instructing manner includes the sub-manner 2> (i.e. to give a model performance of the erred portion), step 1344 judges "yes" and step 1346 transmits the performance data (correct one) of the neighborhood of the erred portion to the electronic musical instrument 25, which in turn gives the model performance of the neighborhood. When the selected instructing manner does not include the sub-manner 2>, step 1344 judges "no" and skips to step 1348 for a detailed explanation without giving a model performance.

When the selected instructing manner includes the sub-manner 3> (i.e. to explain the errors in words), step 1348 judges "yes" and step 1350 will state the reason for the erroneous key depressions, comments about the reason, etc. in the comments window B on the display 15, giving vocal announcement as well. For instance, in case the student depressed non sharped or flatted keys in response to the sharped or flatted notes in the score, the computer points out that the notes are actually sharped or flatted ones and also explains the meaning of the sharp and the flat. When the selected instructing manner does not include the sub-manner 2>, step 1348 judges "no" and skips to step 1352 without giving any explanation about the error.

As mentioned above, the computer employs various manners in instructing the student in connection with erroneous key depressions by the student in the course of practice depending on the instructing manner (included in the teaching style or tutoring manner) as selected by the student.

On the other hand, when step 1338 sets the above-mentioned "use flag" at "non-use" state, the succeeding steps 1340, 1344 and 1348 all judge "no" to skip all of the sub-manner steps 1342, 1346 and 1350, irrespective of the selected instructing manner. And the process directly goes to step 1352 to end the analysis and evaluation routine.

Figure 24:
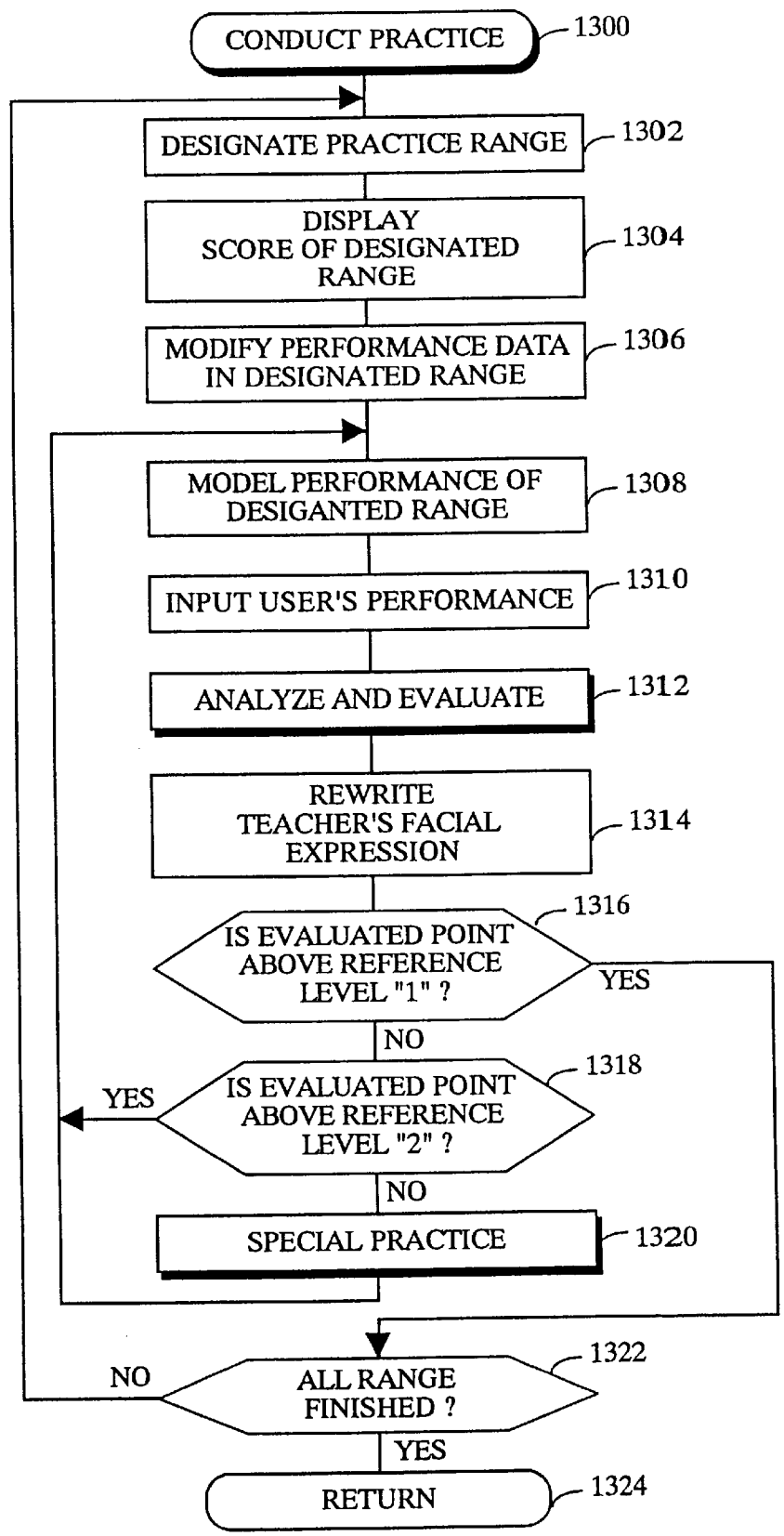
FIG. 24 is a flow chart of a conduct-practice routine in the main program of FIG. 22.

Now back to the "conduct practice" routine of FIG. 24. Next at step 1314, the facial expression of the teacher is displayed on the "teacher window" C of the display (FIG. 30) according to the evaluation results from the analysis and evaluation routine (step 1312). For example, when the marked points of the evaluation at step 1334 is 80 points or more, the teacher window C presents a smiling face of the teacher as depicted at (A) in FIG. 31. When the marked points is 50 points or more but less than 80, the window C presents an unsatisfied face as depicted at (B). When the marked points is 30 points or more but less than 50, the window C presents an angry face of the teacher as depicted at (C). When the marked points is less than 30 points, the window C presents a weeping face of the teacher as depicted at (D).

After step 1314, step 1316 judges whether the evaluated points is above the first reference level or not. If the evaluated points is the first reference value or more, step 1316 judges "yes", and then step 1322 judges whether all of the ranges of performance practice of the practice music piece have finished or not. If all ranges of the performance practice have not been finished, step 1322 judges "no", and the program goes back to step 1320 to resume practice on another range through steps 1302–1320. When all ranges of the performance practice of a general practice music piece have finished, step 1322 judges "yes" to move to step 1324, which in turn ends the processing of the "conduct practice" routine.

In case the evaluated points is less than the first reference value, step 1316 judges "no", step 1318 judges whether the evaluated points is above the second reference level or not, and accordingly gives another repetition of the practice of the same range through steps 1308–1316 or a special practice at step 1320. The first reference level may take various values depending on the manner element of "demanding level" within the tutoring manner data. If the selected sub-manner of the demanding level is 1> (i.e. to let the student repeat the same practice until the student reaches a fairly high level in performing the practice music), the first reference level will be set at a standard passing mark (e.g. 80 points). If the selected sub-manner of the demanding level is 2> (i.e. to let the student proceed to the next practice after a certain amount of the present practice even though the student has not reached a fairly high level in performing the present practice music), the first reference level will be set at a bit lower level (e.g. 70 points). Thus different methods for the student's practice will be employed in accordance with the sub-manners selected for the demanding level which is one of the manner elements in teaching.

Step 1318 is to judge whether the evaluation result is above the second reference level. If the evaluated points is the second reference value or more, step 1318 judges "yes" to proceed back to step 1308, and another repetition of practice will be given to the student through steps 1308–1316. If the evaluated points is less than the second reference value, step 1318 judges "no" to go forward to step 1320 to conduct a special practice routine, which is intended to give practice on specific practice music pieces temporarily putting the present general practice piece aside.

The second reference level is determined lower than the first reference level, and may vary depending on the manner element of "practice subject" in the tutoring manner data. If the selected sub-manner of the practice subject is 1> (i.e. to let the student practice mainly on the specific practice music pieces, if the student does not master a certain subject, where those specific pieces are prepared for that certain subject), the second reference level will be set at a fairly high (as a second) value (e.g. 60 points). If the selected sub-manner of the practice subject is 2> (i.e. to let the student practice mainly on the general music pieces selected by the student even though the student does not master any of the subjects), the second reference level will be set at a fairly low value (e.g. 50 points). Thus different methods for the student's practice will be employed in accordance with the sub-manners selected for the practice subject which is one of the manner elements in teaching.

Figure 26:
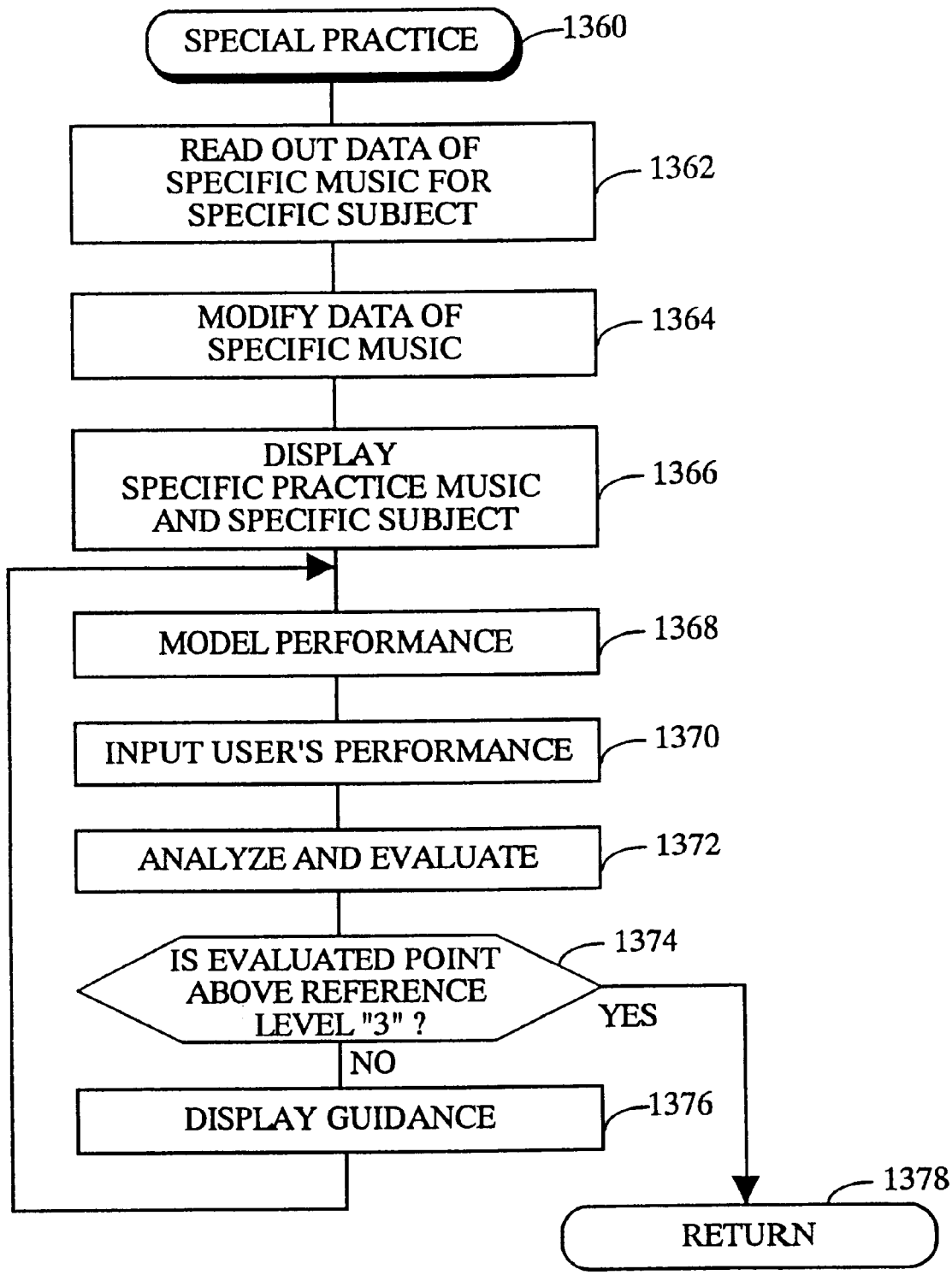
FIG. 26 is a flow chart of a special practice routine in the conduct-practice routine.

The special practice routine of step 1320 will be described with reference to FIG. 26. The execution of this routine starts at step 1360. The CPU 11 executes step 1362 and reads out from the internal database the specific music data representing the specific music piece which corresponds to the special subject set at step 1336 (FIG. 25), and stores the read out data into the RAM 13. In this step, the specific music piece will be selected by comparing the above-mentioned special subject with the respective attached data in plural sets of specific music data, and in case there are a plurality of specific music pieces selected, the display 15 will query the student and let him or her select the desired specific music piece using the keyboard 14.

Step 1364 is to modify the performance data and the score data of the specific music data written in the RAM 13 in accordance with the ongoing general practice music piece and practice area under practice, and to write the modified performance data into the RAM 13. This modification covers modifications of the tempo, the rhythm type, the tonality key, the meter, etc. of the specific practice piece to meet the present general practice music piece the student is now engaged in.

After step 1364, step 1366 displays the score of the specific music piece on the score window A of the display 15 base on the modified music data and the specific subject on the comments window B of the display 15. Then steps 1368–1372 conduct a model performance, an input of the student's performance and analysis of the performance, and compute evaluation points, in the similar way as conducted in steps 1308, 1310 and 1312 (i.e. steps 1332 and 1334 of FIG. 25) of FIG. 24. Then at step 1374, the evaluated points is compared with the third reference level, and if the evaluated points is the third reference level or more, step 1376 indicates some advice and comments on the comments window B of the display 15 based on the analysis results, and then proceeds the program back to step 1368 to repeat practice through steps 1368–1374. In this manner, the student will have a special practice on the portions where he or she is not so good at performing the score of the general practice music, which realizes a very efficient performance practice.

Also with respect to the third reference level, it is determined variously depending on the tutoring manner represented by the tutoring manner data. If the selected sub-manners of the demanding level and of the practice subject are both 1>, the third reference level will be set at a fairly high value. If the selected sub-manner of the demanding level and of the practice subject is 2>, the third reference level will be set at a fairly low value. Thus different methods for the student's practice will be employed in accordance with the sub-manners selected for the demanding level and for the practice subject which are two of the manner elements in teaching.

While the above description is made with respect to the second embodiment of the present invention in which the selection of the tutoring manner at step 1106 was conducted every time a practice schedule is made, i.e. every time a general practice music is determined, the selection of the tutoring manner may be made every time the student starts practice. In the latter case, step 1106 may be conducted every time the main program of FIG. 22 is executed irrespective of the provision of the practice schedule and of the change in the general practice music pieces.

In the above-described second embodiment, the tutoring manners are predetermined as six patterns of teaching style by combining selected sub-manners for the respective manner elements, and the student is to simply select one of the patterns. But, the program may be so designed that the student will select a sub-manner of each manner element individually, on the element-by-element basis, to build a combined teaching style at his or her preference. For that purpose, step 1106 of FIG. 22 may include a separate selecting process for each of those manner elements as the demanding level, the practice subject, the instructing manner and the time control to select 1>, 2> or 3> for each manner element and to store the selected results individually as the data of the tutoring manner.

C. EMBODIMENT 3

A third embodiment of a musical performance teaching system including a computer apparatus with a display device also has a general construction as previously shown in FIG. 1. In this third embodiment, however, the program memory area of the hard disk 16 stores programs corresponding to the flow charts of FIGS. 32 and 33. The internal database 17 stores a number of sets of music piece data (hereinafter, general music data) respectively representing a number of music pieces to be selected as a usual practice piece of music (hereinafter, a general practice piece of music or a general practice music in short) and a number of sets of music piece data (hereinafter, specific music data) respectively representing a number of music pieces or fractions of music pieces to be selected in connection with a specific subject (hereinafter, a specific practice piece of music or a specific practice music in short) separately.

Figure 34:
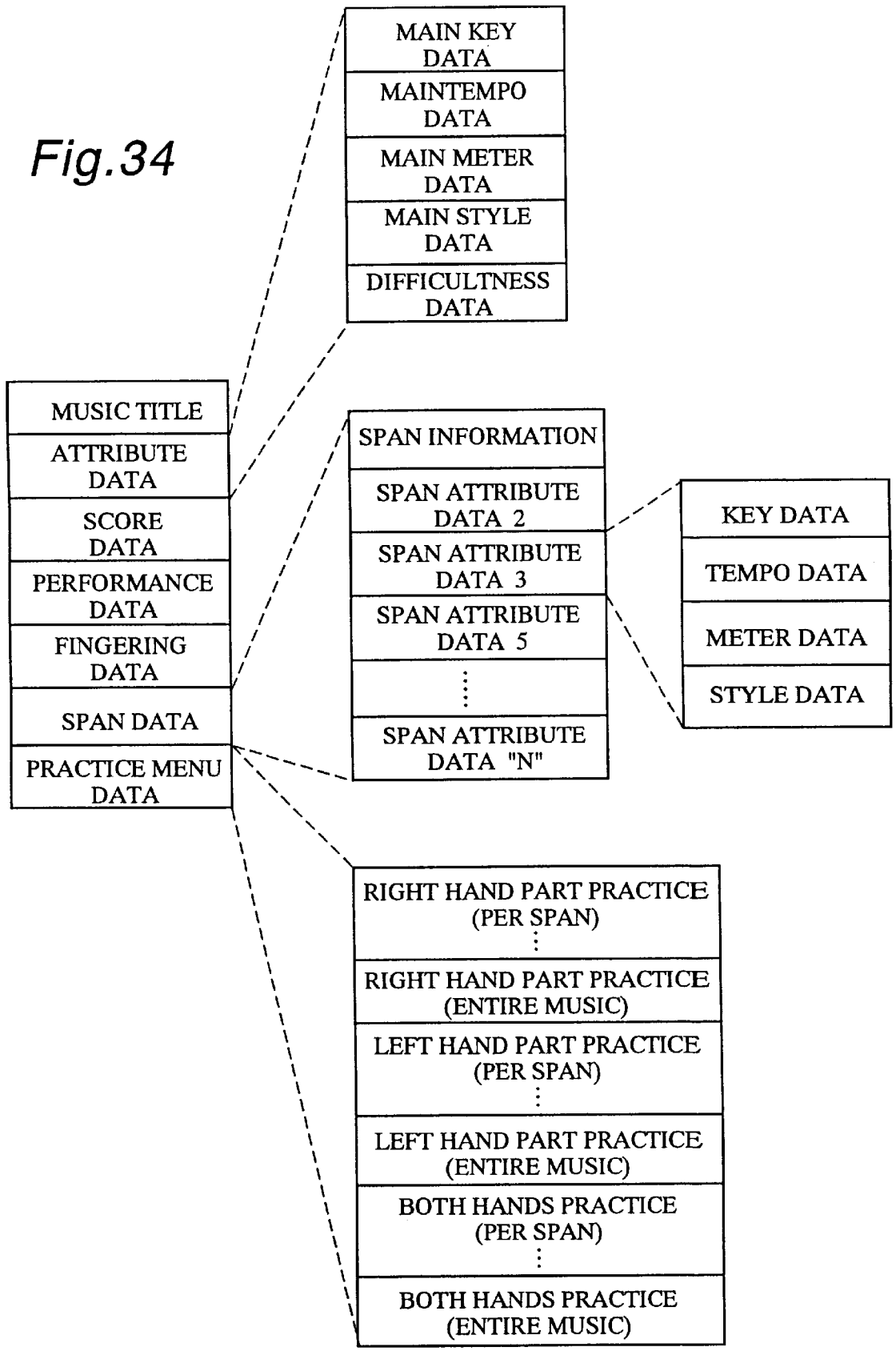
FIG. 34 is a memory map for general practice music in the hard disk for the third embodiment.

Each set of general music data comprises, as shown in FIG. 34, left column, music title data, attribute data, score data, performance data, fingering data, span data and practice menu data. The music title data, score data, performance data and fingering data are the same as those of the second embodiment. The attribute data, however, comprises main key data, main tempo data, main meter data, main style data and difficultness data. The main key data, the main tempo data and the main meter data respectively represent the key, the tempo and the meter which are mainly prevailing in the music piece, respectively. The main style data represent the mainly prevailing style of the music, for example any of plural kinds of style such as jazz, waltz, four-beat, eight-beat, sixteen-beat, classical and swing. The difficultness data represent the level of difficulty in performing the music in numeric values "1" (easiest) through "4" (most difficult).

The span data comprises two kinds of data, span information and span attribute information k. The span information indicates each of the spans of a general practice music piece conveniently demarcated for the practice purpose (practice unit), and each consists of a span number (1, 2, ...) and measure numbers included in the span (e.g. #1–8, #9–12, ...). The span attribute information k is provided only when the span k has any unique attributes (except for the difficultness) different from the main ones represented by the above-mentioned main key data, main tempo data, main meter data and main style data, respectively, and comprises the span number and any unique one or ones of the key data, the tempo data, the meter data and the style data of the span k. For example, in FIG. 34, spans 1 and 4 have attributes which are the same as those represented by the main key data, the main tempo data, the main meter data and the main style data, and therefore span attribute information 1 and 4 are not provided, while span attribute information 2, 3, 5, ... N are provided as seen in the drawing.

The practice menu data comprises data respectively representing a right hand part practice for every span, a right hand practice for the entire music piece, a left hand practice for every span, a left hand practice for the entire music piece, a both hand practice for every span and a both hand practice for the entire music piece. The data representing the practice of the right hand part, that of the left hand and that of the both hands for every span (span by span) each consist of a first data part representing which of the right hand practice, the left hand practice on the both hand practice and a second data part representing the span number of the practice.

On the other hand, there are a number of sets of specific music data in this embodiment (for example, for 123 pieces of music), and each data set for one specific practice music piece includes score data, performance data and fingering data as in the case of general music data. But with respect to the attribute data, an attribute table common to all of the specific practice music pieces is provided in the internal database 17. The attribute table memorizes, as shown in FIG. 35, the respective data of the meter, the key, the difficultness, the tempo, the style and the keyword on practice for each of the specific practice pieces #0001 through #0123. The style data includes "common" meaning that the practice piece is available for all kind of music irrespective of the style of the general practice music under practice by the student, in addition to the above-enumerated kinds as jazz, waltz, etc. The keywords on practice indicate what kinds of performance skill the student can master through the performance practice of that one specific practice music piece, such as skills of chord performance, thirds performance (notes progresses with an interval of a third), scale performance, fingering (fingering technique of directional change in pitch ascending and pitch descending progressions, cross-passing of a finger under other fingers), note jump (finger extensity), accidentals, modulation, triplets, syncopation, different rhythms for the right and left hands, and so forth.

Next, the operation of the third embodiment is described below. Also with the computer apparatus of this third embodiment, the programs of FIGS. 32 and 33 which are previously stored or memorized in a flexible disk 23 or a compact disk 24 are installed partly or wholly into the hard disk 16, and music pieces data stored in the external database 21, a flexible disk 23 or a compact disk 24 are transferred to the internal database 17, before the execution of the programs of FIGS. 32 and 33, as in the case of the second embodiment.

Figure 32:
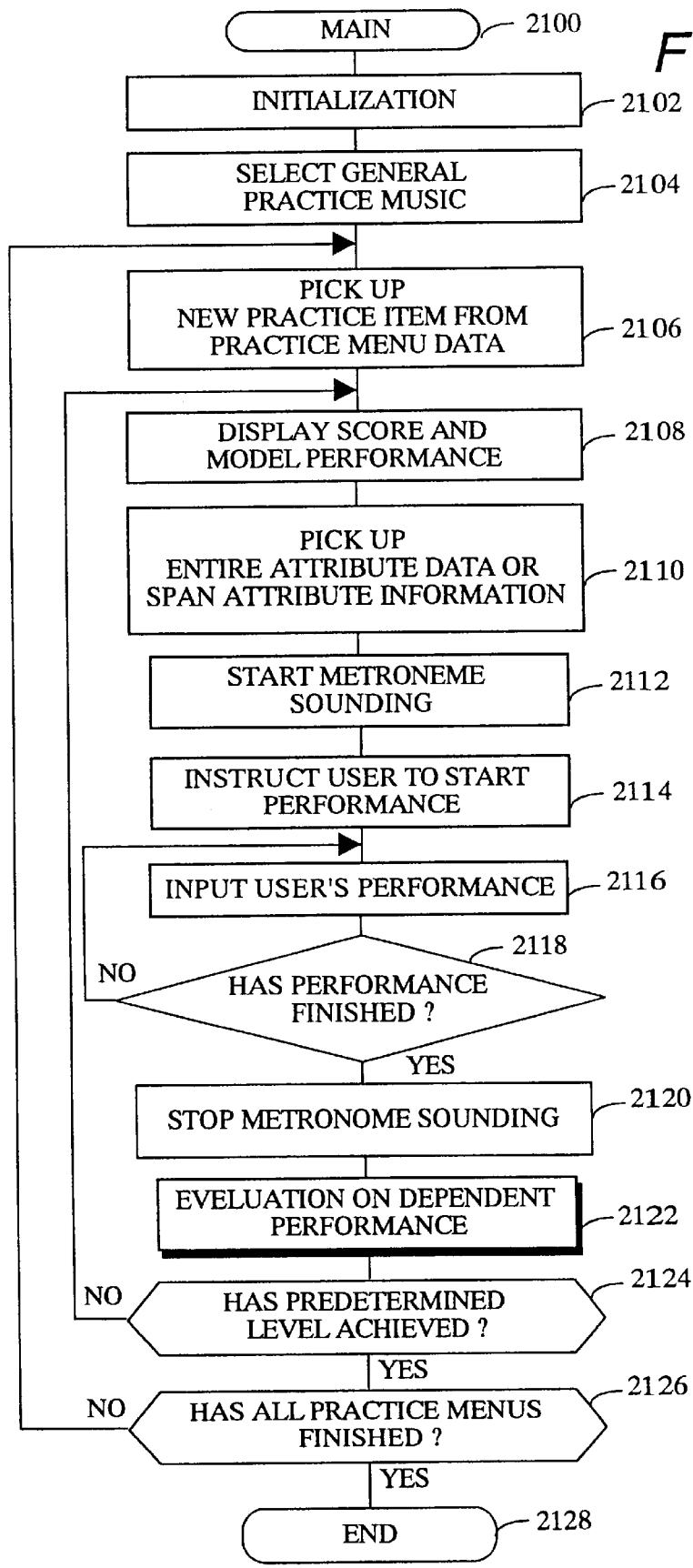
FIG. 32 is a flow chart of a main program used in the musical performance teaching system to implement a method of the third embodiment.

When the user initiates the main program of the third embodiment as shown in FIG. 32, the CPU 11 starts the execution of the main program at step 2100 of FIG. 32. After the start of the main program, the CPU 11 executes initialization at step 2102 and selection of a general practice music piece at step 2104. Specifically speaking, the CPU 11 indicates, "Enter the title of the music for practice." on the display 15, and the student will inputs the title of one of the general practice music pieces, then the CPU 11 reads out the general music data corresponding to the selected title of the general practice music from the internal database 17 and writes into the RAM 13. For the selection of a general practice music piece, the display 15 may show various titles of general practice music on the screen, and the student may simply select one from among them.

Next in step 2106, the CPU 11 reads out the data representing the first practice item or area (e.g. left hand part of span #1 ) from the practice menu data among the general music data written in the RAM 13 at the above step. Step 2108 is to cut out such portions of the music data, the performance data and the fingering data as are included in the practice span using the span information in the span data based on the read-out data representing the practice item, to display the score and the fingering indication of the span to practice based on the cut-out music data and fingering data, and to give a model performance based on the cut-out music data. The model performance is conducted in accordance with the attribute data of the music piece, whereas such an attribute data will be modified according to span attribute information k, in case the span attribute information k is included in the span data of the span designated by the data representing the practice item.

After the model performance, the CPU 11 picks up the entire attribute data (or span attribute information k, in case the span data of the designated span includes span attribute information k) of the above-mentioned music piece at step 2110, and starts emitting metronome sounds according to the tempo data in the attribute data of the music piece or the span attribute information k in the span data using the timer in the CPU 11 at step 2112. The reason for emitting the metronome sounds is for the student to perform in the correct tempo easily and for the CPU to judge whether the student is depressing the keys at correct timings as compared with the notes in the score.

After step 2112, the CPU 11 displays an instruction to the student to start performance in the display 15 at step 2114. In response thereto, the student conducts performance on the electronic musical instrument 25 according to the score shown on the display 15. During the performance by the student, the CPU 11 keeps on executing steps 2116 and 2118 repeatedly. At step 2116, the CPU 11 receives the performance data representing the student's performance from the electronic musical instrument 25 and writes into the RAM 13 together with the sounding timings of the metronome sounds. At step 2118, the CPU 11 judges whether the performance has finished by an agreement with any of the conditions that the student has finished the performance of all the notes included in the span designated by the data representing the practices item or area, that a predetermined time has elapsed since the instruction to start performance, and that the student has indicated the finish of the performance. If step 2118 judges "no" i.e. that the performance has not finished yet, the CPU 11 continues the looped process of steps 2116 and 2118 repeatedly. If step 2118 judges "yes" i.e. that the performance has finished, the program proceeds to step 2120.

At step 2120, the CPU 11 stops the metronome sounding. At step 2122, an evaluation dependent practice routine is executed. The evaluation dependent practice routine is to evaluate the student's performance and to present to the student a specific practice music in good accordance with the evaluation result so that the student can have a performance practice on a specific practice music which will be very helpful for improving the student's performance at the erroneously performed portion. The details will be described later. After the evaluation dependent practice routine, the CPU 11 judges whether the student's performance level has become above the predetermined level based on the evaluation result (the data representing the erred portions within errors stored in the RAM 13, which will be described later) by the evaluation dependent practice routine. If the student's performance level has not reached the predetermined level, step 2124 judges "no" and sends the program back to step 2108 to repeat steps 2108–2122 so that the student should have a performance practice of the same practice menu as before.

If the student's performance level has reached the predetermined level, step 2124 judges "yes" and proceeds the program to step 2126. Step 2126 judges whether all of the practice menus of the general practice music has finished or not, making reference to the practice menu data within the read out general music data. If all of the practice menus have not finished, step 2126 judges "no" and the program proceeds back to step 2106. At step 2106, the CPU takes out the data representing the next practice item or area from among the practice menu data within the general music data written in the RAM 13, and executes the processing by steps 2108–2124 again. In this way, the practice menus will be presented one after another for the student based on the menu data, and when all of the menu have been finished, step 2126 judges "yes" and the execution of the main program comes to an end at step 2128.

Figure 33:
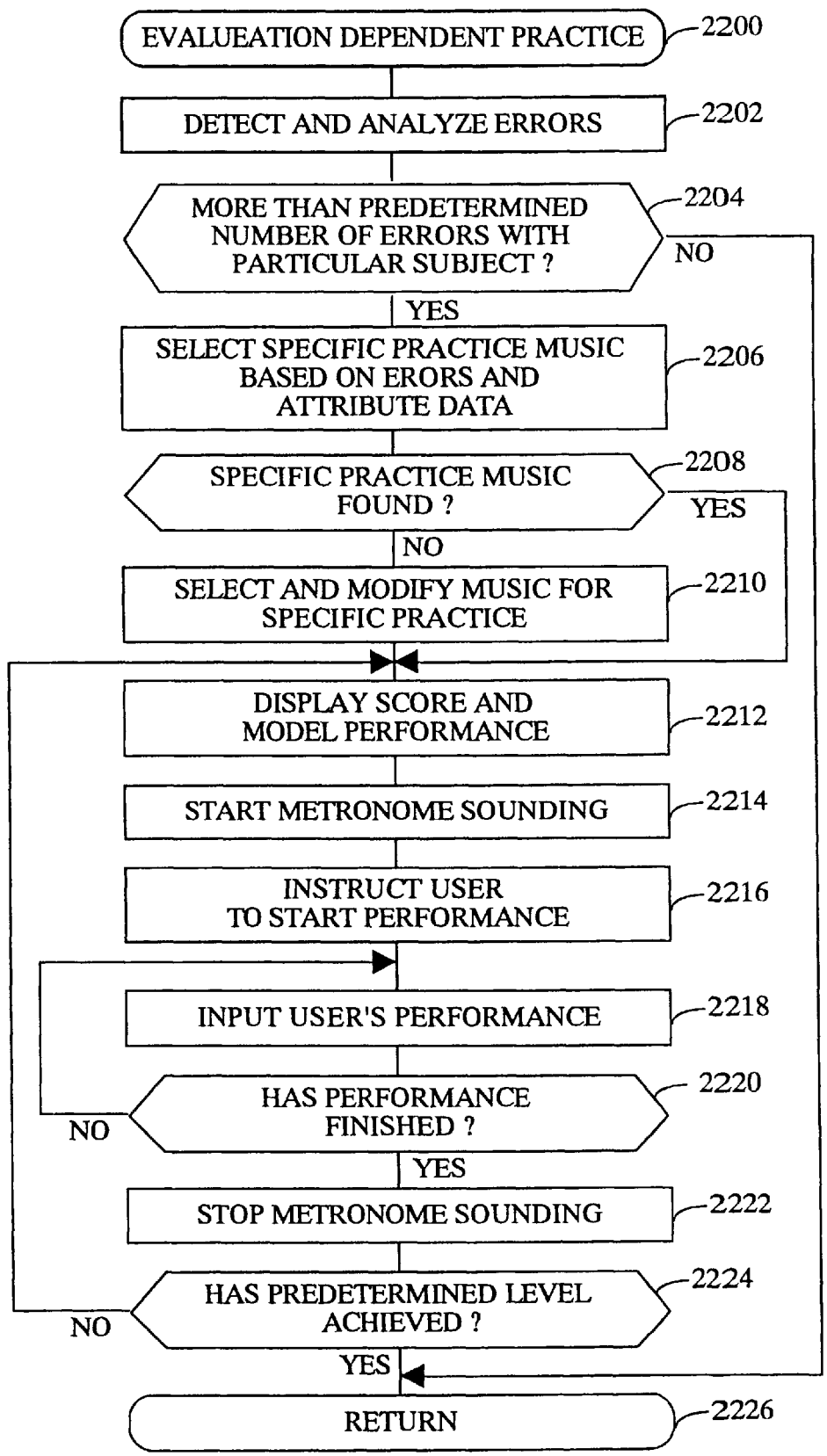
FIG. 33 is a flow chart of a evaluation dependent practice routine in the main program of FIG. 32.

The evaluation dependent practice routine will be described in detail with reference to FIG. 33 hereinbelow. The routine starts at step 2200. At step 2202, the CPU 11 compares the performance data which represents the student's performance and is stored in the RAM 13 by the process of step 2116 with the performance data which has been cut out from the general music data by the process of step 2108, and accordingly detects and analyzes the errors in the student's performance and store the details (or contents) of the errors in the RAM 13 temporarily. Herein the details of the errors cover the erred portions and the reasons of the errors. At step 2202, the erred portions will be distinctively shown on the display 15 by changing the color of the notes which were performed erroneously or by any other suitable methods.

The detection and analysis of the reasons for the errors is conducted, for example, in the following way. In case the student has depressed the key of a note without an accidental (i.e. a natural note) in response to the displayed note in the score of the general practice music is with an accidental, the reason for the error is presumed to be poor understanding of "the accidentals". In case the student has erroneously depressed the keys in a fast passage of the general practice music with some of the keys skipped, the reason for the error is presumed to be shortage of practice of "the scale performance". In case the student has depressed less keys in response to a chord in the general practice music, the reason for the error is presumed to be poor recognition or shortage of practice of "the chords". The data representing "accidentals", "scale" and "chords" which relate to such error reasons are the data items included in the keywords in the attribute table of the specific practice music, and are stored in the RAM 13 as the data to represent the specific item or subject.

The detection and analysis of the errors may be conducted by other ways than the above described way, such as by previously incorporating in the general music data the information about the subject with probable errors (misperformable portions and reasons) with respect to the respective practice menus, and analyzing whether the student's error corresponds to that subject. In this way, the accuracy and the speed of analysis will be increased.

In step 2204, the CPU 11 judges whether there have been more errors than the predetermined number with respect to a particular subject. If there are not more errors than the predetermined number, step 2204 judges "no" and then step 2226 ends the execution of the evaluation dependent practice routine. If there are more errors than the predetermined number, step 2204 judges "yes" and then the process goes to step 2206. At step 2206, the CPU 11 selects a specific music data relating to one specific practice music piece from among plural specific practice music pieces by referring to the attribute table relating to specific practice music pieces based on the error details as detected and analyzed (i.e. the data representing the specific subjects stored in the RAM 13) and on the attribute data (or span attribute data in case there is span data) relating to the general practice music piece under practice. In other words, the music piece title number of the specific practice music piece of which the data representing the subject and the attribute data (or span attribute data) of the general practice music piece under practice and the practice keyword in the attribute table relating to the specific practice music piece and the attribute data coincide with each other is read out from the attribute table.

Step 2208 judges whether a proper specific practice music piece has been found as a result of the selection (detection) process of 2206. When a proper practice music piece has not been found, step 2208 judges "no" and step 2210 reads out from the internal database 17 the specific music data representing the specific practice music piece having a highest coincidence rate between the data representing the subject and the keyword in the attribute table, and modifies the read out specific music data in accordance with the attribute data (or the span attribute information in the span data) relating to the general practice music piece. In this modifying process, the above read out specific music data is modified based on the attribute data representing the key, the tempo, the style, the meter and so forth of the general practice music piece under practice to make the attributes of the specific practice music piece coincide with the attributes of the general practice music piece. When a proper practice music piece has been found, step 2208 judges "yes" and the program proceeds to step 2212.

Step 2212 displays on the display 15 the score of the specific practice music piece with the fingering guide based on the specific music data read out at step 2206 or the specific music data modified by the process of step 2210, give a model performance of the same. The succeeding steps 2214–2220 are to conduct a similar processing as above steps 2112–2118 in FIG. 32 to emit the metronome sounds and let the student to practice performance on the electronic musical instrument 25, receiving the student's performance data until the performance finishes.

After above steps 2214–2220, step 2222 stops the metronome sounding and step 2224 judges whether the student's performance level has reached a predetermined passing level by comparing the performance data inputted by the student with the performance data in the above read out specific music data (or the above modified specific music data). If the predetermined level has not been achieved by the student, step 2224 judges "no" and the process goes back to step 2212 to repeat the looped process of steps 2212–2224. If the predetermined level has been achieved by the student, step 2224 judges "yes" and the process goes to step 2226 to end the execution of this evaluation dependent practice.

As is apparent from the above described operation, the third embodiment provides the evaluation by the detection and analysis of the error details in the student's performance with respect to the general practice music and provides the presentation of the proper (most adequate) specific practice music piece for the student to practice on the general practice music piece. This will greatly enhance the student's training will, and help the student who cannot make a good practice plan by presenting efficient specific practice music pieces. Thus the student can conduct an effective and efficient performance training.

While the step 2206 in the above-described third embodiment selects the specific practice music piece according to the whole coincidence of the attributes and practice keywords (items), the partial coincidence at more than a predetermined value may select the specific practice music piece. Or putting weighting factors on the respective items as the meter, the key, the tempo and the style in the attributes and the practice keywords, weighted sum of the coincident items may be competed in order to select the specific practice music piece having the greatest sum omitting steps 2208 and 2210. Or alternatively, such a weighted sum is to decide the specific practice music piece only when the sum exceeds a predetermined value, and the process by steps 2208 and 2210 is to be conducted to modify the specific music data of the specific music piece having the greatest value of the weighted sum when none of the sums exceeds the predetermined value. In weighting, for example, larger weighting factors may be given to those keywords which directly relates to the student's performance skill and which is difficult to improve, while smaller weighting factors may be given to those attributes as the tempo, meter, and the like, so that the weak points of the student will be well decreased and the modification process at step 2210 will become simple. A further alternative will be to select one from plural specific practice music pieces at random when plural specific practice music pieces have been selected by the regular program processing. With this variation, the specific practice music pieces may be less in number, the modification of the specific practice music piece will become simple and the memory capacity and the data entry cost will be decreased.

In the process of the above step 2206, it is preferable to select the specific practice music piece based on both the evaluation result of the student's performance and the attributes of the general practice music piece, but the selection may be conducted based on either the evaluation result of the student's performance or the attributes of the general practice music piece. In other words, the teaching system of the present invention can be constructed in such a way that the selection of the specific practice music piece is done by using at least either of the evaluation result of the student's performance represented by the coincidence rate between the data representing the items and the practice keyword in the attribute table relating to the specific practice music piece and the coincidence between the attributes of the general practice music piece and the attributes of the specific practice music piece.

Further in the third embodiment, step 2210 selects a specific practice music piece in accordance with the evaluation results of the student's performance and modifies the specific music data representing the selected specific practice music piece to match the attributes of the general practice music piece under practice. Alternatively, the specific practice music piece may be selected based on both the evaluation result (item) of the student's performance and the attributes of the general practice music piece under practice or on only the attributes of the general practice music piece under practice. Or further, the specific music data representing the selected specific practice music piece may be modified in accordance with the both of the above mentioned factors or with the evaluation result of the student's performance only.

Further in the above step 2210, the modification process is to modify the specific music data selected from among a plurality of specific music data, but alternatively only one set of fundamental specific music data may be prepared for the modification purpose and stored in the internal database 17, whereas the modification process may modify this fundamental specific music data based on both or either of the evaluation result of the student's performance (per item) and the attribute data (or span attribute data in case there are span data) of the general music data under practice. In this way, time for selecting a specific practice music piece and for modifying the specific music data corresponding to the specific practice music piece.

Further in the above steps 2206 and 2210 of the third embodiment, the difficultness of the general practice music piece corresponds to that of the specific practice music piece, but alternatively the user's performance level as an evaluation result may correspond to the difficultness of the specific practice music piece. In other words, the user's performance level may be used for selecting a specific practice music piece of difficultness which meets the user's performance level or for modifying a specific practice music piece to meet the user's performance level.

Further in the third embodiment, step 2224 is to repeat the practice on the same specific practice music piece again, when the user's performance level has not achieved a certain predetermined level, but alternatively another specific practice music piece having a one-rank-lower performance level may be given to the student for its training.

Further in the third embodiment, the specific music data are stored in the internal database 17, but alternatively some parameterized specific music data may be stored in the hard disk 16 beforehand and a specific practice music piece may be composed based on the parameters in advance or in real time.

D. MODIFICATIONS COMMON TO EMBODIMENTS 1–3

In the embodiments 1–3 above, there are provided an internal database 17 and an external database 21, but alternatively the internal database may be omitted and the practice music data may be inputted directly into the RAM 13 and/or the hard disk 16 from the external database 21. Further in place of connecting to the external database 21, the music data in the internal database 17 may be renewed from time to time so that a number of students may use the same internal database 17 in common.

Further in the embodiments 1–3 above, the electronic musical instrument 25 is of a keyboard type, but alternatively any other type may be employed such as an electronic wind musical instrument and an electronic percussion musical instrument, as long as the instrument is provided with the switches which detect the manipulation of the actuating elements by the player so that the switches triggers the generation of musical tone signals. And further if a natural musical instrument like a piano is provided with additional switches and associated electronic circuits to detect the key depression and the key touch, such a piano may be used in place of the above-mentioned electronic musical instrument 25.

Further in the embodiments 1–3 above, the program for use is usually stored in an external storage device and is transferred to the hard disk 16 to be executed by the computer, but alternatively the program may be usually stored in the ROM 12 and/or the hard disk 16 beforehand, or the program may be transferred from a host computer 22 via a communication interface 18 before starting the practice on this teaching system.

What is claimed is:

1. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

judging means for making judgment about performance skill of the student based on said performance data utilizing said display device, music data providing means for providing a number of practice music pieces in data form, music selecting means for selecting music data of a practice music piece for training of the student from among said number of practice music pieces provided by said music data providing means, the selection being made in accordance with said judgment made about the performance skill of the student, and performance training means for training the student by presenting a musical score on said display device based on said selected music data to be practiced by the student.

2. A musical performance teaching system as claimed in claim 1, further comprising:

request input means for inputting requests from the student upon querying the student about requests in regard to training that utilizes said display device, wherein said music selecting means selects music data of a practice music piece reflecting said requests inputted by said request input means.

3. A musical performance teaching system as claimed in claim 1, further comprising:

evaluation means for making an evaluation of practice results based on the performance data of the student from said electronic musical instrument after a certain amount of practice by the student.

4. A musical performance teaching system as claimed in claim 3, further comprising:

judgment adjusting means for adjusting said judgment reflecting said evaluation of practice results by said evaluation means.

5. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

declaration means for entering a performance skill of the student by querying the student through said display device, subject presenting means for presenting on said display device a subject for practice of musical performance of a level which meets said declaration by the student, and judging means for making judgment about performance skill of the student with respect to said subject for practice upon receipt of said performance data from the electronic musical instrument.

6. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

subject presenting means for presenting on said display device in sequence a plurality of subjects for practice of musical performance with respect to various areas of performance skill of the student, and judging means for making judgment respectively about said various areas of performance skill of the student on the respective subjects for practice upon receipt of said performance data from the electronic musical instrument.

7. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

user model memory means for storing user model data representing performance skill of the student, practice scheduling means for providing a schedule of training musical instrument performance skill based on said user model data, and performance training means for training the student in accordance with said schedule of training.

8. A musical performance teaching system as claimed in claim 7, further comprising:

request input means for inputting requests from the student upon querying the student about requests in regard to the training utilizing said display device, wherein said scheduling means provides a schedule of training musical instrument performance skill reflecting said requests inputted by said request input means.

9. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

practice schedule memory means for storing practice schedule data representing a schedule of training for a musical instrument performance skill of the student, performance training means for training the student in accordance with the schedule based on said practice schedule data, and writing means for writing practice results of the student's performance training into said practice schedule memory means.

10. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

practice schedule memory means for storing practice schedule data representing a schedule of training musical instrument performance skill of the student, performance training means for training the student by presenting matters to practice on said display device in accordance with the schedule based on said practice schedule data, evaluation means for making an evaluation of practice results based on the performance data of the student from said electronic musical instrument, and progression control means for controlling the progression of the training based on said schedule of training reflecting said evaluation of practice results.

11. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

music data memory means for storing a number of practice music pieces in data form, performance training means for training the student by presenting on said display device in sequence a plurality of portions of a music piece to be practiced by the student based on said stored practice music data, evaluation means for making an evaluation of performance skill of the student based on the performance data of the student from said electronic musical instrument, and progressing rate control means for controlling the rate of display progression of said plurality of portions of the music piece to be practiced by the student reflecting said evaluation of the practice results.

12. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

practice schedule memory means for storing practice schedule data representing a schedule of training musical instrument performance skill of the student, music data memory means for storing a number of practice music pieces in data form, and performance training means for training the student by presenting on said display device matters to practice of a practice music piece in accordance with the schedule based on said practice schedule data and said practice music data.

13. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

subject presentation means for presenting on said display device in sequence different subjects for judgment or practice, evaluation means for making an evaluation of responses of the student to said subjects based on the performance data of the student from said electronic musical instrument and accordingly controlling said subject presenting means to proceed to the next subject to practice, and forcible progressing means for controlling said subject presentation means to proceed to the next subject presentation by starting a count time from the presentation of each subject and forcedly suspending the current presentation of said each subject after the lapse of a predetermined time from the start of the count time irrespective of the evaluation by said evaluation means.

14. A musical performance teaching system as claimed in claim 1, further comprising:

accounting means for billing money charges corresponding to the time length of the computer use by the student.

15. A musical performance teaching method using a computer apparatus having a display device and an electronic musical instrument to be connected to said computer apparatus for data communication therebetween, said electronic musical instrument being adapted for playing by a student and transmitting performance data representing said playing by the student to said computer apparatus, said method comprising the steps of:

making judgment about performance skill of the student based on said performance data utilizing said display device, providing a number of practice music pieces in data form, selecting music data of a practice music piece for training of the student from among said number of practice music pieces in accordance with said judgment made about the performance skill of the student, and training the student by presenting a musical score on said display device based on said selected music data to be practiced by the student.

16. A musical performance teaching method as claimed in claim 15, further comprising the steps of:

inputting requests from the student upon querying the student about requests in regard to the training utilizing said display device, wherein said step of selecting music data selects music data of a practice music piece reflecting said requests inputted through said step of inputting requests.

17. A musical performance teaching method as claimed in claim 15, further comprising the step of:

making an evaluation of practice results based on the performance data of the student from said electronic musical instrument after a certain amount of practice by the student.

18. A musical performance teaching method as claimed in claim 17, further comprising the step of:

adjusting said judgment reflecting said evaluation of practice results.

19. A musical performance teaching method using a computer apparatus having a display device and an electronic musical instrument to be connected to said computer apparatus for data communication therebetween, said electronic musical instrument being adapted for playing by a student and transmitting performance data representing said playing by the student to said computer apparatus, said method comprising the steps of:

entering a performance skill of the student by querying the student through said display device, presenting on said display device a subject for practice of musical performance of a level which meets said declaration by the student, and making judgment about performance skill of the student with respect to said subject for practice upon receipt of said performance data from the electronic musical instrument.

20. A musical performance teaching method using a computer apparatus having a display device and an electronic musical instrument to be connected to said computer apparatus for data communication therebetween, said electronic musical instrument being adapted for playing by a student and transmitting performance data representing said playing by the student to said computer apparatus, said method comprising the steps of:

presenting on said display device in sequence a plurality of subjects for practice of musical performance with respect to various areas of performance skill of the student, and making judgment respectively about said various areas of performance skill of the student on the respective subjects for practice upon receipt of said performance data from the electronic musical instrument.

21. A musical performance teaching method using a computer apparatus having a display device and an electronic musical instrument to be connected to said computer apparatus for data communication therebetween, said electronic musical instrument being adapted for playing by a student and transmitting performance data representing said playing by the student to said computer apparatus, said method comprising the steps of:

storing user model data representing performance skill of the student, providing a schedule of training musical instrument performance skill based on said user model data, and training the student in accordance with said schedule of training.

22. A musical performance teaching method as claimed in claim 21 comprising the step of:

inputting requests from the student upon querying the student about requests in regard to the training utilizing said display device, wherein said schedule of training musical instrument performance skill is provided by reflecting said requests.

23. A musical performance teaching method using a computer apparatus having a display device and an electronic musical instrument to be connected to said computer apparatus for data communication therebetween, said electronic musical instrument being adapted for playing by a student and transmitting performance data representing said playing by the student to said computer apparatus, said method comprising the steps of:

storing practice schedule data representing a schedule of training for a musical instrument performance skill of the student, training the student in accordance with the schedule based on said practice schedule data, and writing practice results of the student's performance training in addition to said practice schedule data.

24. A musical performance teaching method using a computer apparatus having a display device and an electronic musical instrument to be connected to said computer apparatus for data communication therebetween, said electronic musical instrument being adapted for playing by a student and transmitting performance data representing said playing by the student to said computer apparatus, said method comprising the steps of:

storing practice schedule data representing a schedule of training musical instrument performance skill of the student, training the student by presenting matters to practice on said display device in accordance with the schedule based on said practice schedule data, making an evaluation of practice results based on the performance data of the student from said electronic musical instrument, and controlling the progression of the training based on said schedule of training reflecting said evaluation of practice results.

25. A musical performance teaching method using a computer apparatus having a display device and an electronic musical instrument to be connected to said computer apparatus for data communication therebetween, said electronic musical instrument being adapted for playing by a student and transmitting performance data representing said playing by the student to said computer apparatus, said method comprising the steps of:

storing a number of practice music pieces in data form, training the student by presenting on said display device in sequence a plurality of portions of a music piece to be practiced by the student based on said stored practice music data, making an evaluation of performance skill of the student based on the performance data of the student from said electronic musical instrument, and controlling the rate of display progression of said plurality of portions of the music piece to be practiced by the student reflecting said evaluation of the practice results.

26. A musical performance teaching method using a computer apparatus having a display device and an electronic musical instrument to be connected to said computer apparatus for data communication therebetween, said electronic musical instrument being adapted for playing by a student and transmitting performance data representing said playing by the student to said computer apparatus, said method comprising the steps of:

storing practice schedule data representing a schedule of training for a musical instrument performance skill of the student, storing a number of practice music pieces in data form, and training the student by presenting on said display device matters to practice of a practice music piece in accordance with the schedule based on said practice schedule data and said practice music data.

27. A musical performance teaching method using a computer apparatus having a display device and an electronic musical instrument to be connected to said computer apparatus for data communication therebetween, said electronic musical instrument being adapted for playing by a student and transmitting performance data representing said playing by the student to said computer apparatus, said method comprising the steps of:

presenting on said display device in sequence different subjects for judgment or practice, making an evaluation of responses of the student to said subjects based on the performance data of the student from said electronic musical instrument and accordingly proceeding to the next subject to practice, and forcibly proceeding to the next subject presentation by starting a count time from the presentation of each subject and forcedly suspending the current presentation of said each subject after the lapse of a predetermined time from the start of the count time irrespective of the evaluation.

28. A musical performance teaching system as claimed in claim 15, further comprising the step of:

keeping accounting for billing money charges corresponding to the time length of the computer use by the student.

29. A machine readable medium for use in a musical performance teaching system of a data processing type comprising a computer apparatus having a display device and an electronic musical instrument connected to said computer apparatus for data communication therebetween, said electronic musical instrument being adapted for playing by a student and transmitting performance data representing said playing by the student to said computer apparatus, said medium containing program instructions executable by said computer apparatus for causing the musical performance teaching system to perform the steps of:

making judgment about performance skill of the student based on said performance data utilizing said display device, providing a number of practice music pieces in data form, selecting music data of a practice music piece for training of the student from among said number of practice music pieces in accordance with said judgment made about the performance skill of the student, and training the student by presenting a musical score on said display device based on said selected music data to be practiced by the student.

30. A machine readable medium as claimed in claim 29, further containing program instructions executable by said computer apparatus for causing the musical performance teaching system to perform the step of:

inputting requests from the student upon querying the student about requests in regard to the training utilizing said display device, wherein said step of selecting music data selects music data of a practice music piece reflecting said requests inputted through said step of inputting requests.

31. A machine readable medium as claimed in claim 29, further containing program instructions executable by said computer apparatus for causing the musical performance teaching system to perform the step of:

making an evaluation of practice results based on the performance data of the student from said electronic musical instrument after a certain amount of practice by the student.

32. A machine readable medium as claimed in claim 31, further containing program instructions executable by said computer apparatus for causing the musical performance teaching system to perform the step of:

adjusting said judgment reflecting said evaluation of practice results.

33. A machine readable medium for use in a musical performance teaching system of a data processing type comprising a computer apparatus having a display device and an electronic musical instrument connected to said computer apparatus for data communication therebetween, said electronic musical instrument being adapted for playing by a student and transmitting performance data representing said playing by the student to said computer apparatus, said medium containing program instructions executable by said computer apparatus for causing the musical performance teaching system to perform the steps of:

entering a performance skill of the student by querying the student through said display device, presenting on said display device a subject for practice of musical performance of a level which meets said declaration by the student, and making judgment about performance skill of the student with respect to said subject for practice upon receipt of said performance data from the electronic musical instrument.

34. A machine readable medium for use in a musical performance teaching system of a data processing type comprising a computer apparatus having a display device and an electronic musical instrument connected to said computer apparatus for data communication therebetween, said electronic musical instrument being adapted for playing by a student and transmitting performance data representing said playing by the student to said computer apparatus, said medium containing program instructions executable by said computer apparatus for causing the musical performance teaching system to perform the steps of:

presenting on said display device in sequence a plurality of subjects for practice of musical performance with respect to various areas of performance skill of the student, and making judgment respectively about said various areas of performance skill of the student on the respective subjects for practice upon receipt of said performance data from the electronic musical instrument.

35. A machine readable medium for use in a musical performance teaching system of a data processing type comprising a computer apparatus having a display device and an electronic musical instrument connected to said computer apparatus for data communication therebetween, said electronic musical instrument being adapted for playing by a student and transmitting performance data representing said playing by the student to said computer apparatus, said medium containing program instructions executable by said computer apparatus for causing the musical performance teaching system to perform the steps of:

storing user model data representing performance skill of the student, providing a schedule of training for a musical instrument performance skill based on said user model data, and training the student in accordance with said schedule of training.

36. A machine readable medium as claimed in claim 35, further containing program instructions executable by said computer apparatus for causing the musical performance teaching system to perform the step of:

inputting requests from the student upon querying the student about requests in regard to the training utilizing said display device, wherein said schedule of training musical instrument performance skill is provided by reflecting said requests.

37. A machine readable medium for use in a musical performance teaching system of a data processing type comprising a computer apparatus having a display device and an electronic musical instrument connected to said computer apparatus for data communication therebetween, said electronic musical instrument being adapted for playing by a student and transmitting performance data representing said playing by the student to said computer apparatus, said medium containing program instructions executable by said computer apparatus for causing the musical performance teaching system to perform the steps of:

storing practice schedule data representing a schedule of training musical instrument performance skill of the student, training the student in accordance with the schedule based on said practice schedule data, and writing practice results of the student's performance training in addition to said practice schedule data.

38. A machine readable medium for use in a musical performance teaching system of a data processing type comprising a computer apparatus having a display device and an electronic musical instrument connected to said computer apparatus for data communication therebetween, said electronic musical instrument being adapted for playing by a student and transmitting performance data representing said playing by the student to said computer apparatus, said medium containing program instructions executable by said computer apparatus for causing the musical performance teaching system to perform the steps of:

storing practice schedule data representing a schedule of training musical instrument performance skill of the student, training the student by presenting matters to practice on said display device in accordance with the schedule based on said practice schedule data, making an evaluation of practice results based on the performance data of the student from said electronic musical instrument, and controlling the progression of the training based on said schedule of training reflecting said evaluation of practice results.

39. A machine readable medium for use in a musical performance teaching system of a data processing type comprising a computer apparatus having a display device and an electronic musical instrument connected to said computer apparatus for data communication therebetween, said electronic musical instrument being adapted for playing by a student and transmitting performance data representing said playing by the student to said computer apparatus, said medium containing program instructions executable by said computer apparatus for causing the musical performance teaching system to perform the steps of:

storing a number of practice music pieces in data form, training the student by presenting on said display device in sequence a plurality of portions of a music piece to be practiced by the student based on said stored practice music data, making an evaluation of performance skill of the student based on the performance data of the student from said electronic musical instrument, and controlling the rate of display progression of said plurality of portions of the music piece to be practiced by the student reflecting said evaluation of the practice results.

40. A machine readable medium for use in a musical performance teaching system of a data processing type comprising a computer apparatus having a display device and an electronic musical instrument connected to said computer apparatus for data communication therebetween, said electronic musical instrument being adapted for playing by a student and transmitting performance data representing said playing by the student to said computer apparatus, said medium containing program instructions executable by said computer apparatus for causing the musical performance teaching system to perform the steps of:

storing practice schedule data representing a schedule of training musical instrument performance skill of the student, storing a number of practice music pieces in data form, and training the student by presenting on said display device matters to practice of a practice music piece in accordance with the schedule based on said practice schedule data and said practice music data.

41. A machine readable medium for use in a musical performance teaching system of a data processing type comprising a computer apparatus having a display device and an electronic musical instrument connected to said computer apparatus for data communication therebetween, said electronic musical instrument being adapted for playing by a student and transmitting performance data representing said playing by the student to said computer apparatus, said medium containing program instructions executable by said computer apparatus for causing the musical performance teaching system to perform the steps of:

presenting on said display device in sequence different subjects for judgment or practice, making an evaluation of responses of the student to said subjects based on the performance data of the student from said electronic musical instrument and accordingly proceeding to the next subject to practice, and forcibly proceeding to the next subject presentation by starting a count time from the presentation of each subject and forcedly suspending the current presentation of said each subject after the lapse of a predetermined time from the start of the count time irrespective of the evaluation.

42. A machine readable medium as claimed in any one of claims 29 through 41, further containing program instructions executable by said computer apparatus for causing the musical performance teaching system to perform the step of:

keeping accounting for billing money charges corresponding to the time length of the computer use by the student.

43. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

tutoring manner selecting means for the student to select a manner of tutoring musical performance, and performance training means for training the student in performance of a musical instrument according to the manner of tutoring as selected by the student.

44. A musical performance teaching system as claimed in claim 43, wherein said manner of tutoring is comprised of a combination of each selected sub-manner respectively from a plurality of manner elements, and said tutoring manner selecting means selects one from a plurality of manner patterns which are different combinations of the sub-manners respectively from said plurality of manner elements, with one sub-manner from one manner element.

45. A musical performance teaching system as claimed in claim 43, wherein said manner of tutoring is comprised of a combination of each selected sub-manner respectively from a plurality of manner elements, and said tutoring manner selecting means selects sub-manners respectively from a plurality of manner elements, with one sub-manner from one manner element.

46. A musical performance teaching method using a computer apparatus having a display device and an electronic musical instrument to be connected to said computer apparatus for data communication therebetween, said electronic musical instrument being adapted for playing by a student and transmitting performance data representing said playing by the student to said computer apparatus, said method comprising the steps of:

permitting the student to select a manner of tutoring musical performance, and training the student in performance of a musical instrument according to the manner of tutoring as selected by the student.

47. A machine readable medium as claimed in claim 29, further comprising program instructions executable by said computer apparatus for causing the musical performance teaching system to perform the step of:

keeping accounting for billing money charges corresponding to the time length of the computer use by the student.

48. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

memory means for storing plural sets of first music data, each set representing a practice music piece of a first kind among a plurality thereof, and plural sets of second music data, each set representing a practice music piece of a second kind from among a plurality thereof, the practice music pieces of said second kind being so composed as to serve for mastering performance of a practice music piece of said first kind;

first selection means for selecting any of the plurality of practice music pieces of said first kind;

first performance training means for training the student by presenting a practice music piece of said first kind based on the first music data representing the selected practice music piece of said first kind;

evaluation means for making an evaluation of practice progress based on the performance data of the student from said electronic musical instrument in comparison with said first music data of said selected practice music piece of the first kind;

second selection means for selecting a practice music piece of said second kind from among the plurality of practice music pieces of said second kind based on at least either of said first music data of said selected practice music piece of the first kind and said evaluation of practice progress; and second performance training means for training the student by presenting a practice music piece of said second kind based on the second music data representing the selected practice music piece of said second kind.

49. A musical performance teaching system as claimed in claim 48, further comprising:

modifying means for modifying said second music data representing the selected practice music piece of said second kind based on at least either of said first music data of said selected practice music piece of the first kind and said evaluation of practice progress by said evaluation means;

wherein said second performance training means presents a modified practice music piece of said second kind based on said modified second music data in place of said selected practice music piece of the second kind.

50. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

memory means for storing plural sets of first music data, each set representing a practice music piece of a first kind among a plurality thereof, and a set of second music data, representing a practice music piece of a second kind, the practice music pieces of said second kind being so composed as to serve for mastering performance of a practice music piece of said first kind;

selection means for selecting any of the plurality of practice music pieces of said first kind;

first performance training means for training the student by presenting a practice music piece of said first kind based on the first music data representing the selected practice music piece of said first kind;

evaluation means for making an evaluation of practice progress based on the performance data of the student from said electronic musical instrument in comparison with said first music data of said selected practice music piece of the first kind;

modifying means for modifying said second music data representing the practice music piece of said second kind based on at least either of said first music data of said selected practice music piece of the first kind and said evaluation of practice progress by said evaluation means; and second performance training means for training the student by presenting a modified practice music piece of the second kind based on said modified second music data.

51. A musical performance teaching method using a computer apparatus having a display device and an electronic musical instrument to be connected to said computer apparatus for data communication therebetween, said electronic musical instrument being adapted for playing by a student and transmitting performance data representing said playing by the student to said computer apparatus, said method comprising the steps of:

selecting any of a plurality of practice music pieces of a first kind respectively represented by plural sets of first music data stored in a memory;

training the student by presenting said practice music piece of the first kind based on the first music data representing the selected practice music piece of said first kind;

making an evaluation of practice progress based on the performance data of the student from said electronic musical instrument in comparison with said first music data of said selected practice music piece of the first kind;

selecting a practice music piece of a second kind from among a plurality of practice music pieces of said second kind respectively represented by plural sets of second music data stored in a memory based on at least either of said first music data of said selected practice music piece of the first kind and said evaluation of practice progress, the practice music pieces of said second kind being so composed as to serve for mastering performance of a practice music piece of said first kind; and training the student by presenting a practice music piece of said second kind based on the second music data representing the selected practice music piece of said second kind.

52. A musical performance teaching method as claimed in claim 51, further comprising the steps of:

modifying said second music data representing the selected practice music piece of said second kind based on at least either of said first music data of said selected practice music piece of the first kind and said evaluation of practice progress;

wherein said step of training the student presents a modified practice music piece of said second kind based on said modified second music data in place of said selected practice music piece of the second kind.

53. A musical performance teaching method using a computer apparatus having a display device and an electronic musical instrument to be connected to said computer apparatus for data communication therebetween, said electronic musical instrument being adapted for playing by a student and transmitting performance data representing said playing by the student to said computer apparatus, said method comprising the steps of:

selecting any of a plurality of practice music pieces of a first kind respectively represented by plural sets of first music data stored in a memory;

training the student by presenting said practice music piece of the first kind based on the first music data representing the selected practice music piece of said first kind;

making an evaluation of practice progress based on the performance data of the student from said electronic musical instrument in comparison with said first music data of said selected practice music piece of the first kind;

modifying second music data representing a practice music piece of a second kind stored in a memory based on at least either of said first music data of said selected practice music piece of the first kind and said evaluation of practice progress, the practice music pieces of said second kind being so composed as to serve for mastering performance of a practice music piece of said first kind; and training the student by presenting a modified practice music piece of the second kind based on said modified second music data.

54. A machine readable medium for use in a musical performance teaching system of a data processing type comprising a computer apparatus having a display device and an electronic musical instrument connected to said computer apparatus for data communication therebetween, said electronic musical instrument being adapted for playing by a student and transmitting performance data representing said playing by the student to said computer apparatus, said medium containing program instructions executable by said computer apparatus for causing the musical performance teaching system to perform the steps of:

selecting any of a plurality of practice music pieces of a first kind respectively represented by plural sets of first music data stored in a memory;

training the student by presenting said practice music piece of the first kind based on the first music data representing the selected practice music piece of said first kind;

making an evaluation of practice progress based on the performance data of the student from said electronic musical instrument in comparison with said first music data of said selected practice music piece of the first kind;

selecting a practice music piece of a second kind from among a plurality of practice music pieces of said second kind respectively represented by plural sets of second music data stored in a memory based on at least either of said first music data of said selected practice music piece of the first kind and said evaluation of practice progress, the practice music pieces of said second kind being so composed as to serve for mastering performance of a practice music piece of said first kind; and training the student by presenting a practice music piece of said second kind based on the second music data representing the selected practice music piece of said second kind.

55. A machine readable medium as claimed in claim 54, further containing program instructions executable by said computer apparatus for causing the musical performance teaching system to perform the step of:

modifying said second music data representing the selected practice music piece of said second kind based on at least either of said first music data of said selected practice music piece of the first kind and said evaluation of practice progress;

wherein said step of training the student presents a modified practice music piece of said second kind based on said modified second music data in place of said selected practice music piece of the second kind.

56. A machine readable medium for use in a musical performance teaching system of a data processing type comprising a computer apparatus having a display device and an electronic musical instrument connected to said computer apparatus for data communication therebetween, said electronic musical instrument being adapted for playing by a student and transmitting performance data representing said playing by the student to said computer apparatus, said medium containing program instructions executable by said computer apparatus for causing the musical performance teaching system to perform the steps of:

selecting any of a plurality of practice music pieces of a first kind respectively represented by plural sets of first music data stored in a memory;

training the student by presenting said practice music piece of the first kind based on the first music data representing the selected practice music piece of said first kind;

making an evaluation of practice progress based on the performance data of the student from said electronic musical instrument in comparison with said first music data of said selected practice music piece of the first kind;

modifying second music data representing a practice music piece of a second kind stored in a memory based on at least either of said first music data of said selected practice music piece of the first kind and said evaluation of practice progress, the practice music pieces of said second kind being so composed as to serve for mastering performance of a practice music piece of said first kind; and training the student by presenting a modified practice music piece of the second kind based on said modified second music data.

57. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

a judging device that makes judgments about a performance skill of the student based on said performance data utilizing said display device;

a music data providing device that provides a number of practice music pieces in data form;

a music selecting device that selects music data of a practice music piece for training of the student from among said number of practice music pieces provided by said music data providing device, wherein the selection is made in accordance with said judgment made about the performance skill of the student; and a performance training device that trains the student by presenting a musical score on said display device based on said selected music data to be practiced by the student.

58. A musical performance teaching system as claimed in claim 57, further comprising:

a request input device that inputs requests from the student upon querying the student about requests in regard to training that utilizes said display device;

wherein said music selecting device selects music data of a practice music piece reflecting said requests inputted by said request input device.

59. A musical performance teaching system as claimed in claim 57, further comprising:

an evaluation device that makes an evaluation of practice results based on the performance data of the student from said electronic musical instrument after a certain amount of practice by the student.

60. A musical performance teaching system as claimed in claim 59, further comprising:

a judgment adjusting device that adjusts said judgment reflecting said evaluation of practice results by said evaluation device.

61. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

a declaration device that enters a performance skill of the student by querying the student through said display device;

a subject presenting device for presenting on said display device a subject for practice of musical performance of a level which meets said declaration by the student; and a judging device that makes a judgment about performance skill of the student with respect to said subject for practice upon receipt of said performance data from the electronic musical instrument.

62. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

a subject presenting device that presents on said display device in sequence a plurality of subjects for practice of musical performance with respect to various areas of performance skill of the student; and a judging device that makes a judgment respectively about said various areas of performance skill of the student on the respective subjects for practice upon receipt of said performance data from the electronic musical instrument.

63. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

a user model memory device that stores user model data representing a performance skill of the student;

a practice scheduling device that provides a schedule of training musical instrument performance skill based on said user model data; and a performance training device that trains the student in accordance with said schedule of training.

64. A musical performance teaching system as claimed in claim 63, further comprising:

a request input device that enters requests from the student upon querying the student about requests in regard to the training utilizing said display device;

wherein said scheduling device provides a schedule of training musical instrument performance skill reflecting said requests inputted by said request input device.

65. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

a practice schedule memory device that stores practice schedule data representing a schedule of training musical instrument performance skill of the student;

a performance training device that trains the student in accordance with the schedule based on said practice schedule data; and a writing device that writes practice results of the student's performance training into said practice schedule memory device.

66. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

a practice schedule memory device that stores practice schedule data representing a schedule of training musical instrument performance skill of the student;

a performance training device that trains the student by presenting matters to practice on said display device in accordance with the schedule based on said practice schedule data;

an evaluation device that makes an evaluation of practice results based on the performance data of the student from said electronic musical instrument; and a progression control device that controls the progression of the training based on said schedule of training reflecting said evaluation of practice results.

67. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

a music data memory device that stores a number of practice music pieces in data form;

a performance training device that trains the student by presenting on said display device in sequence a plurality of portions of a music piece to be practiced by the student based on said stored practice music data;

an evaluation device that makes an evaluation of performance skill of the student based on the performance data of the student from said electronic musical instrument; and a progressing rate control device that controls the rate of display progression of said plurality of portions of the music piece to be practiced by the student reflecting said evaluation of the practice results.

68. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

a practice schedule memory device that stores practice schedule data representing a schedule of training musical instrument performance skill of the student;

a music data memory device that stores a number of practice music pieces in data form; and a performance training device that trains the student by presenting on said display device matters to practice of a practice music piece in accordance with the schedule based on said practice schedule data and said practice music data.

69. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

a subject presentation device that presents on said display device in sequence different subjects for judgment or practice;

an evaluation device that makes an evaluation of responses of the student to said subjects based on the performance data of the student from said electronic musical instrument and accordingly controlling said subject presenting devices to proceed to the next subject to practice; and a forcible progressing device that controls said subject presentation device to proceed to the next subject presentation by starting time from the presentation of each subject and forcedly suspending the current presentation of said each subject after the lapse of a predetermined time from the start of the count time irrespective of the evaluation by said evaluation device.

70. A musical performance teaching system as claimed in any one of claims 57 through 69, further comprising:

an accounting device that bills money charges corresponding to the time length of the computer use by the student.

71. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

a tutoring manner selecting device that is used by the student to select a manner of tutoring musical performance; and a performance training device that trains students in performance of musical instrument according to the manner of tutoring selected by the student.

72. A musical performance teaching system as claimed in claim 71, wherein said manner of tutoring is comprised of a combination of each selected sub-manner respectively from a plurality of manner elements, and said tutoring manner selecting device selects one from a plurality of manner patterns which are different combinations of the sub-manners respectively from said plurality of manner elements, with one sub-manner from one manner element.

73. A musical performance teaching system as claimed in claim 71, wherein said manner of tutoring is comprised of a combination of each selected sub-manner respectively from a plurality of manner elements, and said tutoring manner selecting device selects sub-manners respectively from a plurality of manner elements, with one sub-manner from one manner element.

74. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

a memory device that stores plural sets of first music data, each set representing a practice music piece of a first kind among a plurality thereof, and plural sets of second music data each set representing a practice music piece of a second kind from among a plurality thereof, the practice music pieces of said second kind being so composed as to serve for mastering performance of a practice music piece of said first kind;

a first selection device that selects any one of the plurality of practice music pieces of said first kind;

a first performance training device that trains the student by presenting a practice music piece of said first kind based on the first music data representing the selected practice music piece of said first kind;

an evaluation device that makes an evaluation of practice progress based on the performance data of the student from said electronic musical instrument in comparison with said first music data of said selected practice music piece of the first kind;

a second selection device that selects a practice music piece of said second kind from among the plurality of practice music pieces of said second kind based on at least either of said first music data of said selected practice music piece of the first kind and said evaluation of practice progress; and a second performance training device that trains the student by presenting a practice music piece of said second kind based on the second music data representing the selected practice music piece of said second kind.

75. A musical performance teaching system as claimed in claim 74, further comprising:

a modifying device that modifies said second music data representing the selected practice music piece of said second kind based on at least either of said first music data of said selected practice music piece of the first kind and said evaluation of practice progress by said evaluation device;

wherein said second performance training device presents a modified practice music piece of said second kind based on said modified second music data in place of said selected practice music piece of the second kind.

76. A musical performance teaching system comprising a computer apparatus having a display device and being connectable to an electronic musical instrument for data communication therebetween, said electronic musical instrument being adapted for playing by a student and transmitting performance data representing said playing by the student to said computer apparatus, said computer apparatus including:

a memory device that stores plural sets of first music data, each set representing a practice music piece of a first kind among a plurality thereof, and plural sets of second music data each set representing a practice music piece of a second kind from among a plurality thereof, the practice music pieces of said second kind being so composed as to serve for mastering performance of a practice music piece of said first kind;

a selection device that selects any of the plurality of practice music pieces of said first kind;

a first performance training device that trains the student by presenting a practice music piece of said first kind based on the first music data representing the selected practice music piece of said first kind;

an evaluation device that makes an evaluation of practice progress based on the performance data of the student from said electronic musical instrument in comparison with said first music data of said selected practice music piece of the first kind;

a modifying device that modifies said second music data representing the practice music piece of said second kind based on at least either of said first music data of said selected practice music piece of the first kind and said evaluation of practice progress by said evaluation device; and a second performance training device that trains the student by presenting a modified practice music piece of the second kind based on said modified second music data.

\* \* \* \* \*